Aug. 23, 1955   F. COOPER, JR., ET AL   2,715,782
RADIO NAVIGATION TRAINER
Filed March 11, 1950   44 Sheets-Sheet 1
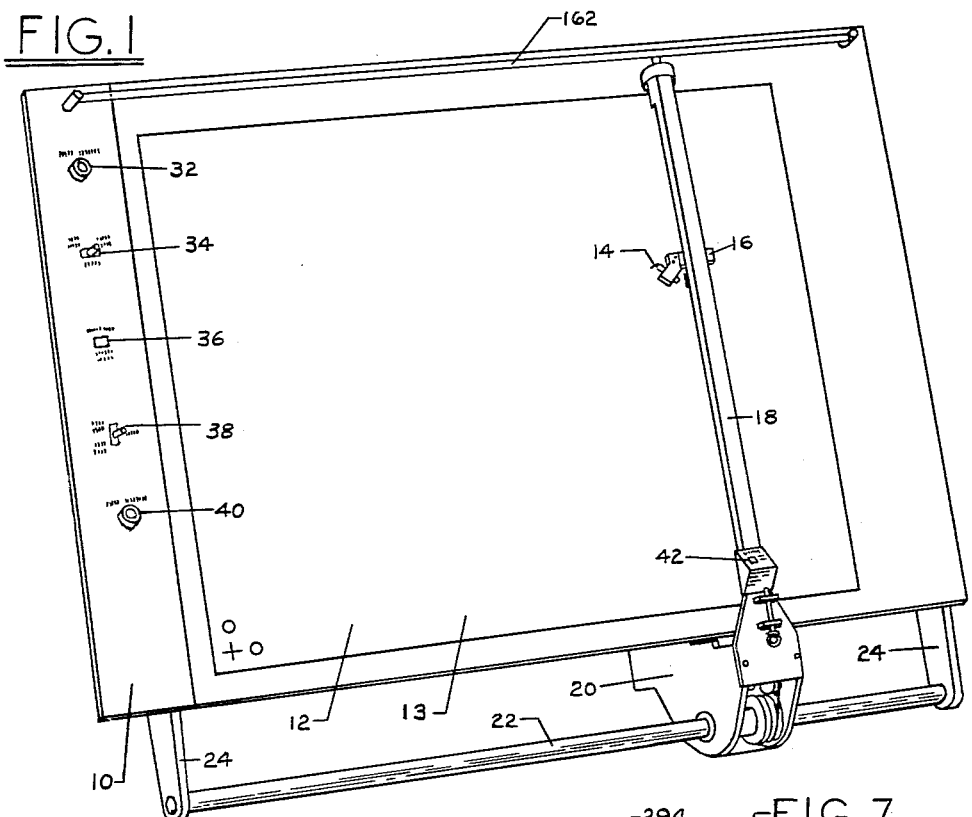
FIG. 1
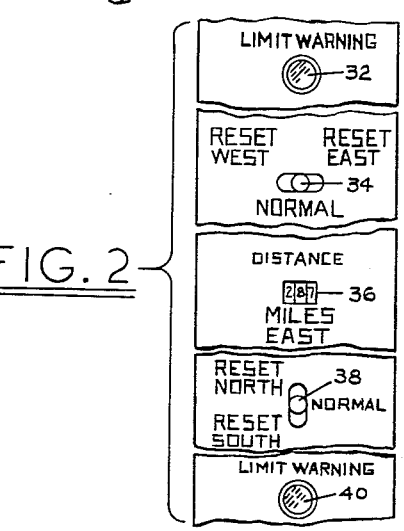
FIG. 2
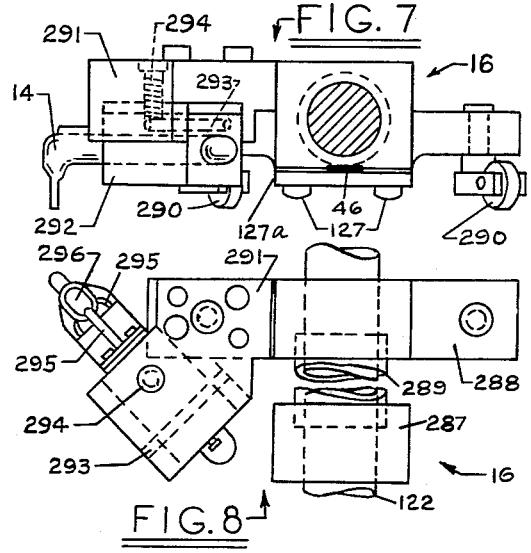
FIG. 7
FIG. 8

Aug. 23, 1955    F. COOPER, JR., ET AL    2,715,782
RADIO NAVIGATION TRAINER
Filed March 11, 1950    44 Sheets-Sheet 2

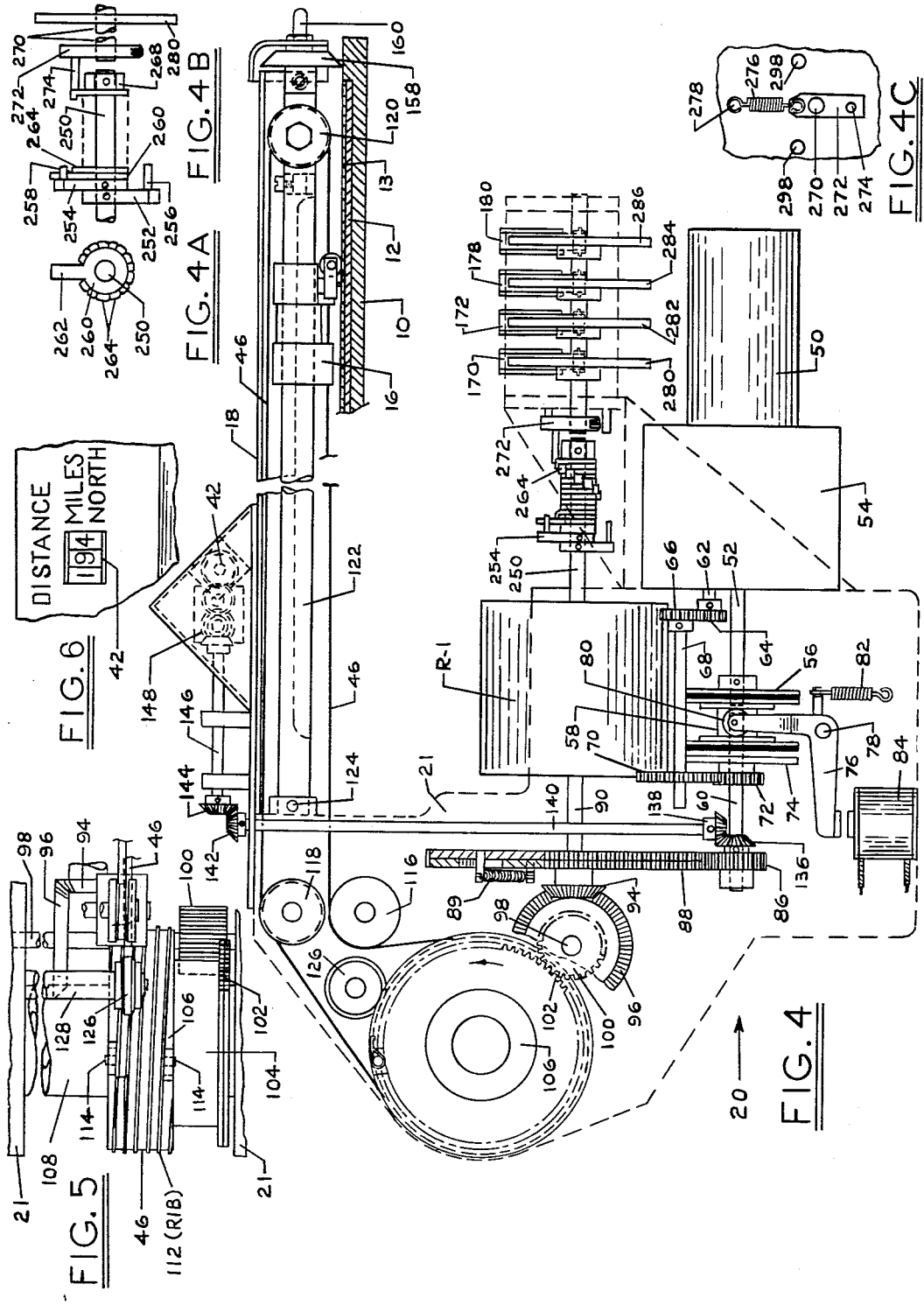

Aug. 23, 1955  F. COOPER, JR., ET AL  2,715,782

RADIO NAVIGATION TRAINER

Filed March 11, 1950  44 Sheets-Sheet 4

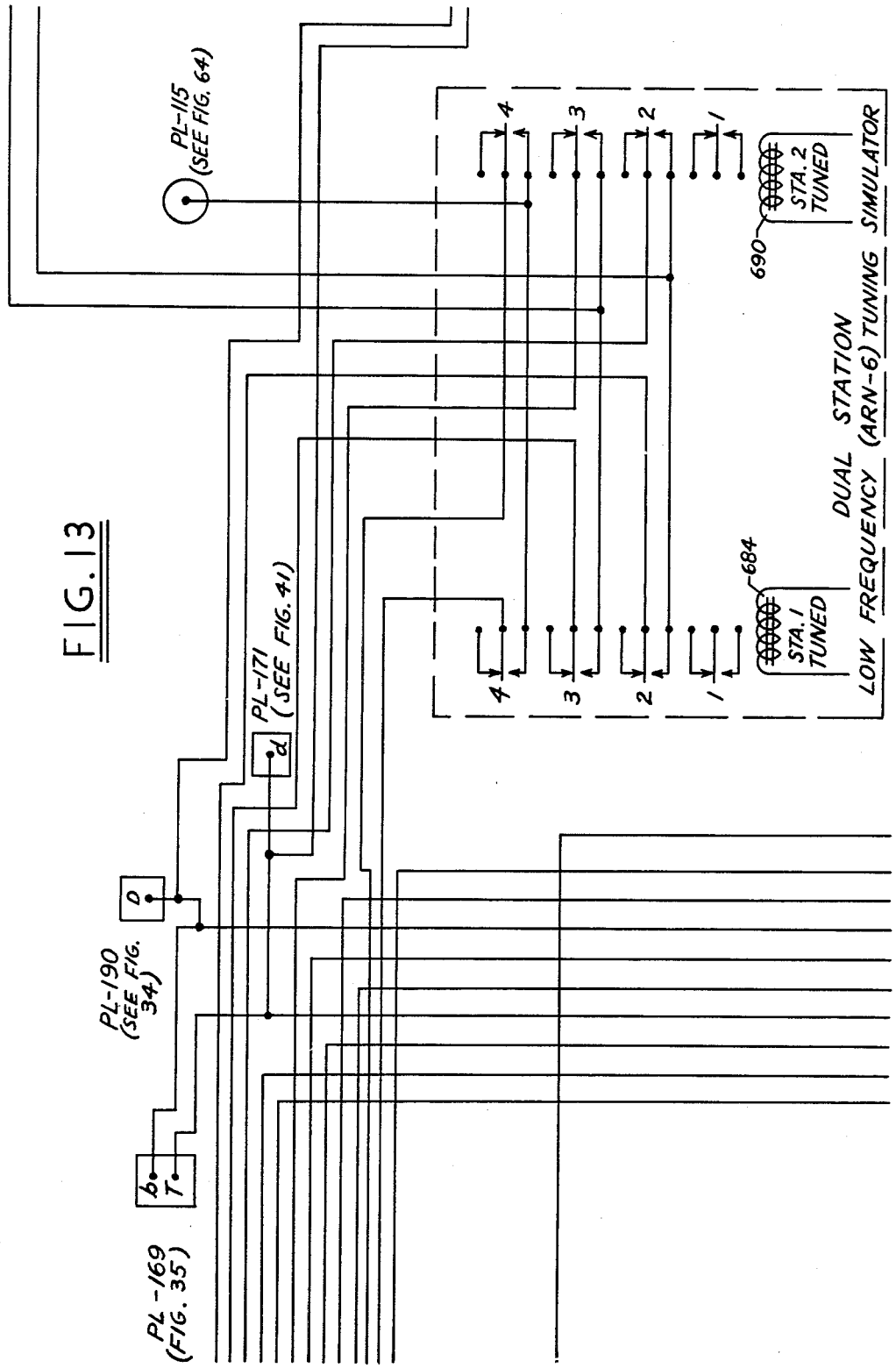

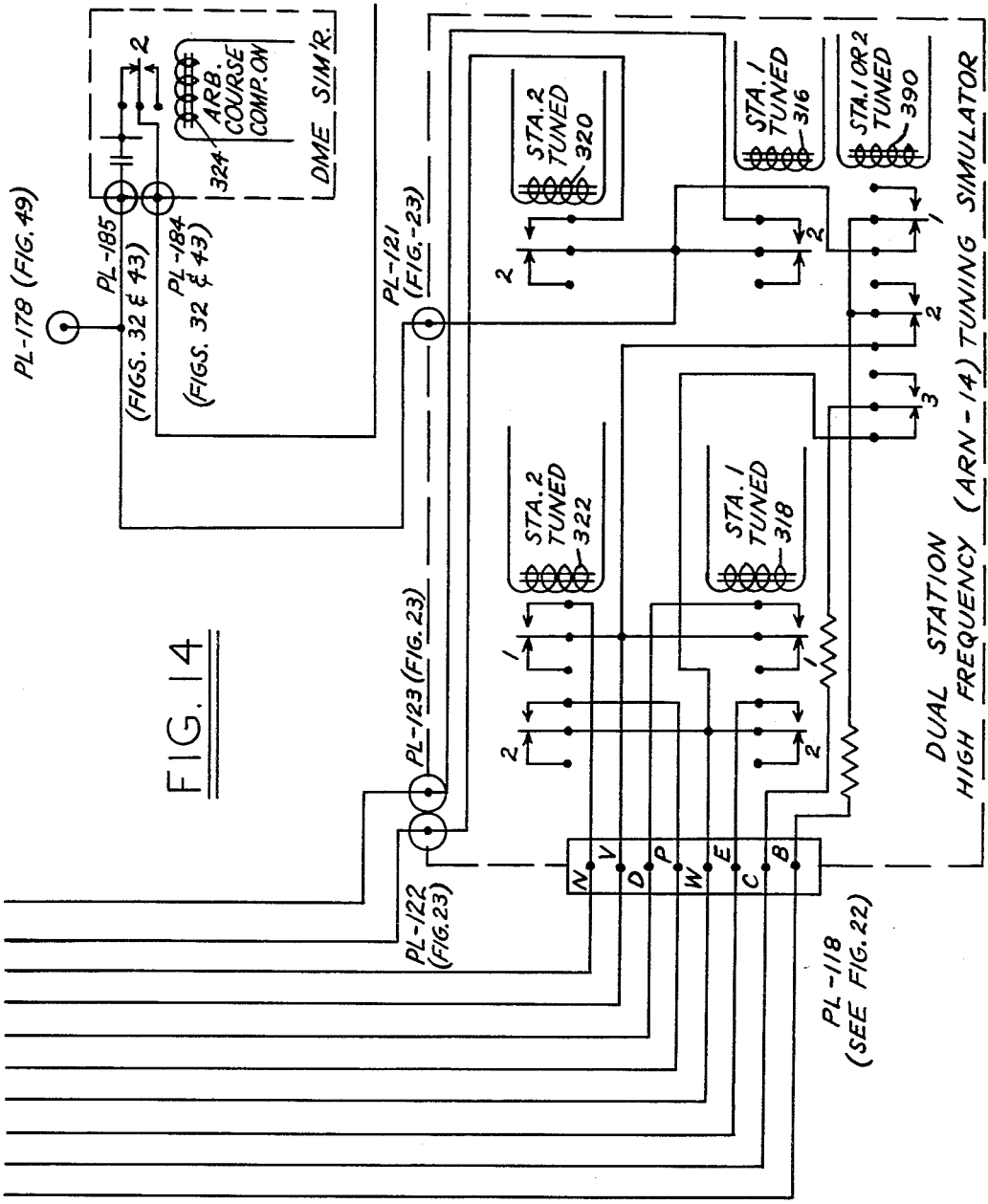

Aug. 23, 1955  F. COOPER, JR., ET AL  2,715,782
RADIO NAVIGATION TRAINER
Filed March 11, 1950  44 Sheets-Sheet 9
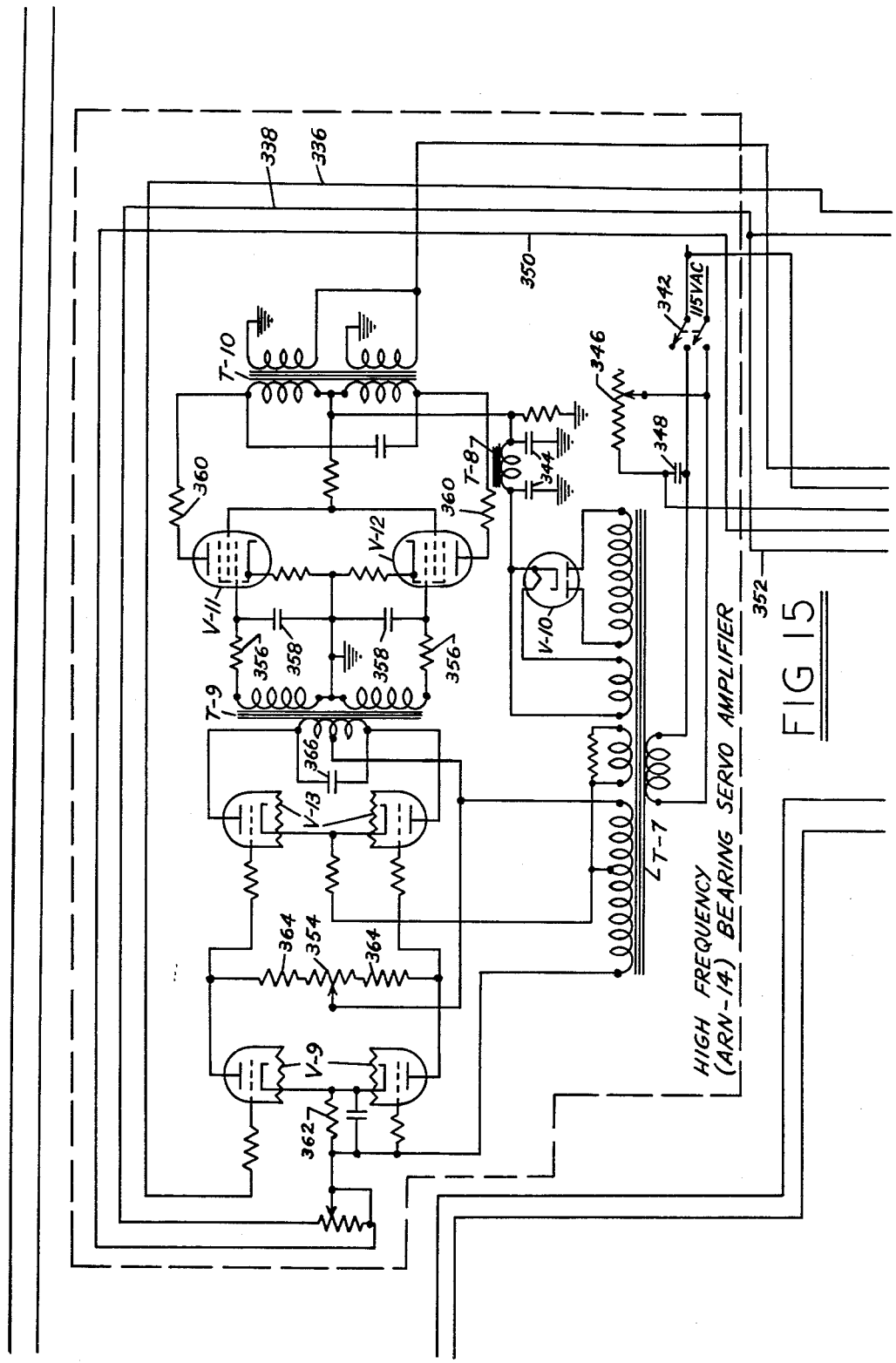

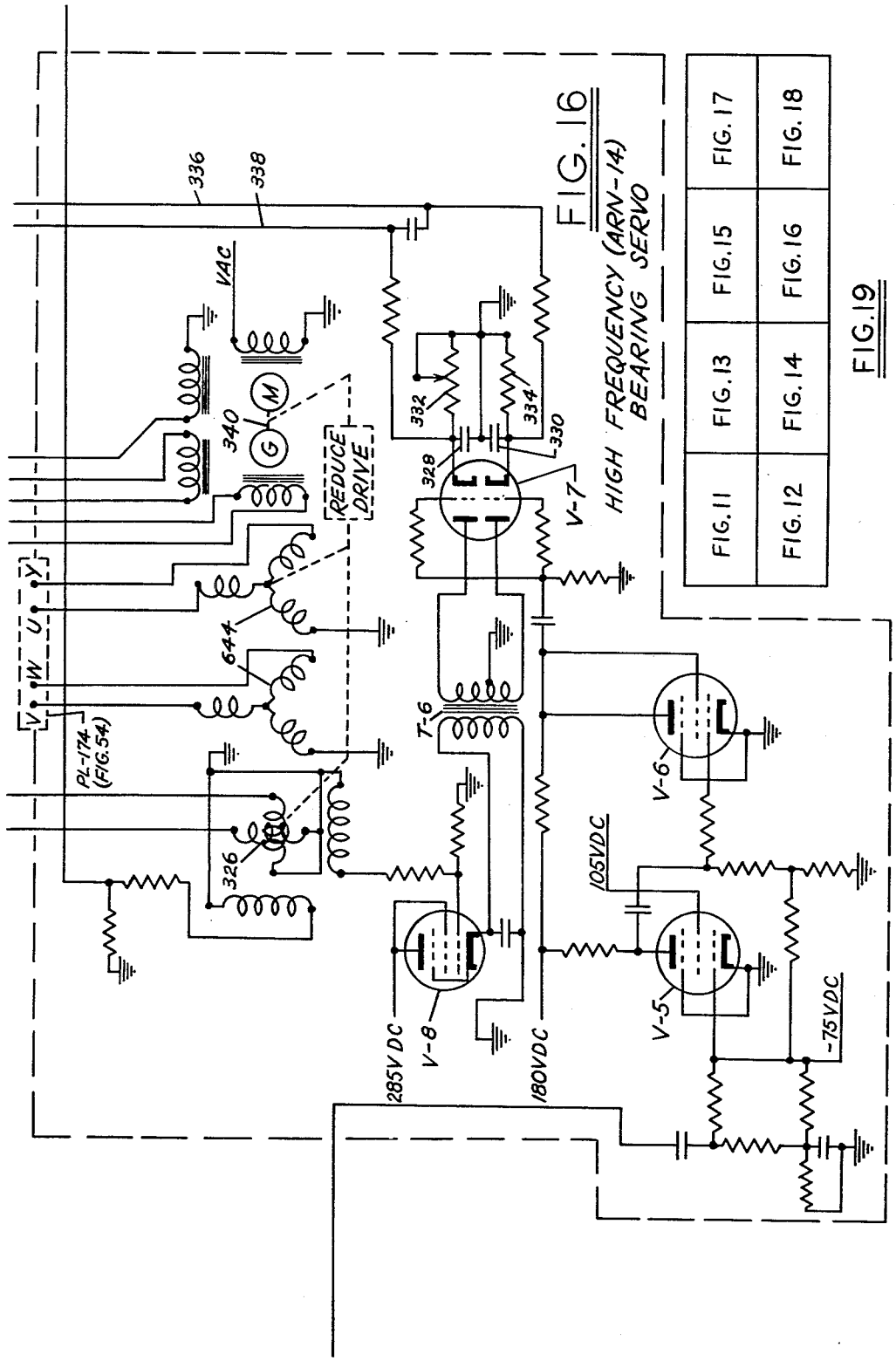

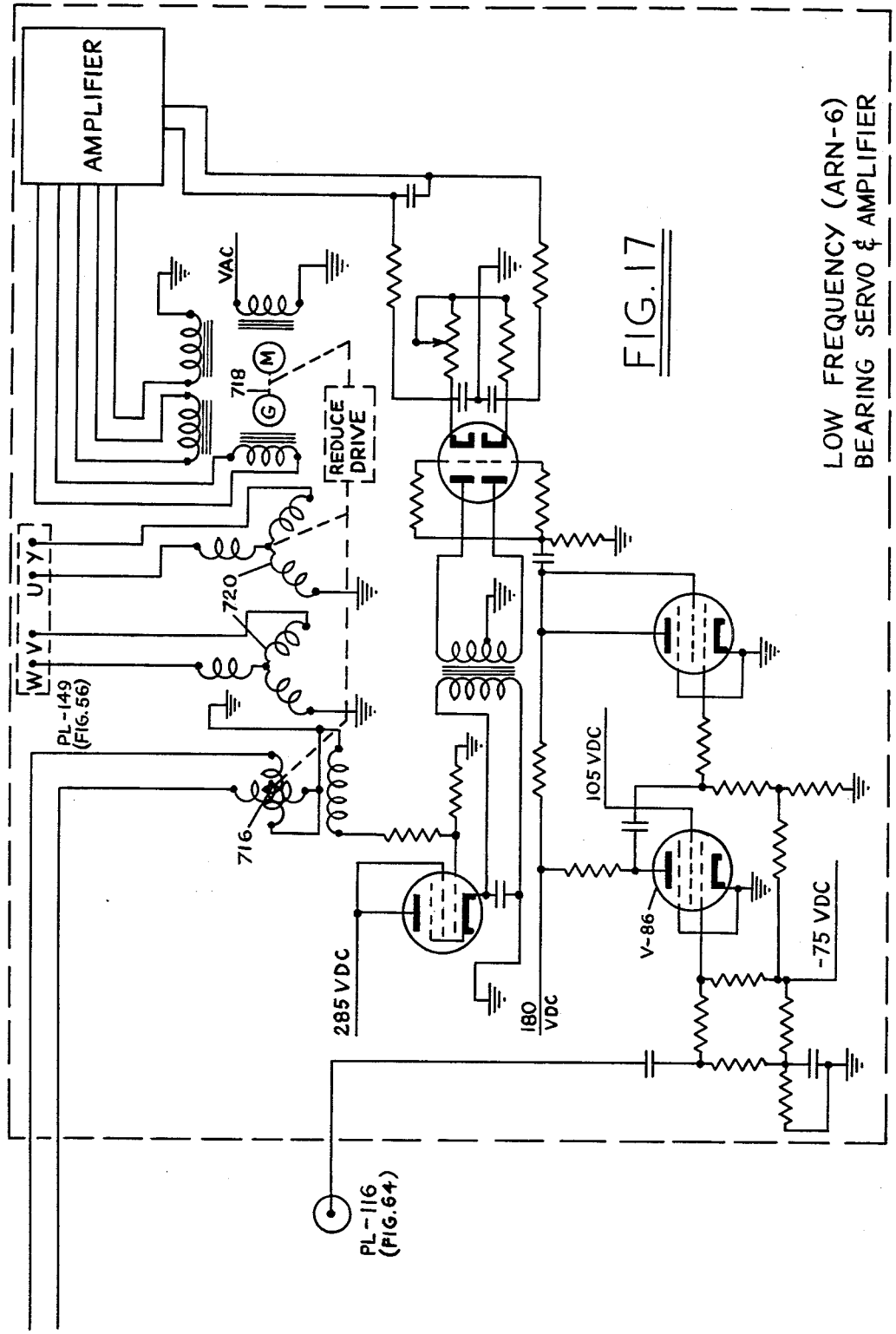

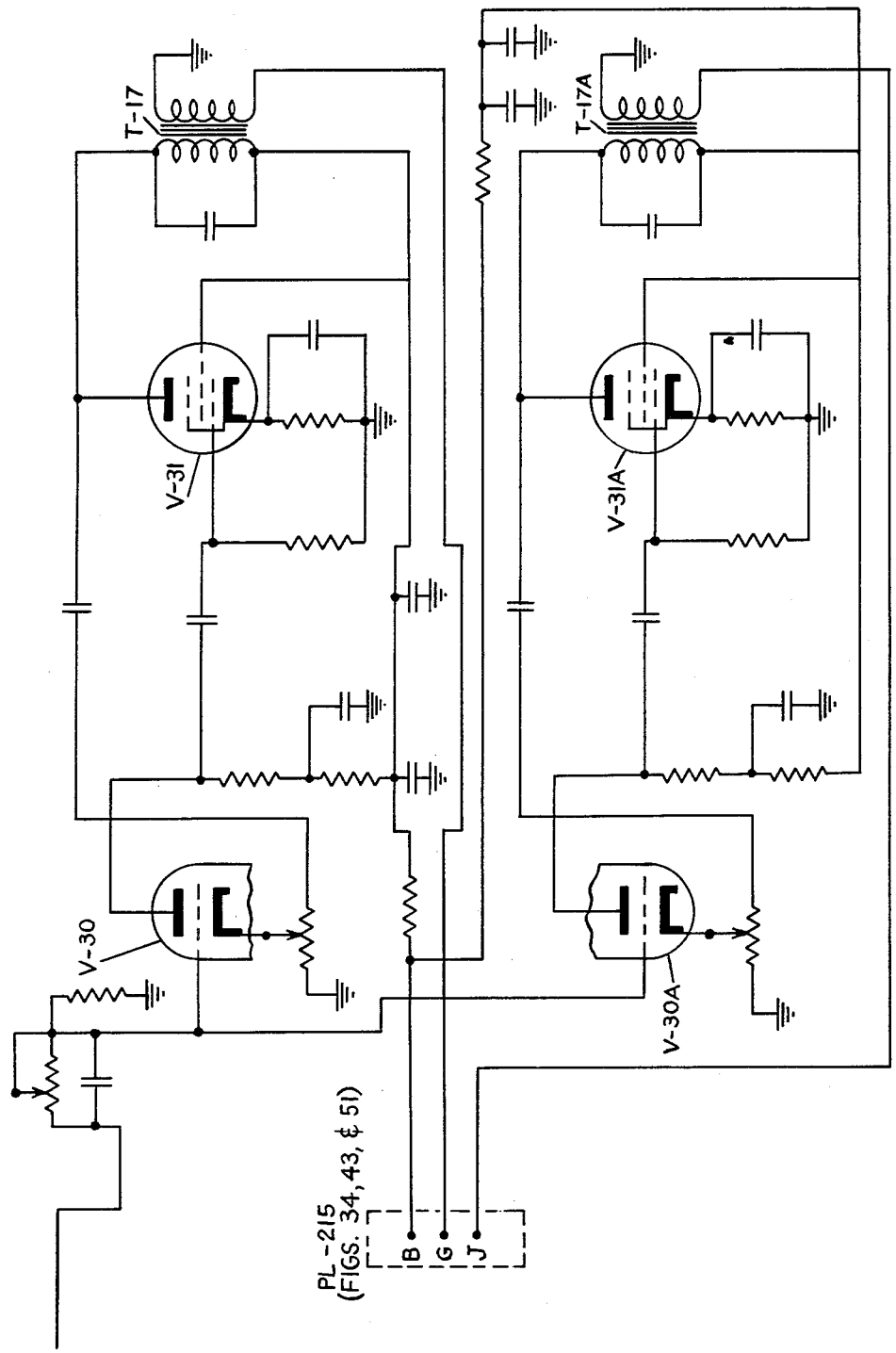

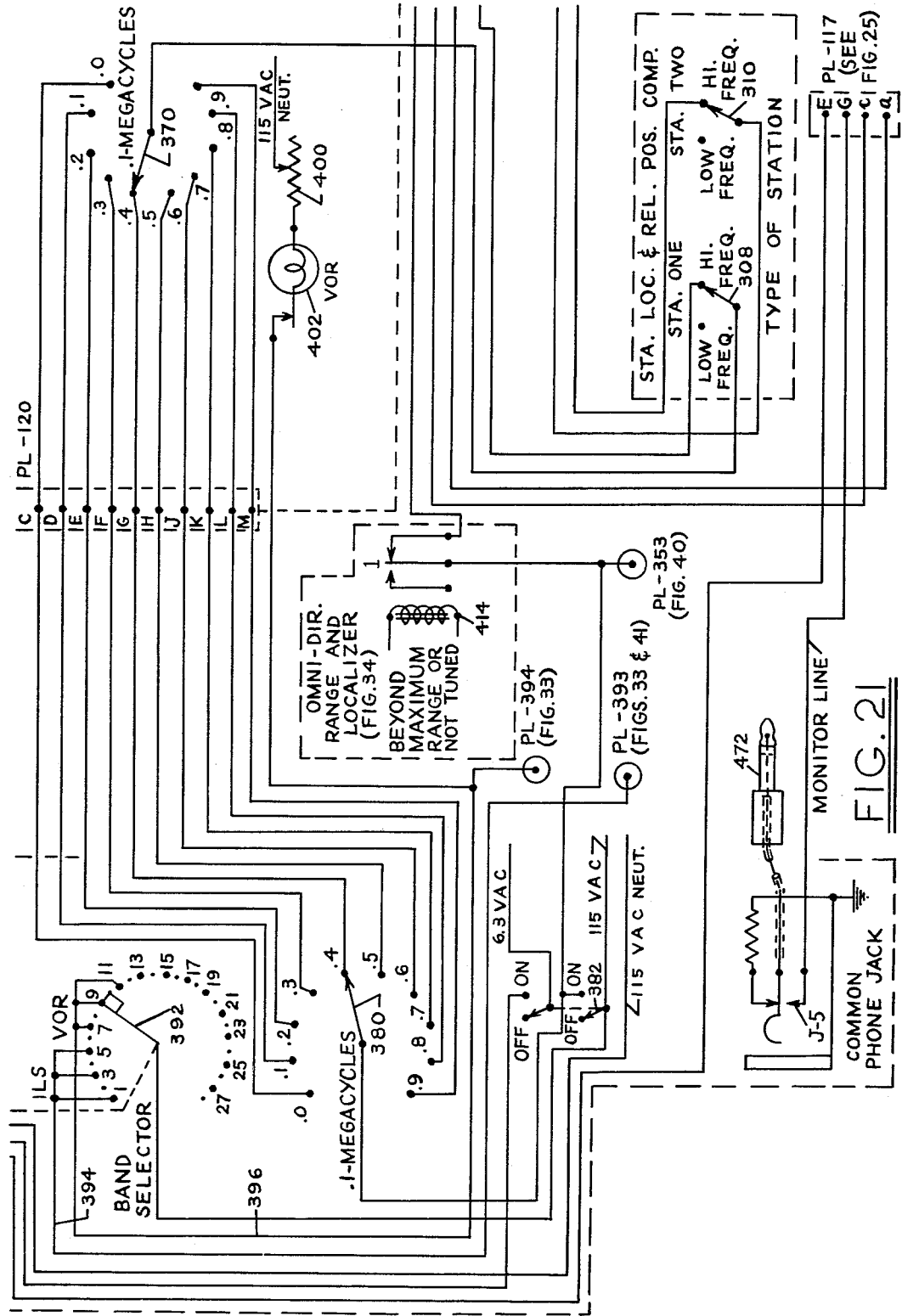

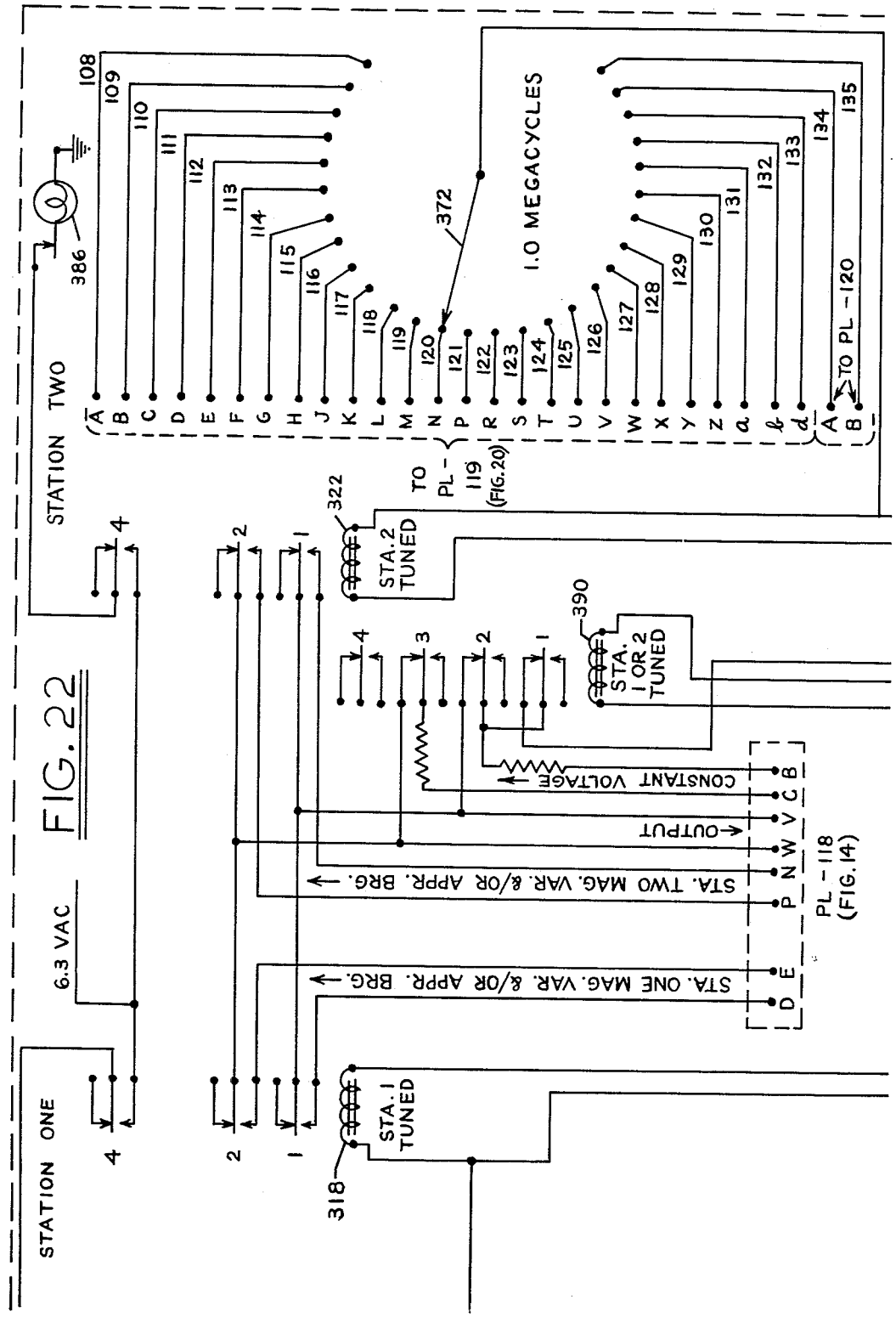

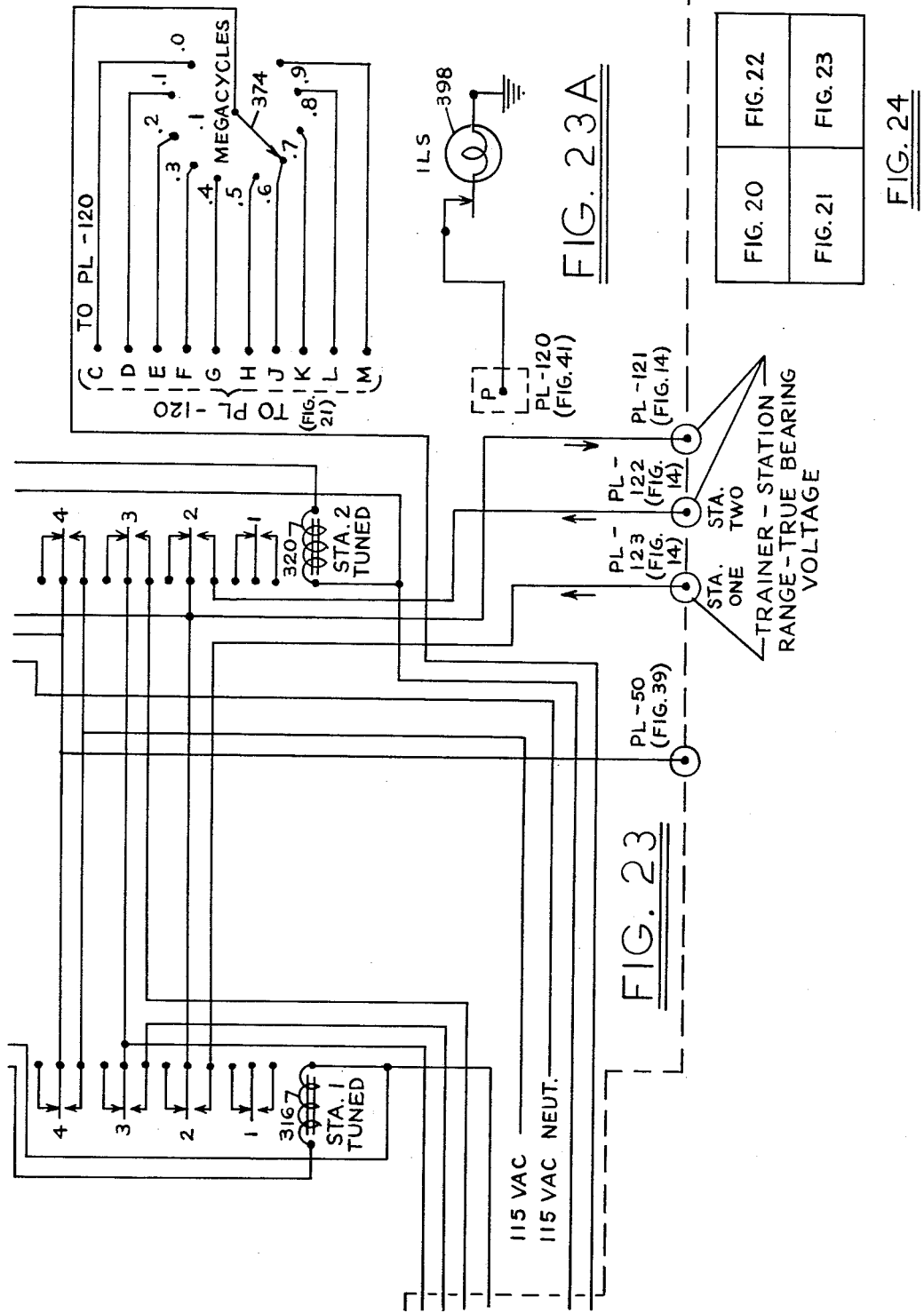

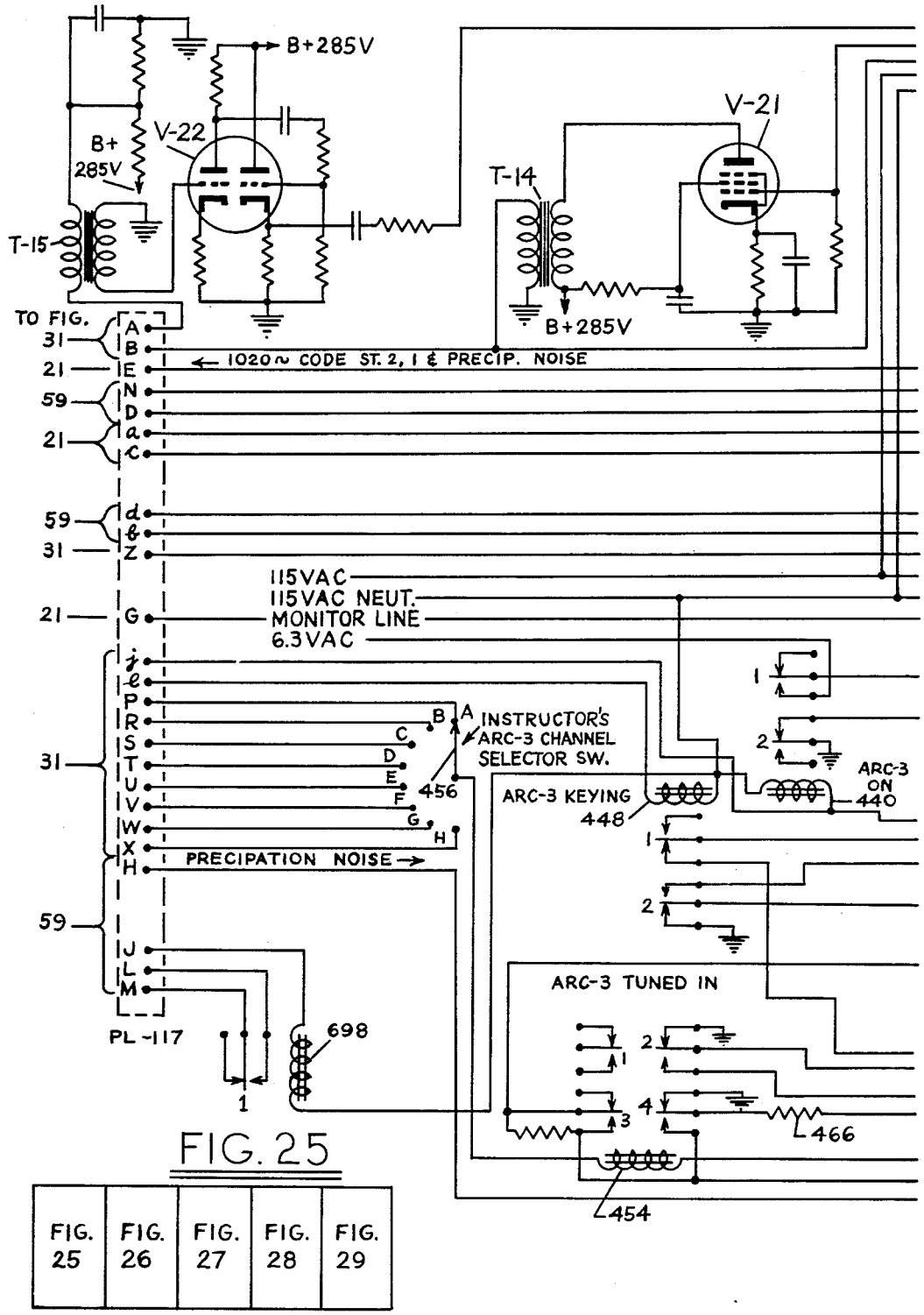

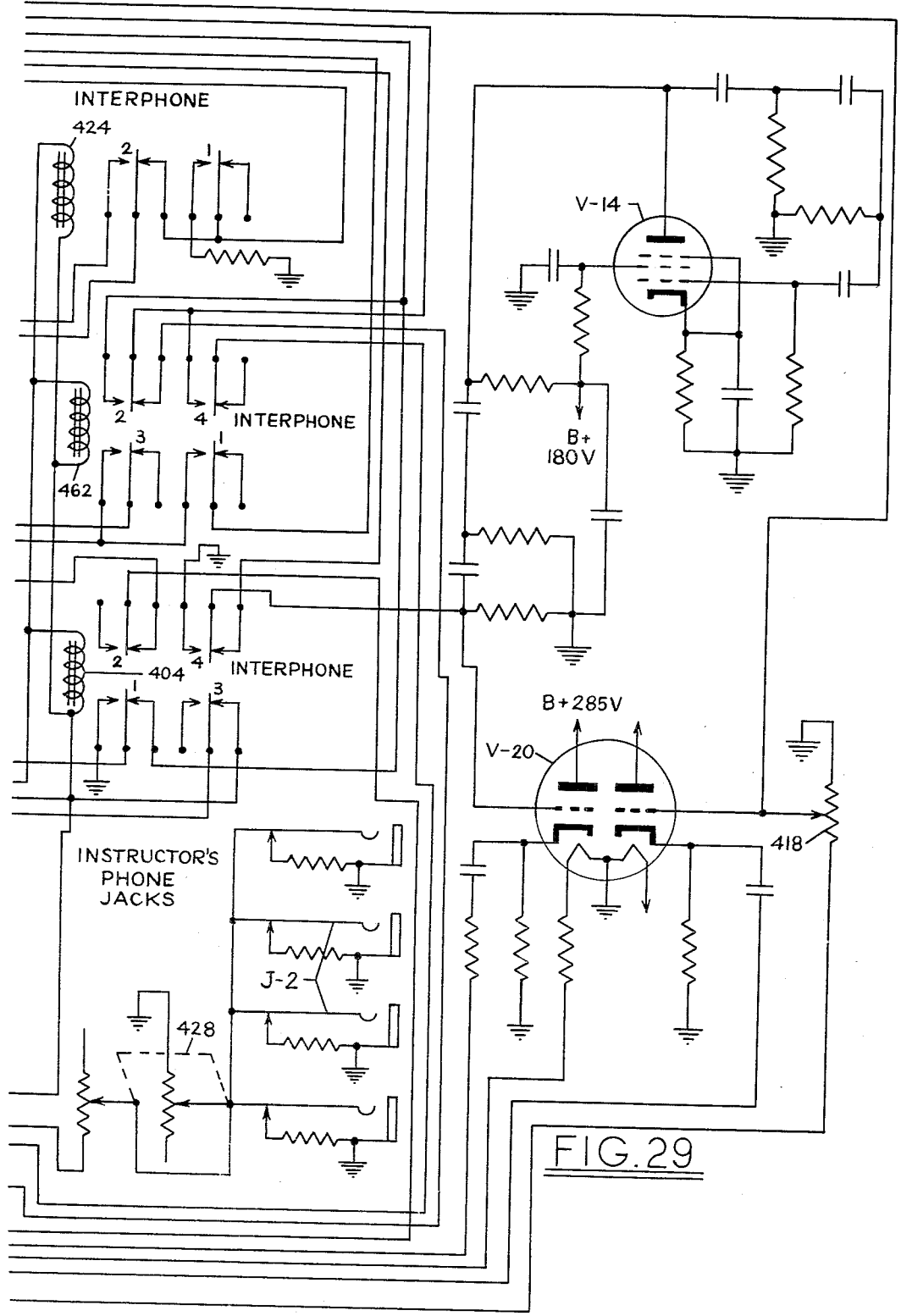

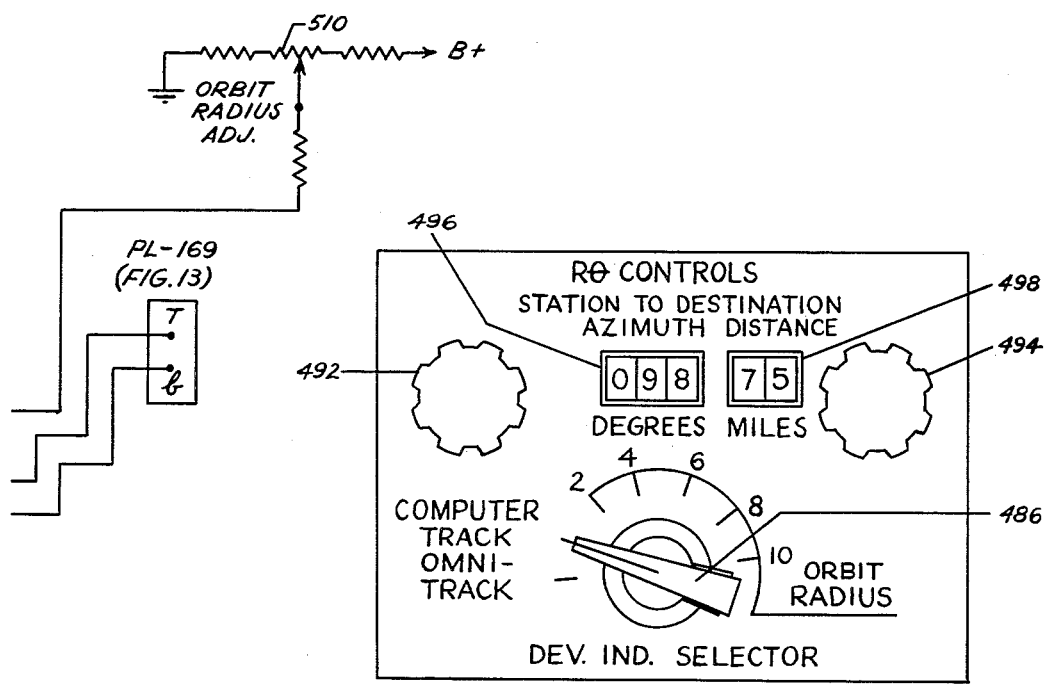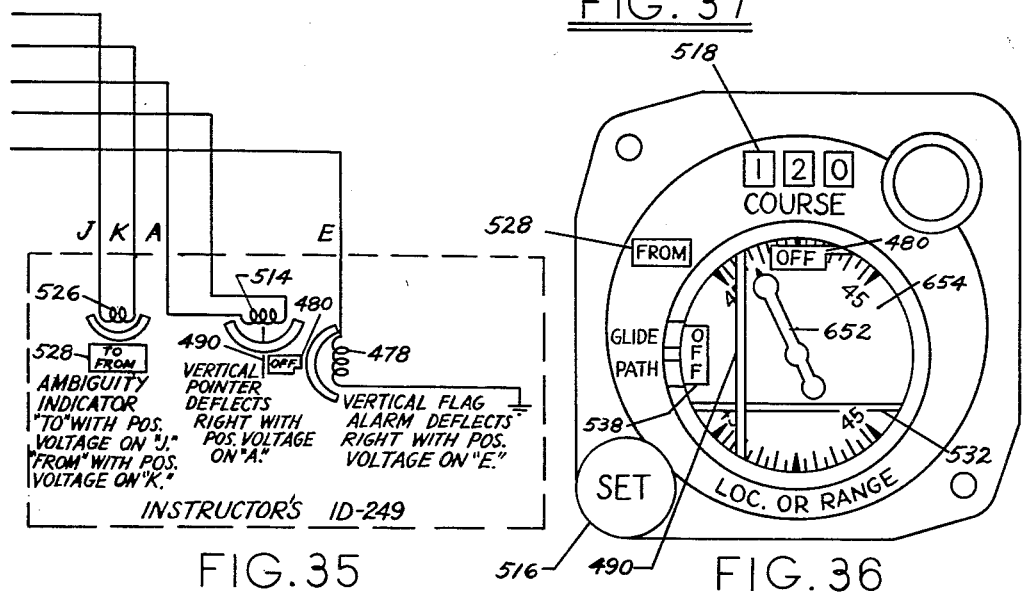

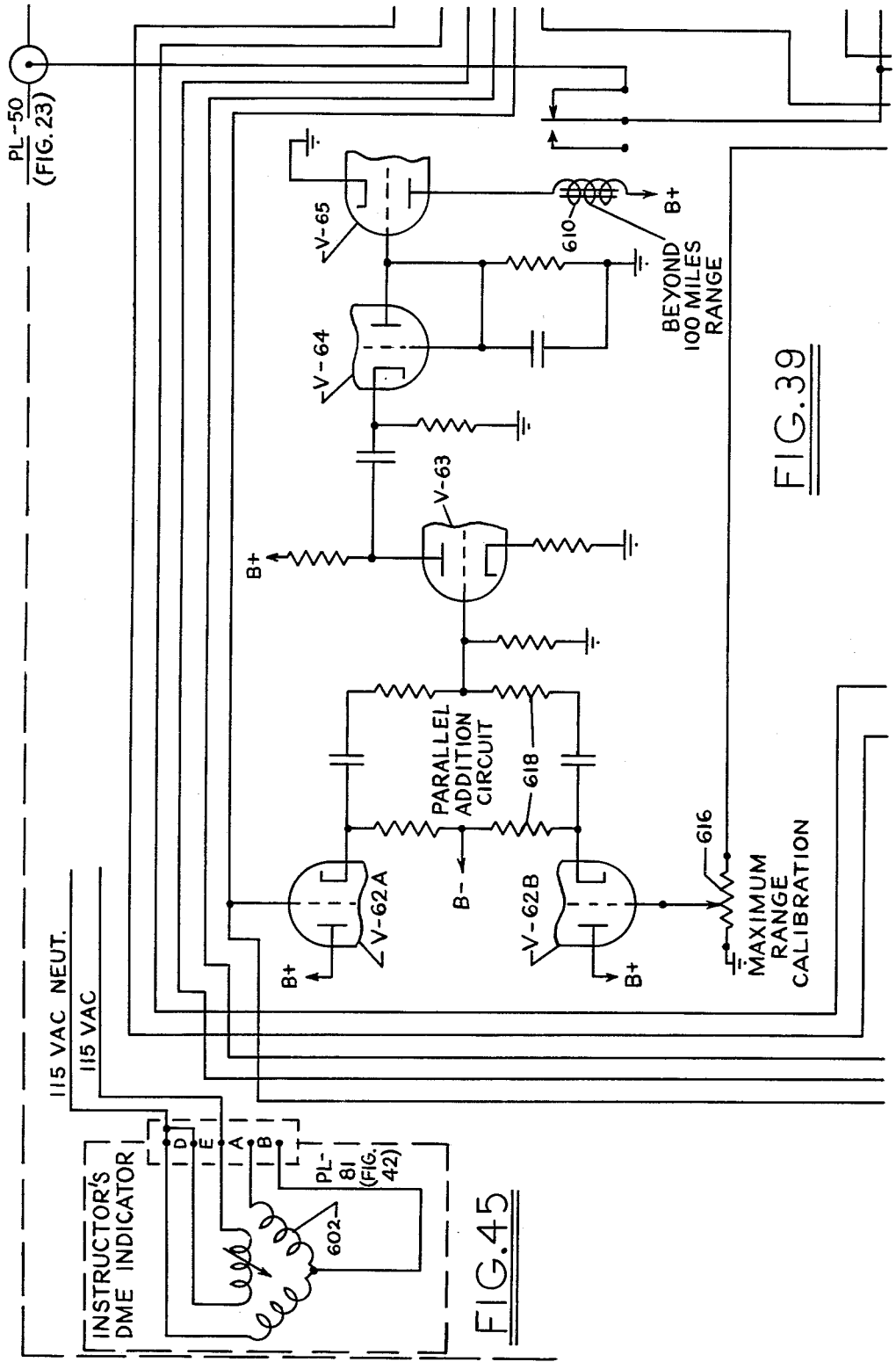

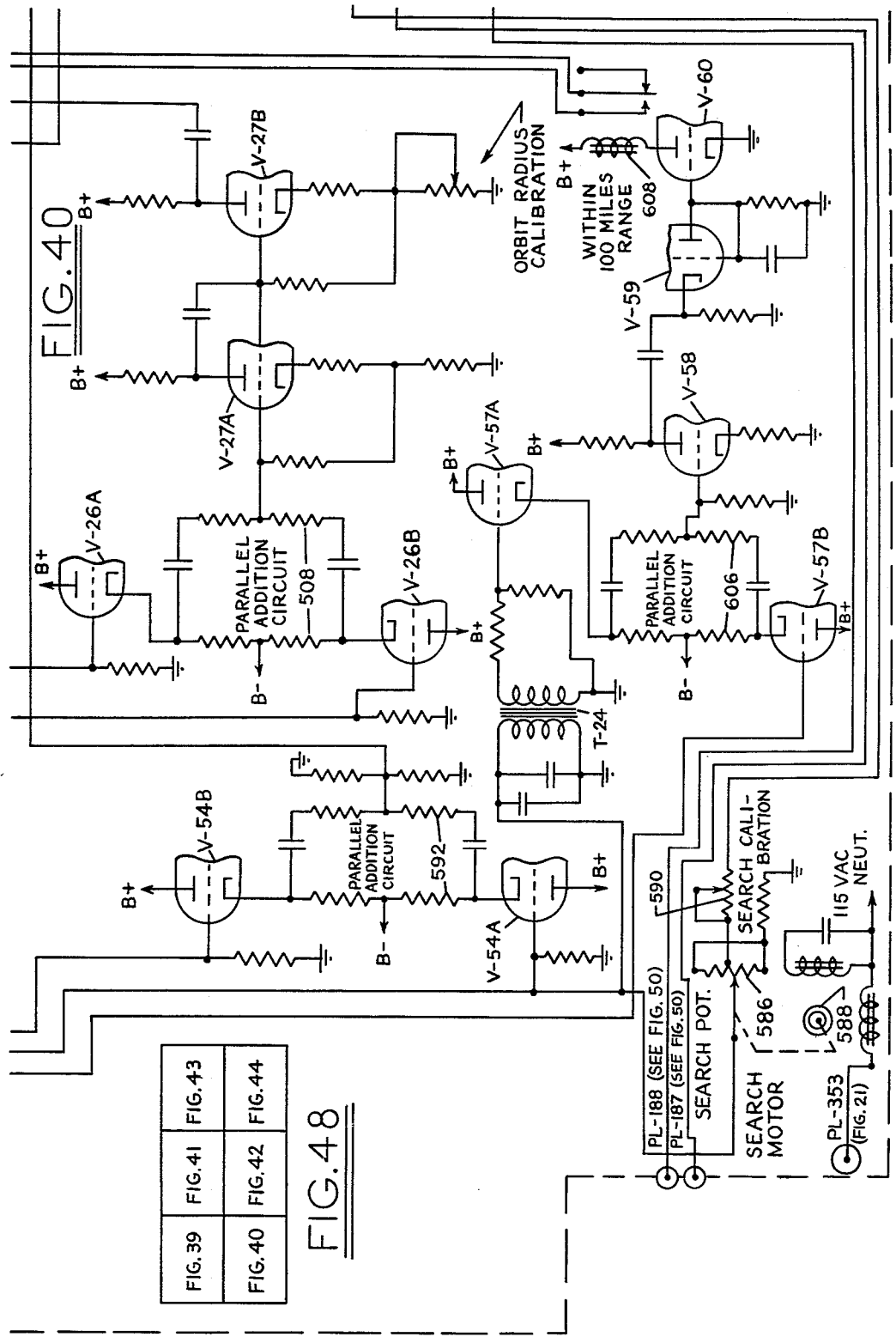

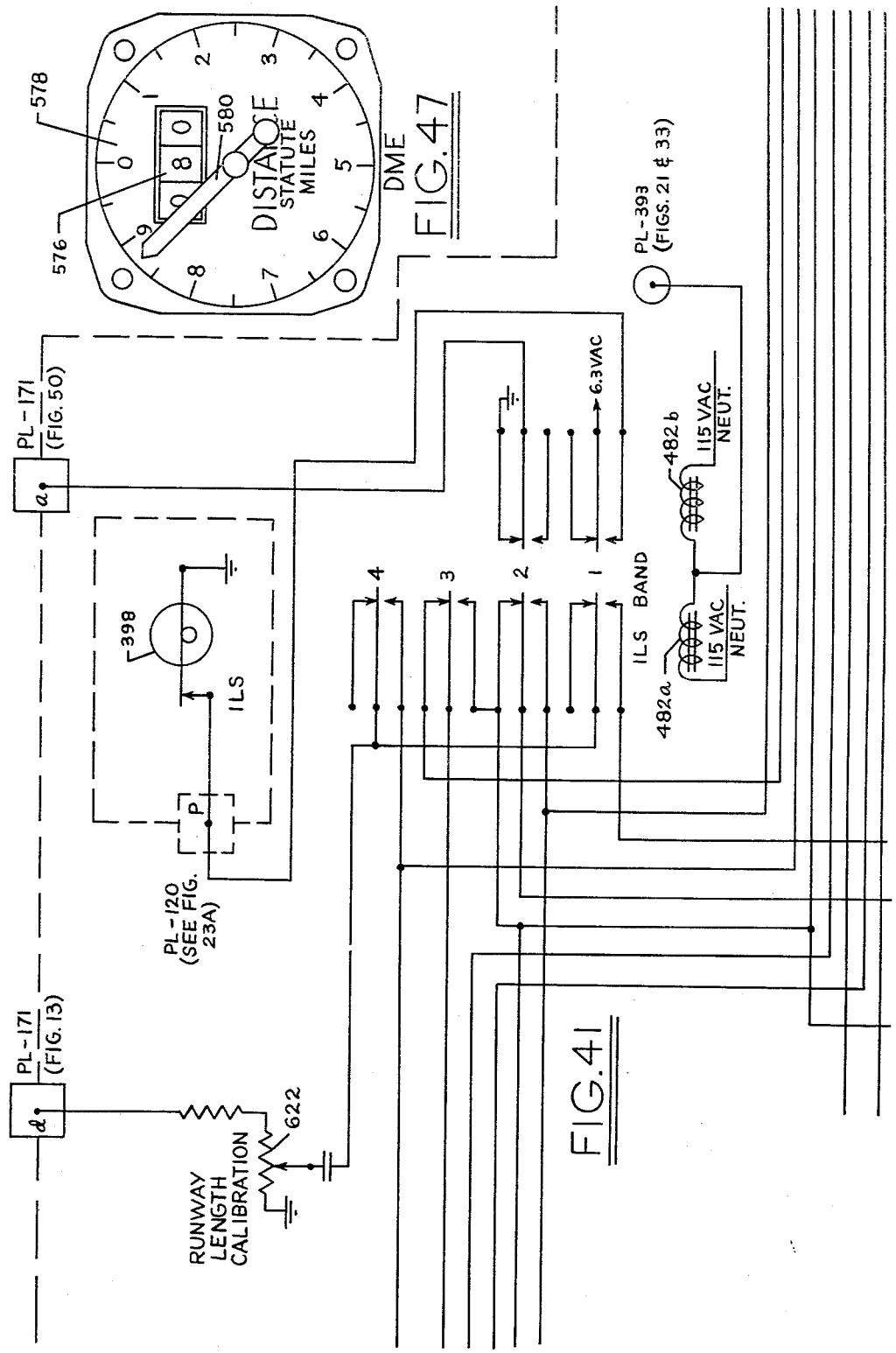

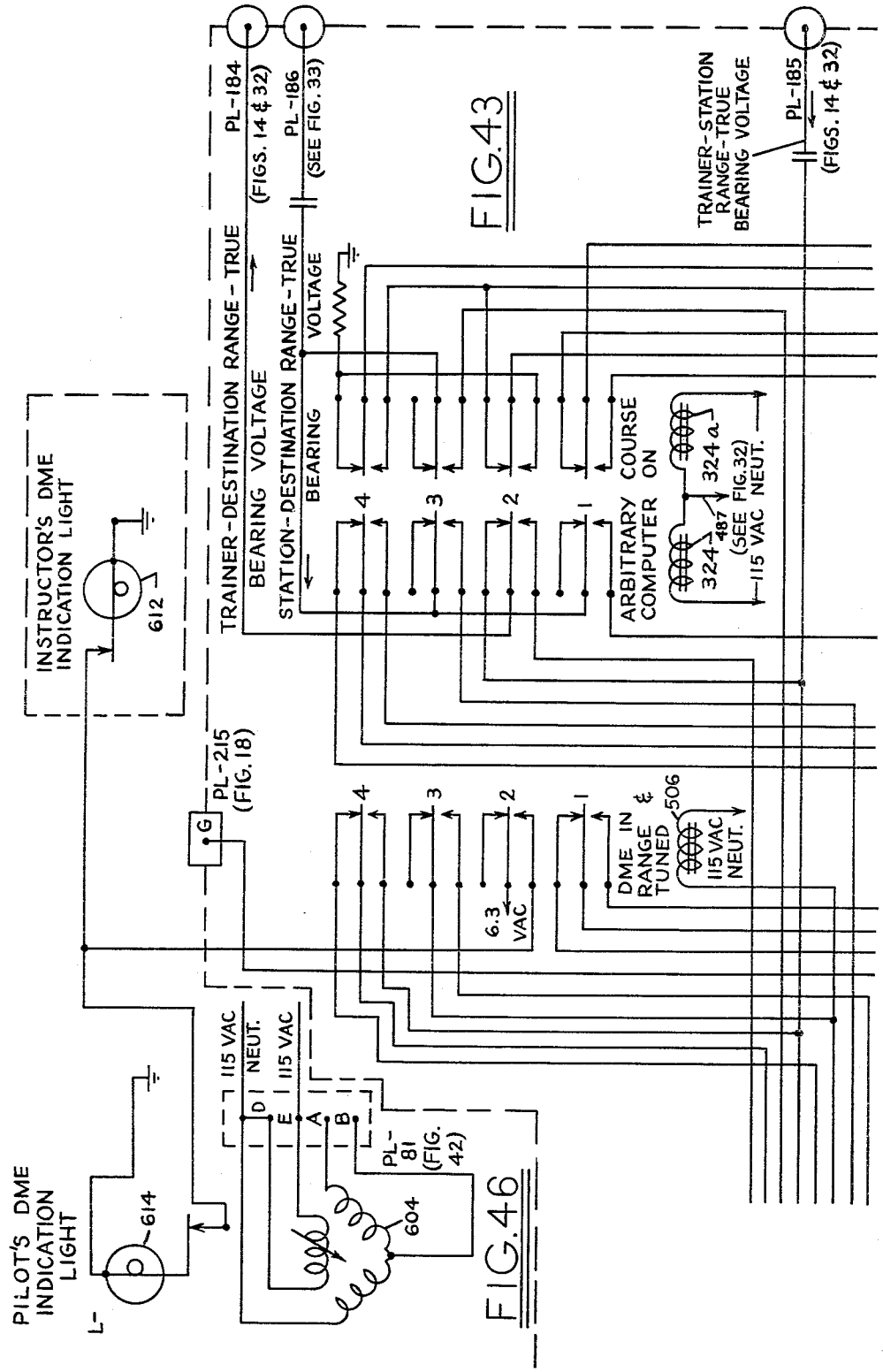

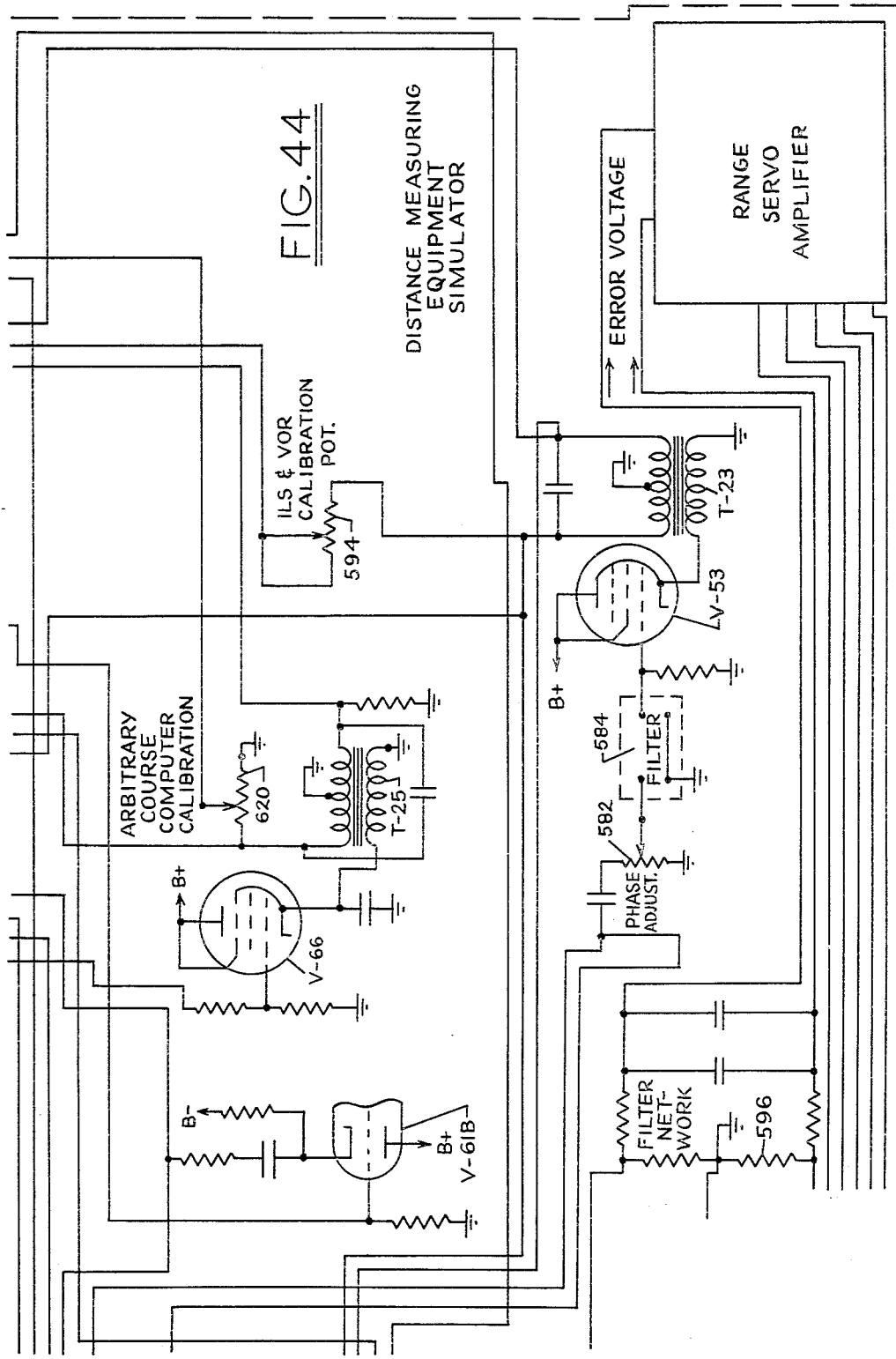

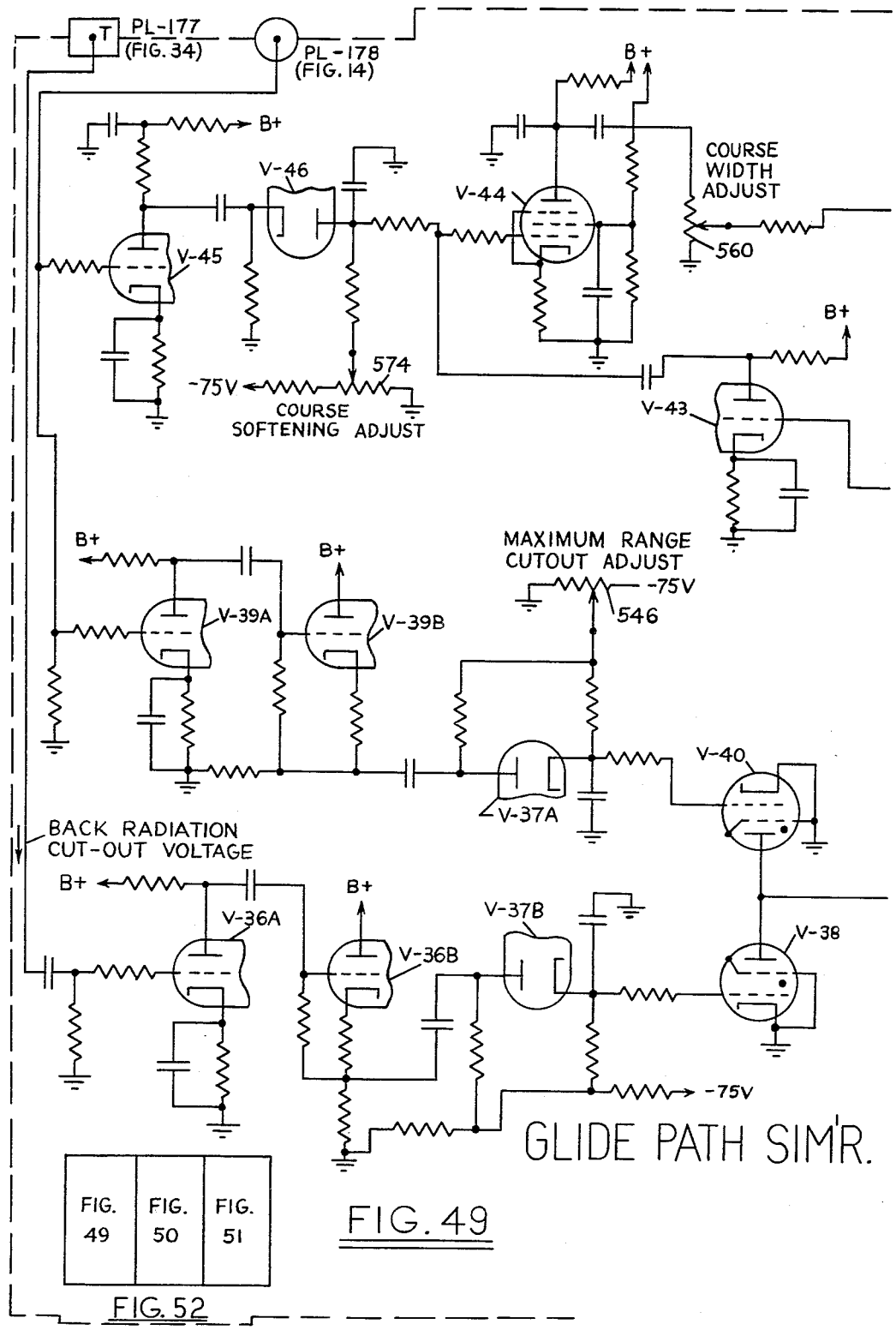

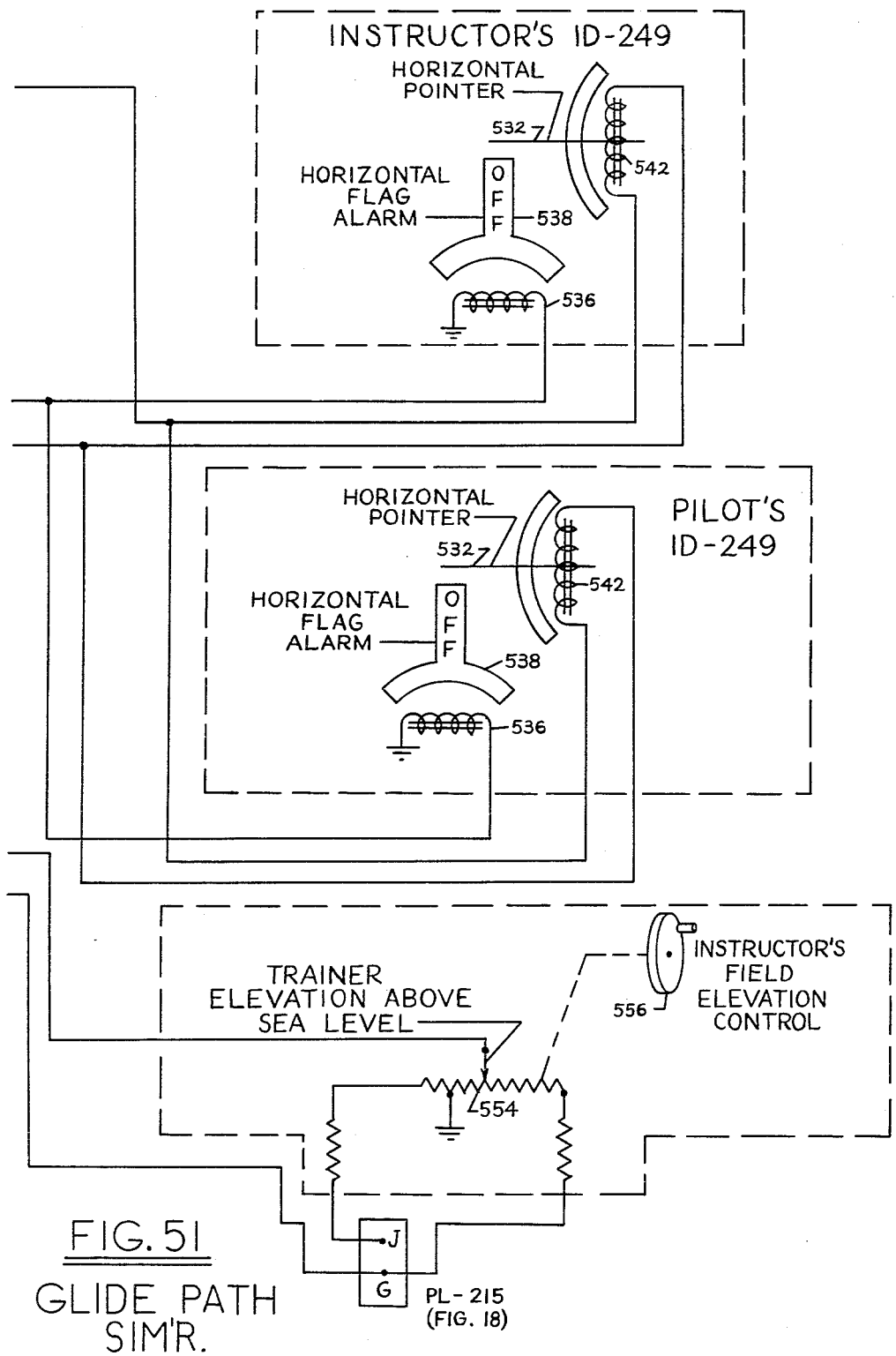

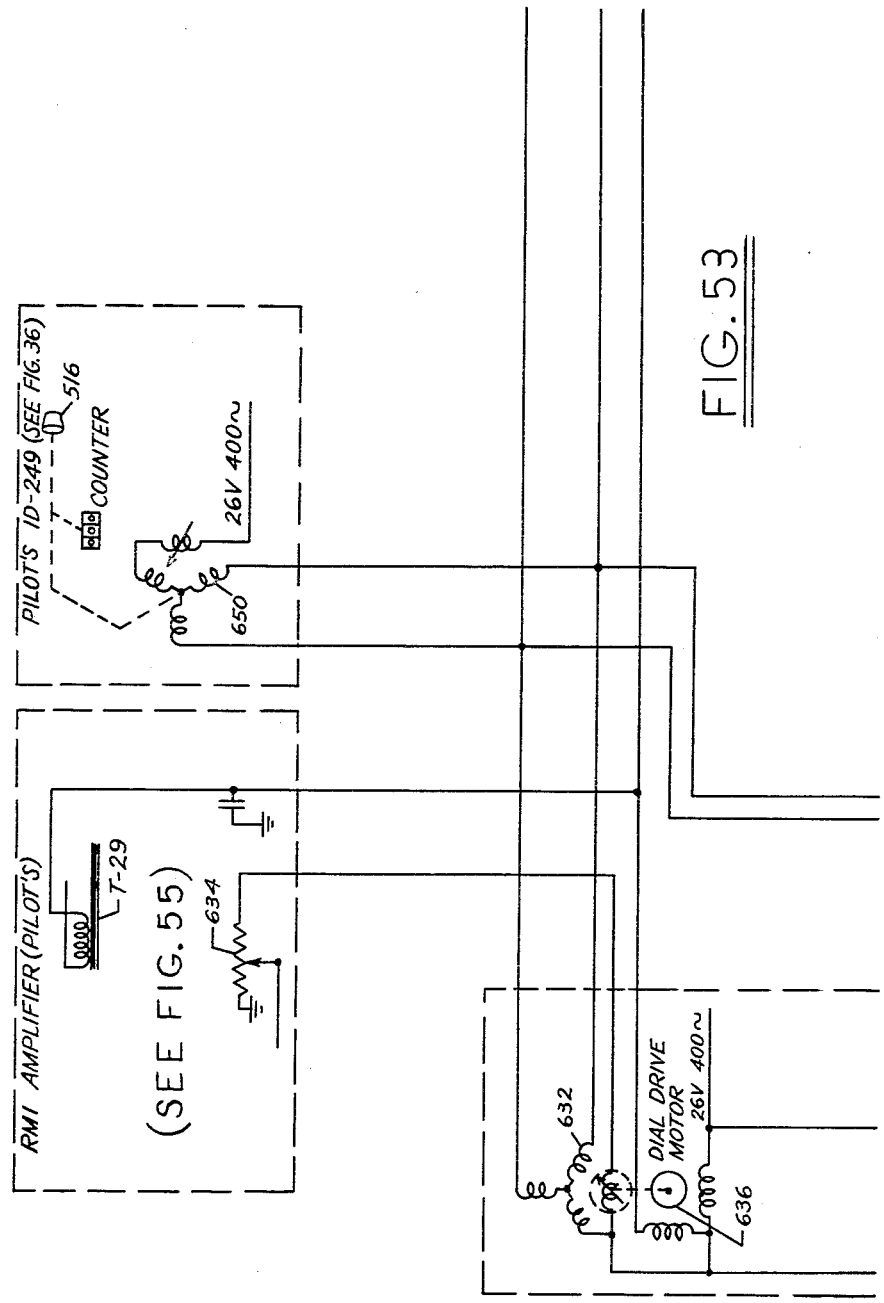

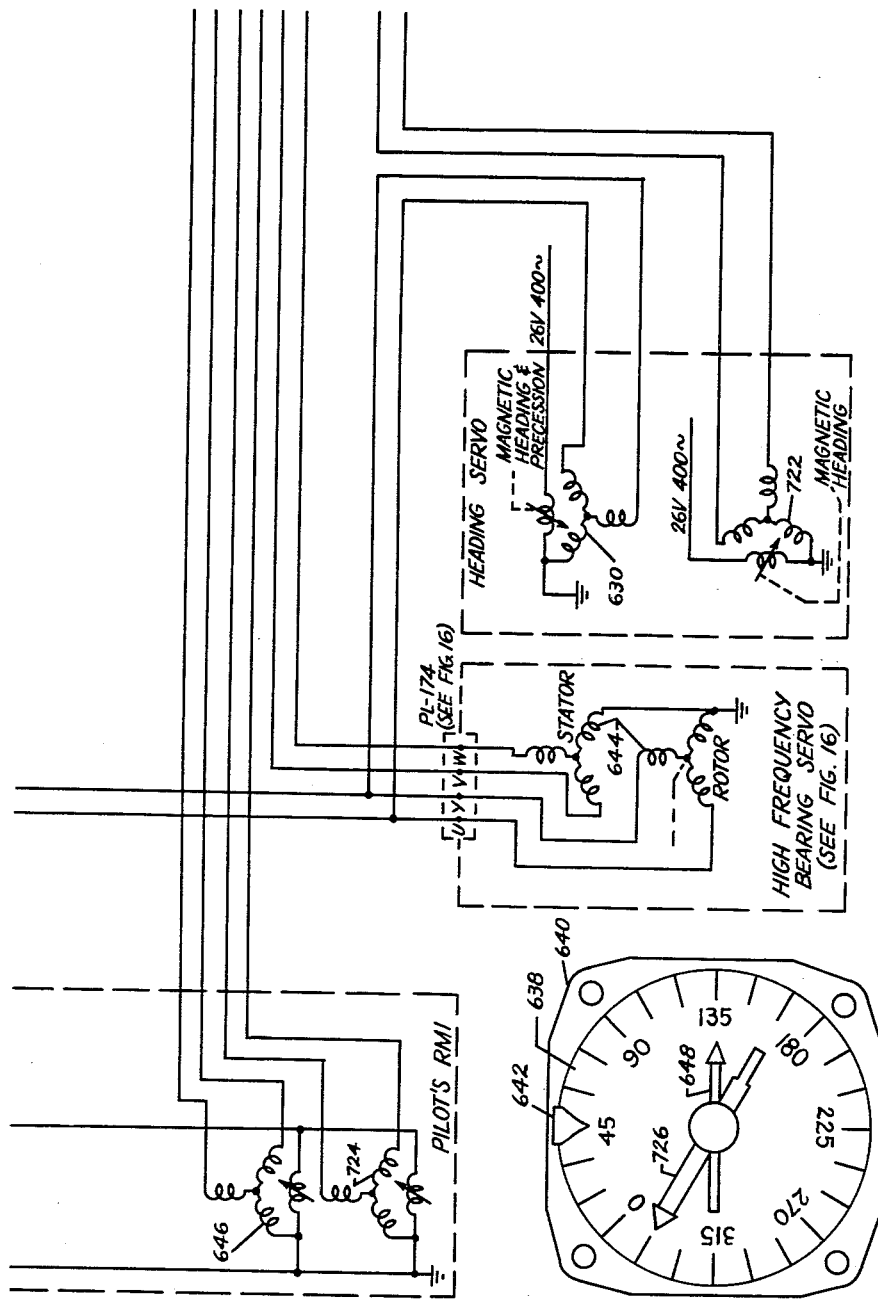

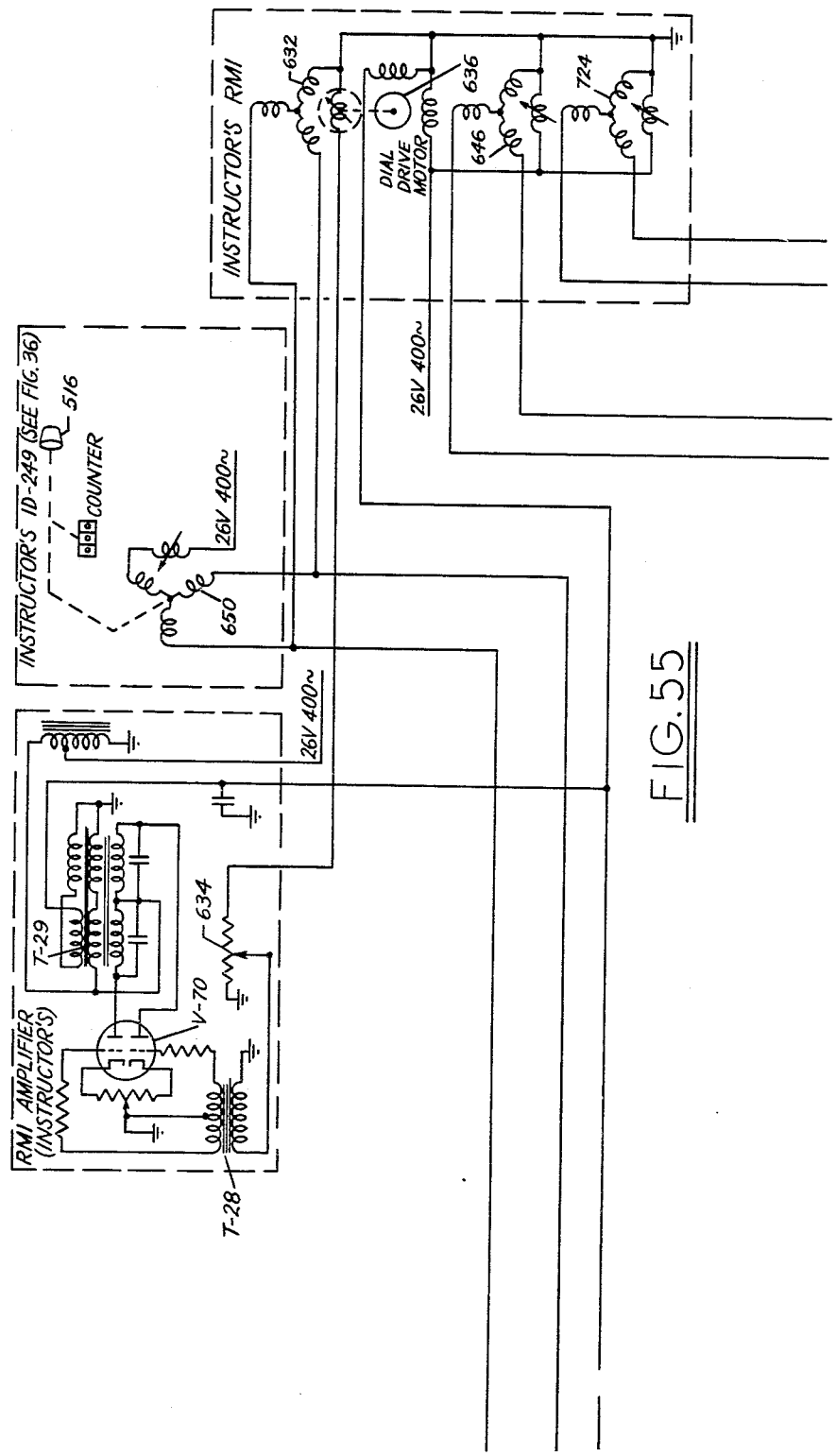

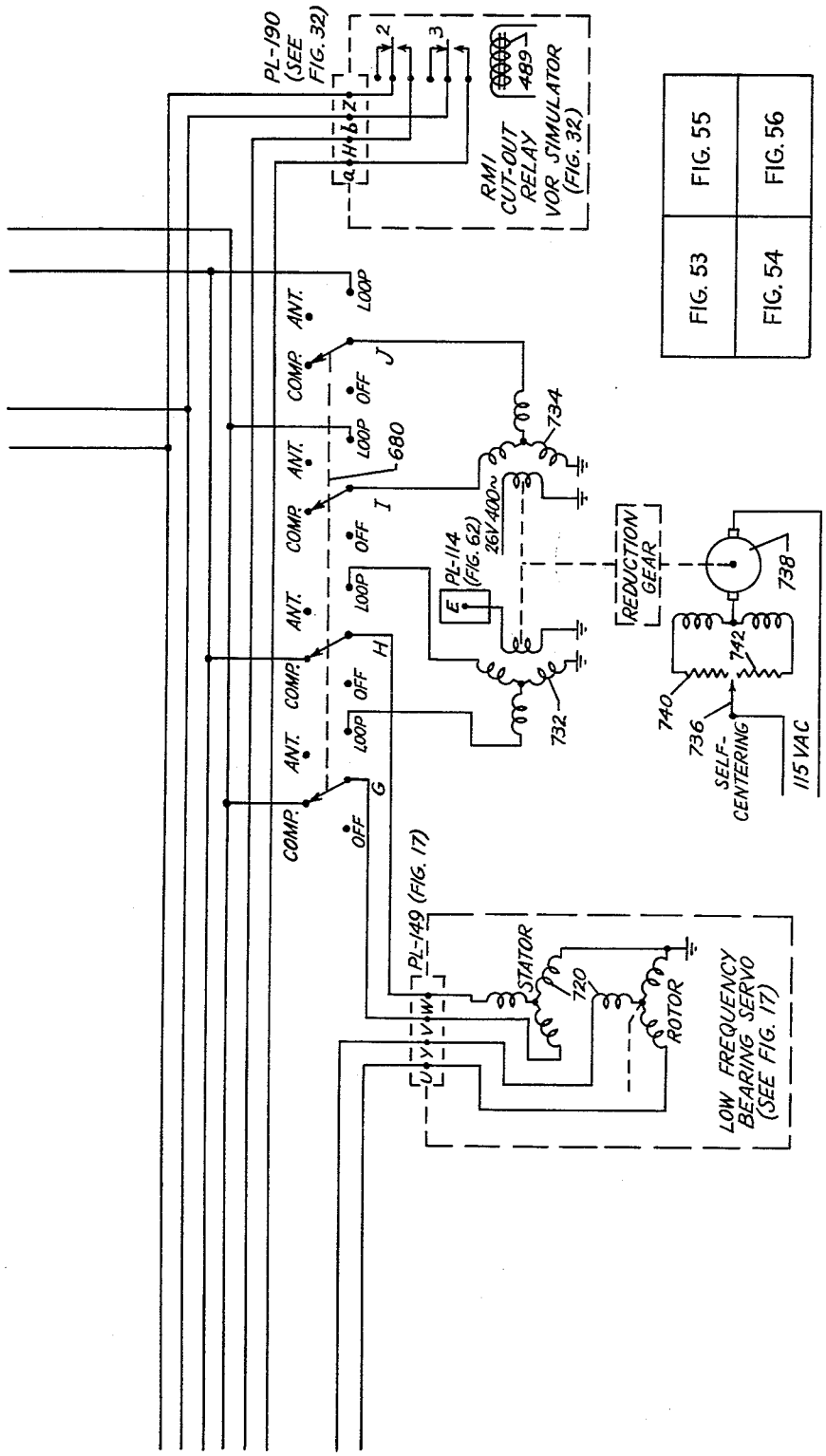

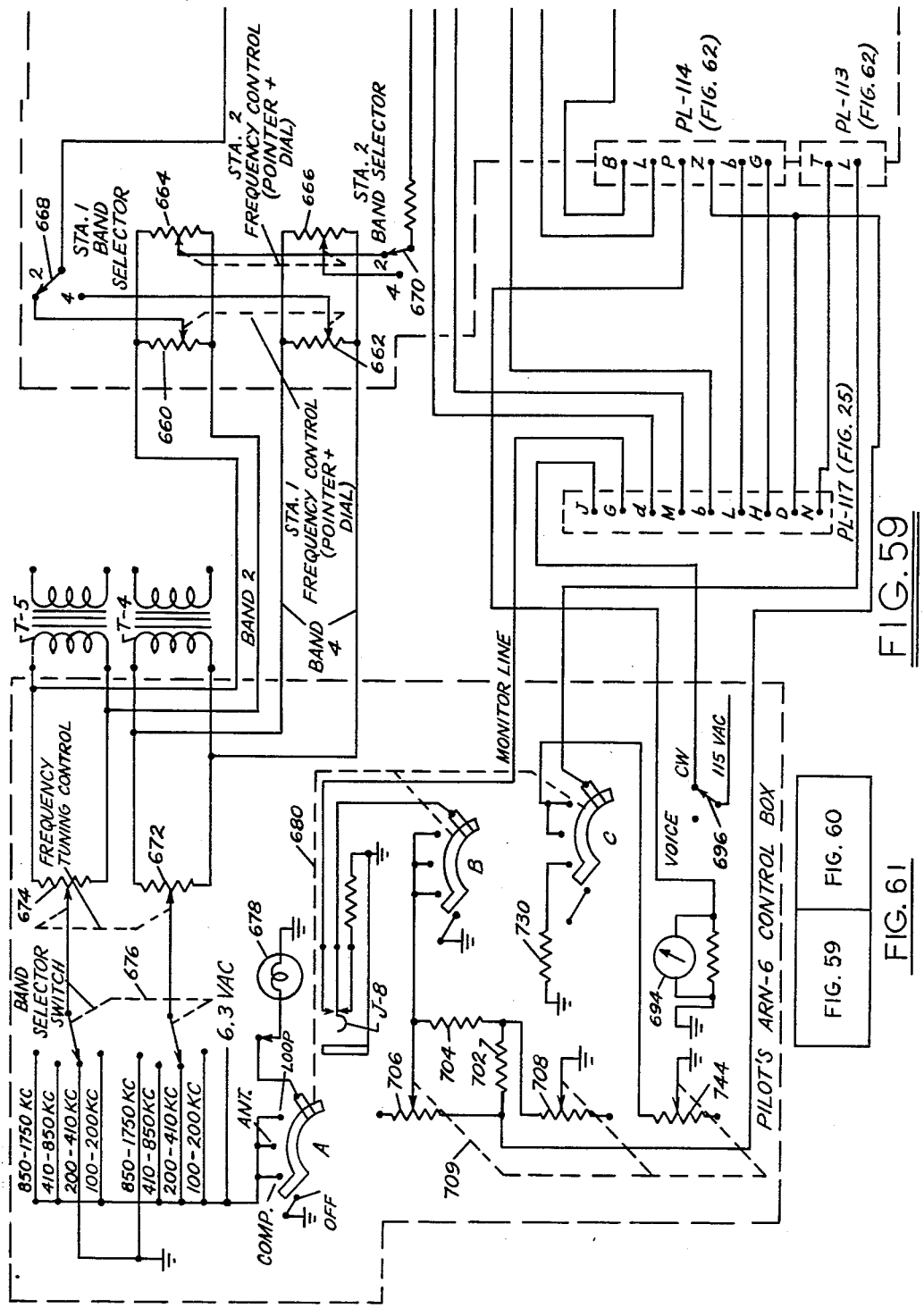

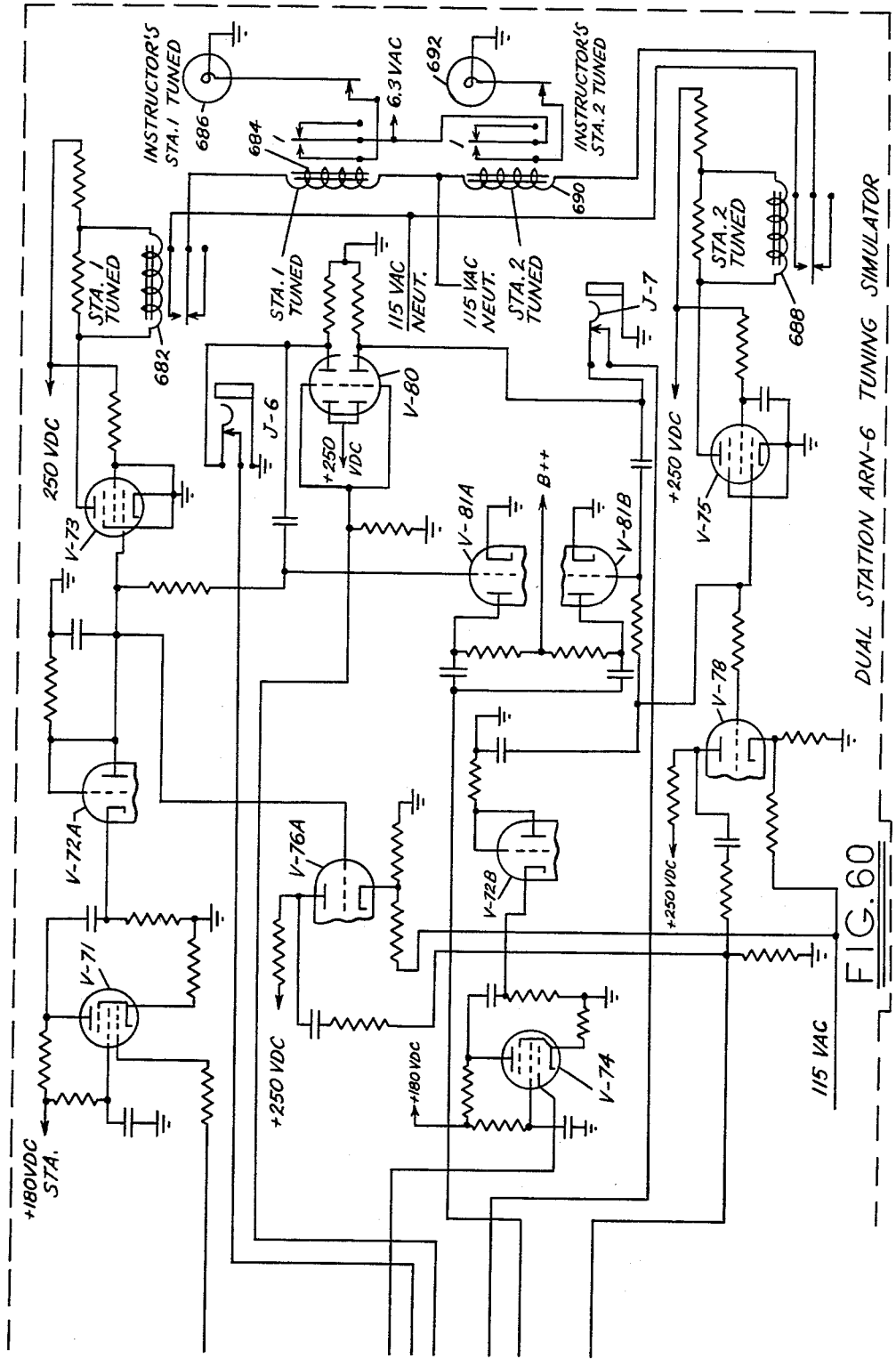

Aug. 23, 1955  F. COOPER, JR., ET AL  2,715,782
RADIO NAVIGATION TRAINER
Filed March 11, 1950  44 Sheets-Sheet 42

Aug. 23, 1955 F. COOPER, JR., ET AL 2,715,782
RADIO NAVIGATION TRAINER
Filed March 11, 1950 44 Sheets-Sheet 43

Aug. 23, 1955   F. COOPER, JR., ET AL   2,715,782
RADIO NAVIGATION TRAINER
Filed March 11, 1950   44 Sheets-Sheet 44

2,715,782

RADIO NAVIGATION TRAINER

Forrest Cooper, Jr., Milford, N. Y., and James Hicken, Seattle, Wash., assignors to Link Aviation, Inc., Binghamton, N. Y., a corporation of New York Application March 11, 1950, Serial No. 149,051

14 Claims. (Cl. 35—10.2)

This invention relates to grounded navigation training apparatus, and more particularly to grounded apparatus for teaching and practicing navigation of an airplane by means of the reception and interpretation of signals received from radio transmitting stations.

One of the primary methods of navigating aircraft is by the reception of signals from radio transmitting stations, the locations of which are shown on a map carried in the plane. By the operation of radio receivers in the plane, in diverse manners, the pilot or navigator of the plane obtains either visual and/or aural indications by the interpretation of which the location of the plane relative to the radio transmitting station, and consequently above the earth's surface, may be ascertained.

Grounded apparatus for teaching and practicing such navigation is well known to the art and because of its economy, in time and material, and the elimination of the hazards of airborne teaching such apparatus is currently in widespread use. Such apparatus comprises, generally, a unit which simulates or represents an airplane. This unit has a seat for the student positioned relative to which is an instrument panel with a complement of instruments simulating the aircraft performance instruments of a plane, such as the airspeed and vertical speed indicators, altimeter, magnetic compass, artificial horizon, etc., as well as indicators simulating the airborne instruments operated by radio signals, as the radio compass, left-right indicator, and glide path and localizer indicators. Also provided in the cockpit is a unit or units representing one or more radio receivers, having controls simulating the airborne radio receivers, and earphones for receiving simulated aural radio signals. Positioned relative to the seat are a throttle lever, control stick or wheel and rudder pedals, generally referred to as the primary controls. Between the primary controls and the aircraft performance instruments on the panel, i. e., the airspeed and vertical speed indicators, altimeter, magnetic compass, artificial horizon, etc., are interposed computing apparatus which cause the indicators to register assumed flight conditions according to the settings of the controls, just as would be the case in actual flight.

Located outside the cockpit at the instructor's station is a chart showing that portion of the earth's surface over which the simulated flight in the plane represented by the trainer is assumed to be taking place, and a recording element is moved over the chart to record the assumed track of the trainer as well as to indicate its instant assumed position above the earth's surface. The movement of this recording element is regulated by a computing unit having as its inputs the assumed airspeed and heading of the trainer and assumed speed and direction of movement of the air mass in which the apparatus is assumed to be travelling.

As the assumed location of the trainer above the earth's surface changes, so does its assumed location relative to the radio transmitting stations being simulated, and consequently means are provided for continuously changing the aural and/or visual indications in the trainer simulating the aural and/or visual indications given by the instruments in a plane operated by signals received from radio transmitting stations, so that the instruments in the trainer give the same indications that the corresponding instruments in a plane would give if the plane were flying at the location at which the trainer is assumed to be located. By giving such indications to the pilot in the trainer, he can ascertain his instant assumed position above the earth's surface and/or relative to the radio stations being simulated, and, having done so, by means of the primary flight controls in the trainer the assumed course of travel of the trainer may be regulated according to the nature of the simulated mission of the pilot.

The general object of this invention is to provide means for regulating the indications of those instruments in the trainer simulating airborne instruments operated by signals received from radio transmitting stations according to the instant assumed location of the plane or trainer above the earth's surface, and consequently relative to one or more radio stations being simulated, so that the said instruments give the same aural and/or visual indications as the corresponding airborne instruments would give if the plane carrying the airborne instruments were located at the instant assumed location of the trainer.

Aircraft carry distance measuring equipment (DME), the indicator of which is operated by the transmitter of a DME ground station to indicate (1) the distance to a VOR (very high frequency omni-directional radio range) station when the airborne receiving set is tuned to the station and the pilot has the apparatus set to fly to the station, (2) the distance to a selected destination when the receiving set is tuned to a VOR station and the plane is flying by means of an arbitrary course computer to a destination or in an orbit about a destination located at a distance from the VOR station, and (3) the distance to the touch-down point on the runway of an instrument landing system (ILS) station when the receiver is tuned to an ILS station. This operation presupposes, of course, that the VOR or ILS station has associated therewith a DME transmitter. However, under certain circumstances the DME indicator in the plane gives searching indications, as follows:

(1) When the receiver in the plane is turned "on" but not turned to VOR or ILS station, the DME indicator searches from zero to 100 miles, back to zero, etc.

(2) When the receiver in the plane is turned on and tuned to the frequency of a VOR or ILS station and the plane is more than 100 miles from the tuned in station, the DME indicator searches from zero to 100 miles, back to zero, etc., except when a course to a destination located at a distance from the VOR station is being followed, i. e., the arbitrary course computer is operative.

(3) When the receiver in the plane is turned on and tuned to a VOR station and an arbitrary course to a destination located at a distance from a VOR station is being flown, if the plane is more than 100 miles from the VOR station the DME indicator gives a search indication equal to the vector addition of the station to destination distance and of a vector constantly varied from zero to one hundred miles of the station to plane vector.

It is the principal object of this invention to provide in grounded navigation training apparatus means whereby a simulated DME indicator in the trainer may be operated as just outlined in the case of an airborne DME indicator in a plane, i. e., according to the assumed location of the trainer relative to the station, the type of station being simulated, whether simulated tuning to the station has been accomplished and according to the type of course being followed relative to the station.

Other objects of the invention will become apparent as the description proceeds.

In order that the entire system of the radio aids simulator of which the DME simulator covered hereby is a part may be clearly understood, subject matter claimed in the copending applications of James Hicken, Serial Number 149,053, filed March 11, 1950, for which Patent 2,685,747 issued August 10, 1954; and Burton L. Frankel, Leo Loiterman, and James Hicken, Serial Number 149,052, filed March 11, 1950 for which Patent 2,709,308 issued May 31, 1955, is disclosed herein. Such subject matter includes: (1) a novel unit for computing and recording the instant assumed range and bearing of the trainer from the radio stations being simulated, (2) a system for simulating the operation of an airborne course deviation indicator, radial selector and ambiguity resolving indicator in conjunction with a VOR station and arbitrary course computer operation, (3) a system for simulating the operation of an airborne course deviation indicator when flying the localizer beam of an ILS station, (4) the operation of a radio magnetic indicator, (5) a system for simulating the operation of a glide path indicator when flying the glide path beam of an ILS station, and (6) a system for simulating the operation of an airborne radio navigation unit comprising a radio compass operated by signals received from low frequency radio transmitters.

Reference is made to the accompanying drawings, wherein:

Fig. 1 is a front view of the ground position recorder.

Fig. 2 is a detail view of parts of the apparatus of Fig. 1.

Fig. 4 is a view of the north-south drive assembly.

Figs. 4A, 4B and 4C, 5 and 6 are views of parts of the apparatus shown in Fig. 4.

Figs. 7 and 8 are detail views of the recording indicating element and associated parts.

Figs. 13 and 14 are wiring diagrams of a portion of the station tuning simulators.

Figs. 15 and 16 are wiring diagrams of the high frequency (ARN-14) bearing servo amplifier and servo.

Fig. 17 is a wiring diagram of the low frequency (ARN-6) bearing servo and amplifier.

Fig. 18 is a view of the high frequency bearing voltage isolation amplifier.

Fig. 19 is a view showing the manner in which Figs. 11 to 18 may be assembled to form a single composite wiring diagram.

Figs. 20 to 23A are wiring diagrams of the instructor's controls for selecting the frequency of an ILS or VOR station, of the pilot's controls for performing simulated tuning to the frequency, and associated apparatus.

Fig. 24 is a view showing the manner in which Figs. 20 to 23 may be assembled to form a single composite wiring diagram.

Figs. 25 to 29 are wiring diagrams of the voice facilities and call letters systems in the trainer.

Fig. 30 is a view showing the manner in which Figs. 25 to 29 may be assembled to form a single composite wiring diagram.

Figs. 32 to 35 are wiring diagrams of parts of the VOR and localizer simulator, the arbitrary course (R$\theta$) controls, the ID-249 indicator, and associated circuits.

Fig. 36 is a view of the ID-249 indicator.

Fig. 37 is a view of the arbitrary course (R$\theta$) controls in the cockpit of the trainer.

Figs. 39 to 44 are wiring diagrams of the distance measuring equipment simulator.

Figs. 45 and 46 are wiring diagrams of the self-synchronous receivers of the instructor's and pilot's DME indicators.

Fig. 47 is a view of the DME indicator.

Fig. 48 is a view showing the manner in which Figs. 39 to 44 may be assembled to form a single composite wiring diagram.

Figs. 49 to 51 are wiring diagrams of the glide path simulator.

Fig. 52 is a view showing the manner in which Figs. 49 to 51 may be assembled to form a single composite wiring diagram.

Figs. 53 to 56 are wiring diagrams of the radio magnetic indicator system.

Fig. 57 is a view of a radio magnetic indicator.

Fig. 58 is a view showing the manner in which Figs. 53 to 56 may be assembled to form a single composite wiring diagram.

Figs. 59 and 60 are wiring diagrams of the low frequency tuning systems.

Fig. 61 is a view showing the manner in which Figs. 59 and 60 may be assembled to form a single composite wiring diagram.

TRAINER GROUND POSITION COMPUTER AND RECORDER

(See Figs. 1–9)

Figure 3:
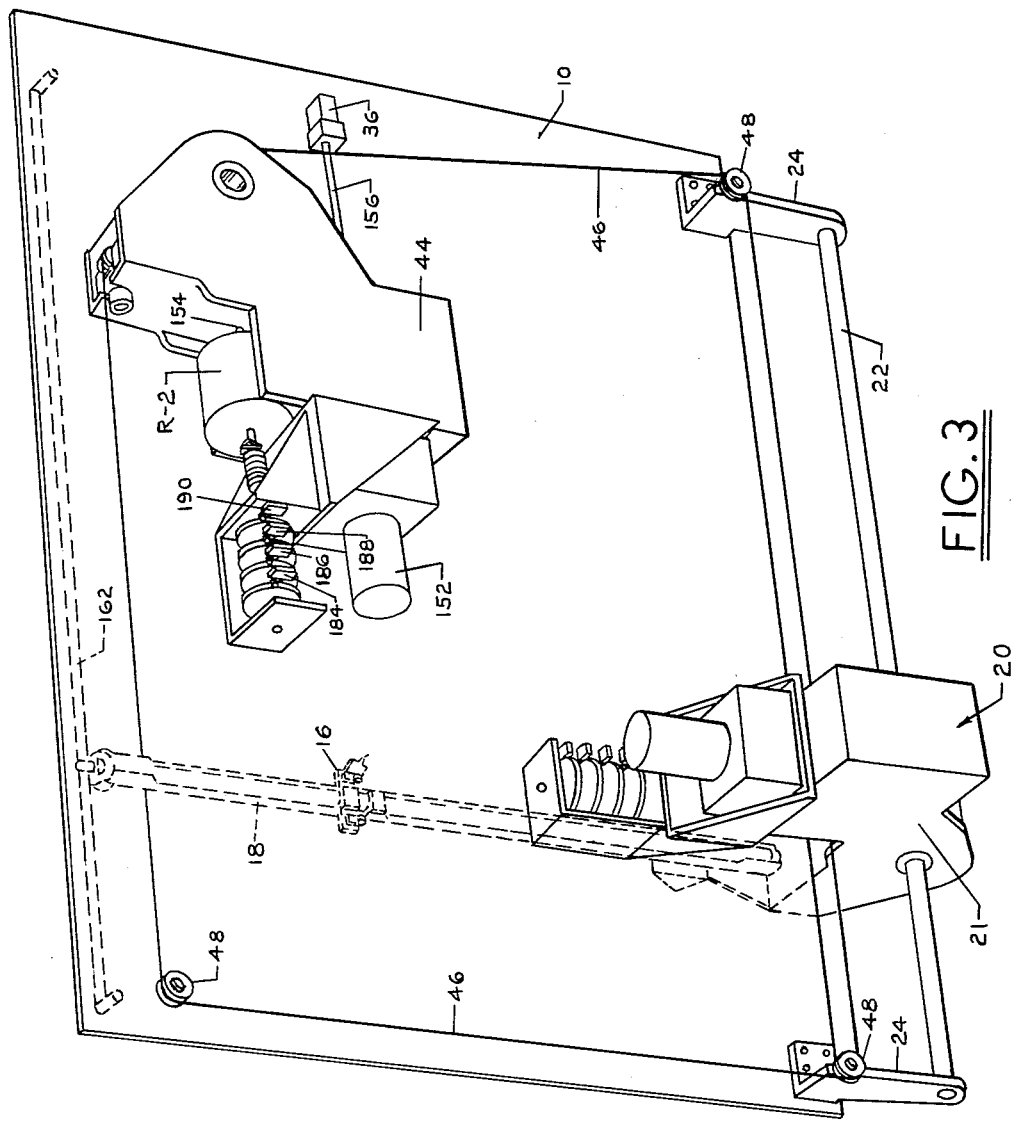
Fig. 3 is a rear view of the ground position recorder.
Figure 9:
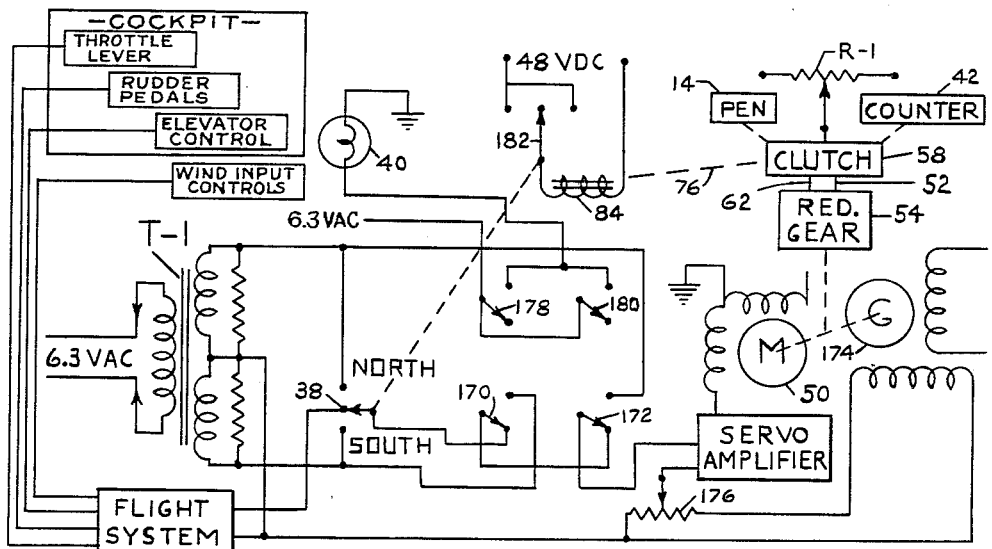
Fig. 9 is a wiring diagram of ground position recorder.

The ground position recorder comprises a rectangular rigid surface 10 (Fig. 1) having a slight recess in which is placed a chart 12 over which is placed a transparent record-receiving surface such as a plastic sheet 13. Pen 14 records on sheet 13 the assumed course of travel of the plane represented by the trainer over that portion of the earth's surface shown on chart 12, and the position of pen 14 relative to chart 12 indicates the instant assumed geographical position of the plane represented by the trainer. The chart shows the locations of the radio stations to be simulated. A suitable type of chart is the standard aeronautical radio direction finding chart, type DF. The transparent member 13 has inscribed thereon in the lower left corner a pair of mutually perpendicular lines the intersection of which mark the selected zero-zero Cartesian coordinates. The pen 14 is carried by a carriage 16 which travels upward or downward relative to arm 18 to indicate and record travel of the trainer north and south, respectively, relative to the zero North-South (N-S) Cartesian coordinate. The lower end of arm 18 is rigidly held by a North-South (N-S) drive assembly 20 which is moved to the right or left along a rod 22 fixedly held by stationary brackets 24 to indicate and record travel of the trainer east and west, respectively, relative to the zero East-West (E-W) Cartesian coordinate.

The left margin of board 10 carries an E-W limit warning light 32 (Fig. 2); an E-W reset switch 34, a miles east counter 36 which indicates the miles east of the zero E-W Cartesian coordinate of the pen 14 according to the scale of the chart 12; a N-S reset switch 38; and a N-S limit warning light 40. The lower end of arm 18 carries a miles north counter 42 which indicates the miles north of the zero N-S Cartesian coordinate of the pen 14 according to the scale of the chart.

Affixed to the back of the board 10 is the E-W drive assembly 44 (Fig. 3) which reversibly drives the flat Phosphor bronze belt 46 which travels on pulleys 48 and which is attached to the frame 21 of the N-S drive assembly 20 to slide the same along rod 22 to indicate and cause pen 14 to record E-W travel of the trainer.

The N-S drive assembly 20, Fig. 4, is identical with the E-W drive assembly 44 except as has been or will be pointed out, and consequently a detailed description of the N-S drive assembly 20 only will be given. The assembly 20 comprises a variable speed phase responsive motor 50 which drives a first output shaft 52 through reduction gears contained in housing 54. A first driving clutch member 56 is affixed upon the left end of shaft 52 for driving a double-faced clutch member 58 which is splined upon a shaft 60 coaxial with shaft 52.

A second output shaft 62 is driven by motor 50 through the gears in housing 54, this shaft driving gears 64 and 66, shaft 68 and gears 70 and 72. The gear 72 is affixed to a second driving clutch member 74 rotatably mounted on shaft 60 for driving the double-faced clutch member 58. A bell crank 76 is pivoted at 78 and carries a roller 80 which engages the double-faced driven clutch member 58 to position it to be driven by one or the other of the driving clutch members 56 or 74. Tension spring 82 positions the said roller so that member 56 drives member 58 at a given speed when solenoid 84 is deenergized, and when the solenoid is energized the bell crank and roller are positioned so that clutch member 74 drives member 58 at a much higher rate. Member 58 drives output shaft 60. The driving connection from motor 50 through shaft 52 is employed for normal operation, and the driving connection through shaft 62 is employed for resetting the apparatus.

Affixed upon the left end of shaft 60 is a spur gear 86 which drives the split, anti-back-lash gear 88 biased by spring 89. Gear 88 is affixed upon a shaft 90 which positions the rotor of a N-S trainer position potentiometer R-1 which preferably is a spiral-wound potentiometer having several turns, e. g., fifteen. A suitable potentiometer is marketed under the trade name of "Resomax," manufactured by Link Aviation, Inc., of Binghamton, New York. Another potentiometer which may be employed is marketed under the trade name "Helipot."

Affixed upon the left end of shaft 90 is gear 94 which drives gear 96, shaft 98 and gear 100 which in turn drives a split, spring-biased anti-back-lash gear 102 (Fig. 5) affixed upon a sleeve 104 which in turn has affixed thereupon a drive drum 106. Sleeve 104 and drum 106 are rotatably mounted upon a hollow rod 108 held by frame member 21. Drum 106 has a continuous spiral rib 112 extending around its surface several times thereby defining a continuous corresponding spiral groove in which rests the Phosphor bronze belt 46. The ends of the belt 46 are attached to the drum 106 by pins 114, and the belt is wound around the drum in the groove and over pulleys 116, 118 and 120. A rod 122 covered by arm 18 is affixed by pin 124 to the frame 21 of the N-S drive unit 20, and slidably mounted upon rod 122 is the carriage 16 which carries the pen 14. Carriage 16 is attached to the belt 46 by set screws 127 (Fig. 7) and plate 127a.

A roller 126 (Fig. 5) is carried by rod 128 which is held by frame 21, roller 126 being in substantially the same vertical plane as the pulleys 116 and 118 and positioned in the spiral groove in the drive drum 106. As the drum 106 is driven by shaft 60 and intermediate elements, roller 126 slides the drum, sleeve 104 and gear 102 axially of rod 108, thereby maintaining the portion of the belt 46 between the pulleys 116 and 118 and the drum 106 in substantially the same vertical plane. The rotation of the drum changes the position of the pen 14 with respect to the zero N-S Cartesian coordinate.

Also affixed upon the shaft 60 is gear 136 which drives gear 138, shaft 140, gears 142 and 144, shaft 146 and gears 148 which in turn drive the N-S miles counter 42 (Fig. 6) which has three digital cylinders operated in a conventional manner and indicates the distance in miles according to the scale of the chart of the location of the pen 14 above, or north, of the zero Cartesian coordinate N-S axis.

Consequently, the N-S drive motor 50 drives the shaft 60 which positions the pen 14 above the zero N-S zero Cartesian coordinate axis according to the input to motor 50, drives the counter 42 to indicate the distance in miles according to the scale of the chart of the position of the pen 14 above the zero N-S Cartesian coordinate axis, and also positions shaft 90 and the arm of the N-S trainer position potentiometer R-1 in corresponding position.

Shaft 250 (Fig. 4) is also driven by shaft 90 with the arm of potentiometer R-1, and affixed upon the shaft 250 are two arms 252 and 254 (see Figs. 4A, 4B and 4C) each carrying a stud 256 or 258. A first washer 260 having an arm 262 is freely mounted upon shaft 250 as are a plurality of adjoining washers 264 each having a peripheral extension 266 turned toward the first washer 260. Stop 268 retains the washers on the shaft. Coaxial with shaft 250 is shaft 270, the left end of which has affixed thereupon arm 272 carrying stud 274. The lower end of arm 272 carries the upper end of spring 276, the lower end of which is connected to stud 278. Affixed upon shaft 250 are the four cams 280, 282, 284 and 286 each of which operates the respective switches 170, 172, 178 and 180.

As the shaft 90 drives the arm of potentiometer R-1, shaft 250 is also rotated, and stud 256 or 258 engages arm 262 of washer 260, rotating the same in a direction depending upon the assumed direction of travel of the trainer and consequent direction of rotation of shaft 250. Arm 262 engages the extension 266 of its adjacent washer 264, and the said extension of washer 264 engages the extension of the adjacent washer, etc., until the extension of the last washer engages the stud 274 of arm 272, thereby rotating shaft 270 and the cams carried thereby. The system is arranged so that when pen 14 and potentiometer R-1 reach their limits of travel in the north direction cams 280 and 284 operate switches 170 and 178, and when pen 14 and potentiometer R-1 reach their limits of travel in the south direction cams 282 and 286 operate switches 172 and 180. A pair of stops 298 are provided to limit the travel of arm 272.

The E-W drive unit 44 is substantially identical with the N-S drive unit 20, comprising the E-W drive motor 152 (Fig. 3) which drives the belt 46 through a drum arrangement like that described to position the N-S drive unit 20 horizontally along rod 22, thereby moving the pen 14 relative to the zero E-W Cartesian coordinate. Motor 152 also drives the shaft 154 to position the arm of the E-W trainer position potentiometer R-2, and motor 152 drives shaft 156 which drives the counter 36 which indicates the miles east of the zero E-W Cartesian coordinate of the pen 14 according to the scale of the chart.

The upper end of rod 122 (Fig. 4) carries a roller 158 which rests upon the upper margin of board 10, as well as the stud 160 which is positioned under rod 162 (Fig. 1) to retain arm 18 in position.

The trainer ground position computer and recorder comprises two identical electrical circuits for E-W and N-S operation, and consequently only the N-S circuit will be described. A voltage from the flight system (Fig. 9) is employed to control the operation of the N-S drive motor 50. This voltage is of a given phase for assumed north travel of the trainer and 180 degrees removed therefrom for assumed south travel, and has an amplitude directly proportional to the instant assumed speed of travel of the trainer over the earth's surface in the N-S direction, which speed depends upon the assumed air speed of the trainer modified by assumed wind conditions. The flight system is responsive to the throttle lever, rudder pedals, and elevator control as well as to the wind input controls, all well known in the art. One side of the line from the flight system is normally connected through the N-S reset switch 38, a north limit switch 170 and a south limit switch 172 to the conventional type servo amplifier while the other side of the line is connected through the feedback winding of the generator 174 and the feedback rate adjust potentiometer 176 to the servo amplifier. The servo amplifier energizes the motor 50 to drive the same in one direction or the other according to whether the phase of the voltage from the flight system corresponds to north or south assumed trainer travel, and the motor 50 is operated at a speed depending upon the amplitude of the voltage which is proportional to the rate of trainer travel in the north or south direction. The rotor of generator 174 is coupled to the rotor of the motor, and generates a phase in opposition to the voltage from the flight system, thereby eliminating oscillation and overdrive of motor 50. The output shaft 52 is schematically shown as driving into the gear-box 54 which drives the clutch 58 through the two shafts 52 and 62, the clutch in turn driving the counter 42, the arm of potentiometer R-1 and the pen 14. Motor 50 functions as an integrator, combining the factors of speed and time, to drive the three units from an initial position corresponding to the assumed point of departure of the trainer to positions representative of the instant assumed position of the trainer above the earth's surface. The position of pen 14 relative to chart 12 indicates, at the time of commencement of the trainer's simulated flight, the point of departure, and thereafter continuously indicates the instant assumed position of the trainer above the earth's surface and pen 14 records on plastic sheet 13 the assumed course of flight of the trainer.

As previously explained, when the arm of potentiometer R-1 reaches the limit of its travel in the north direction, the north limit switch 170 is operated and the circuit from the flight system to the servo amplifier is switched and a voltage having the phase required to energize motor 50 to drive in the south direction is applied from transformer T-1 through switch 170 to the servo amplifier. The motor drives in the south direction until switch 170 is returned to its normal position, and in the presence of the same voltage from the flight system, the unit will again drive in the north direction until switch 170 is again actuated, etc. Whenever the north limit switch 170 is displaced from its normal position, the north limit switch 178 is also displaced from its normal position, applying 6.3 v. A. C. to the N-S limit warning light 40, thereby indicating to the instructor that the limit of recorder travel has been reached.

When the arm of potentiometer R-1 reaches the limit of its travel in the south direction, the south limit switch 172 is switched from its normal position, breaking the circuit from the flight system to the servo amplifier and applying a voltage having the required phase to drive motor 50 in the north direction to the servo amplifier. Subsequent operation is like that just described in connection with the switch 170. Switch 180 is actuated with switch 172, and 6.3 v. A. C. is applied through switch 180 to lamp 40 whenever switches 172 and 180 are displaced from their normal positions. All A. C. voltages mentioned herein are 60 cycle, unless otherwise stated.

By placing the N-S reset switch 38 in the "north" or "south" reset position, the voltage from the flight system is interrupted and a voltage having the phase required to drive motor 50 in the north or south direction, respectively, is applied to the servo amplifier. When switch 38 is so operated, switch 182 is positioned to apply 48 v. D. C. to the solenoid 84 (see Fig. 4) which is energized and through the bell crank 76 operates the clutch 58 to disengage the driven clutch member 58 from the normal drive shaft 52 and to engage member 58 to be driven by high speed shaft 62. Consequently, as when positioning the apparatus before the simulated flight in the trainer to the proper settings corresponding to the selected point of departure, the apparatus may be quickly placed in any desired position.

As stated, the E-W circuit is identical with the described N-S circuit, and applies a voltage of a given phase from the flight system to its servo amplifier and motor 152 (Fig. 3) when the trainer is assumed to be travelling east, and a phase 180 degrees removed therefrom when the trainer is assumed to be travelling west. In both cases, the amplitude of the applied voltage is directly proportional to the assumed rate of travel of the trainer in the east or west direction. The limit switches 184, 186, 188 and 190, limit warning light 32 and reset switch 34 all operate as their counterparts of the N-S system.

Consequently, two distinct directions of movement (N-S and E-W) are imparted to the pen 14, the resultant of which moves the pen to record the assumed course of travel of the plane represented by the trainer over the earth's surface as shown on the chart, the position of the pen at any instant indicating the instant assumed location of the plane over the earth's surface and relative to the radio stations being simulated, the location of which are shown on the chart.

The pen carriage 16 (Figs. 7 and 8) comprises two main sections 287 and 288 held together by sleeve 289. Section 288 carries a pair of castered wheels 290. Affixed to the left end of section 288 is block 291 in the lower surface of which is a slot in which is pivoted the pen block 292 by means of pivot 293. Spring 294 biases block 292 to engage the point of pen 14 with the sheet 13. Pen 14 is held in a bore in block 292 by clips 295 and is filled through opening 296.

STATION LOCATOR

The station locator comprises a panel 200 (Fig. 10) preferably located near the recorder for ready access by the instructor, upon which panel are located a "station one-miles north" control knob 202 fixed upon the shaft 204 upon which is also mounted the arm of the station one N-S potentiometer R-3. Gear 206 is also affixed upon shaft 204 and drives gear 205, shaft 207, gears 208 and 209, shaft 211 and "station one-miles north" counter 210 which is of the same type as that disclosed above in connection with the ground position recorder. As knob 202 is rotated, the arm of potentiometer R-3 is moved relative to the stator, and the reading of counter 210 correspondingly changes so that the reading of the counter 210 always corresponds to the position of the potentiometer arm. "Station one-miles east" control knob 212 similarly positions the arm of station one E-W potentiometer R-5 and "station one-miles east" counter 214; "station two-miles north" control knob 216 similarly positions the arm of station two N-S potentiometer R-4 and "station two-miles north" counter 218; and "station two-miles east" control knob 220 similarly positions the arm of station two E-W potentiometer R-6 and "station two-miles east" counter 222. In setting up station one prior to simulated flight in the trainer, the instructor positions knob 202 so that counter 210 indicates the distance in miles of the location of the station one being simulated north of the zero N-S Cartesian coordinate on the chart, and the instructor positions knob 212 so that counter 214 indicates the distance in miles of the location of the same station east of the zero E-W Cartesian coordinate on the chart. The knobs 216 and 220 are set in similar fashion for station two. Any radio station on the area covered by the chart which it is desired to simulate may be "station one" or "station two."

TRAINER-STATION RANGE-TRUE BEARING COMPUTERS

*(See Figs. 11–19)*

For the computation of the assumed relative true bearing and range between the assumed instant geographical location of the trainer and the assumed location of each radio station being simulated, a two phase reference voltage is used, this voltage being obtained by applying the output of a three phase generator to a Scott T-connection transformer comprising transformers T-4 and T-5. The two voltages in the secondaries of these transformers are phased 90 degrees to each other.

Assuming that the coordinate selector switch 224 of the station locator and relative position computer is in its central position, wherein both stations one and two are set up as previously described with reference to the 0—0 coordinate of the recorder chart, one phase of the said two phase voltage is obtained from the 115 v. A. C. winding F of the North-South (N-S) transformer T-4 and excites the N-S trainer position potentiometer R-1 of the ground position recorder, the station one N-S potentiometer R-3 and the station two N-S potentiometer R-4, all three of said potentiometers being in parallel with the source voltage. The other phase of the two phase voltage is obtained from the 115 v. A. C. winding F of the East-West (E-W) transformer T-5 which excites the E-W trainer position potentiometer R-2 on the ground position recorder, the station one E-W potentiometer R-5 and the station two E-W potentiometer R-6, Fig. 12. The relative arrangement is the same as for the N-S potentiometers.

The arms of the potentiometers R-1 and R-2 are grounded; the arm of station one E-W potentiometer R-5 is connected to the right grid of station one cathode follower tube V-1; the arm of station one N-S potentiometer R-3 is connected to the left grid of V-1; the arm of station two E-W potentiometer R-6 is connected to the right grid of station two cathode follower V-2; and the arm of station two N-S potentiometer R-4 is connected to the left grid of V-2. Each of the cathode followers is the input of a cathode vectorial addition circuit.

As the position of the arms of the N-S and E-W trainer position potentiometers R-1 and R-2 change according to changes in the assumed location in flight of the trainer, as explained above, the amplitude of the voltage between the arm of any selected one of the station potentiometers and ground will be directly proportional to the assumed distance of the trainer along a Cartesian axis (N-S or E-W) from the selected assumed location of the station in question. (For example, the respective voltages on the left and right grids of V-1 are proportional to the assumed distance of the trainer from station one along the N-S and E-W axes, respectively.) The phase of the said voltage will be of a given phase or 180 degrees removed therefrom depending upon whether the trainer is assumed to be North or South of the station, in the case of the N-S station potentiometers and the left grid of V-1, or East or West of the station, in the case of the E-W station potentiometers and the right grid of V-1.

The cathode vectorial addition circuit comprising V-1 is identical with that comprising V-2, and V-1 performs the dual functions of isolating the applied N-S and E-W trainer-station one voltages and providing a constant source impedance for its associated addition circuit which comprises the equi-value resistors 240, the potentiometer 242 and resistor 244. The cathode bias resistors 246 are connected to the negative D. C. supply so that a voltage up to a certain amount, e. g., 50 volts, may be applied to the grids without driving them above cathode potential causing grid current to be drawn. The resistors 248 provide protection for the tubes to reduce the grid current drawn when the grids are above ground. The negative current feed-back provided in the resistors 246 renders the circuits relatively immune from variations in tube characteristics.

The cathode vectorial addition circuits effect a vector addition of the respective station one and station two input voltages producing an output voltage which is the vector sum of the input voltages, the amplitude of the output voltage being directly proportional to the assumed straight line distance or range of the trainer from the station in question, and the phase thereof with respect to the reference phase of transformer T-4 being dependent upon the assumed bearing of the trainer from the station, or assumed bearing of the station from the trainer, depending upon whether the voltage is later shifted through 180 degrees, as will become apparent. The said bearing is a true bearing, since it is measured from True North, and any voltage having the same phase is hereinafter referred to as the "trainer-station true bearing voltage." When the phase of the voltage out of V-1 or V-2 is in phase with T-4, the trainer-station bearing may be considered as zero, i. e., the trainer is due south of the station. The output voltage from V-1 or V-2 is referred to as the "trainer-station range-true bearing voltage" of the station in question. The trainer-station one range-true bearing voltage from V-1 is applied to the grids of isolation tube V-3, the output of which is stepped up by transformer T-1 to provide the proper required trainer-station one range-true bearing voltage. The trainer-station two range-true bearing voltage from V-2 is applied to the grids of isolation tube V-4, the output of which is stepped up by transformer T-2 to provide the required trainer-station two range-true bearing voltage. The amplitude of the trainer-station range-true bearing voltages may vary according to any desired increment, e. g., .08 volt per mile of range.

Figure 12:
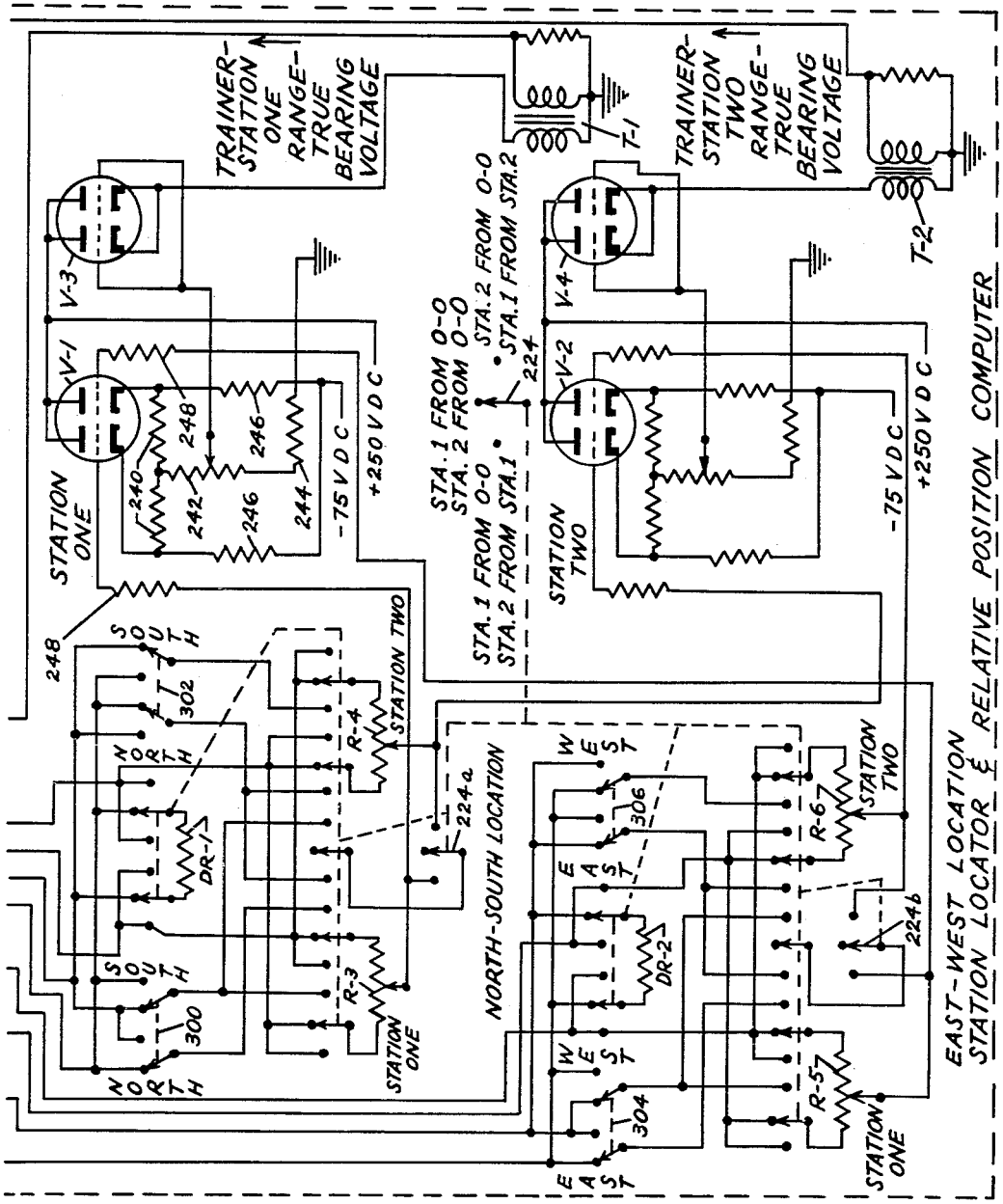
Figure 20:
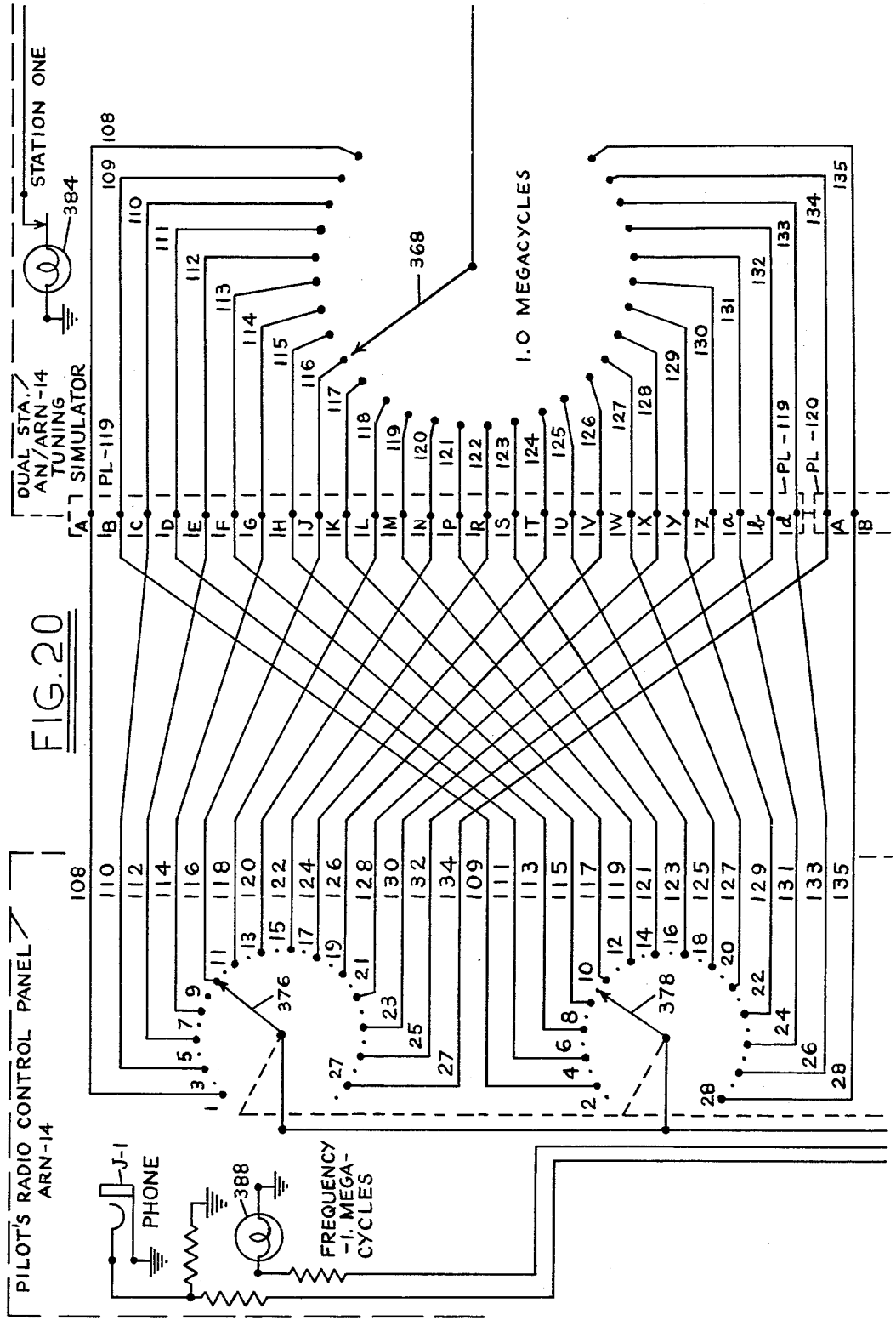
Figure 26:
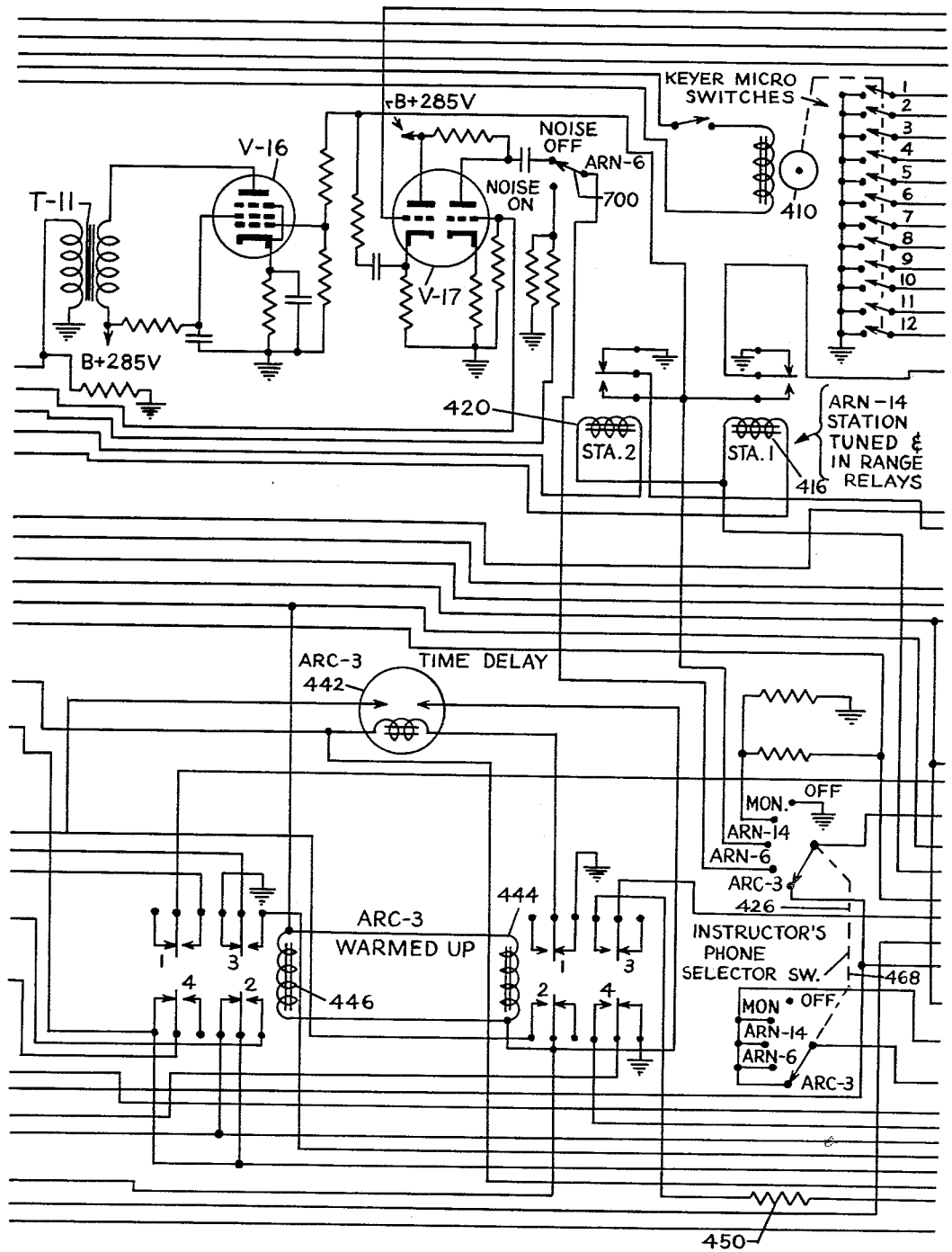
Figure 27:
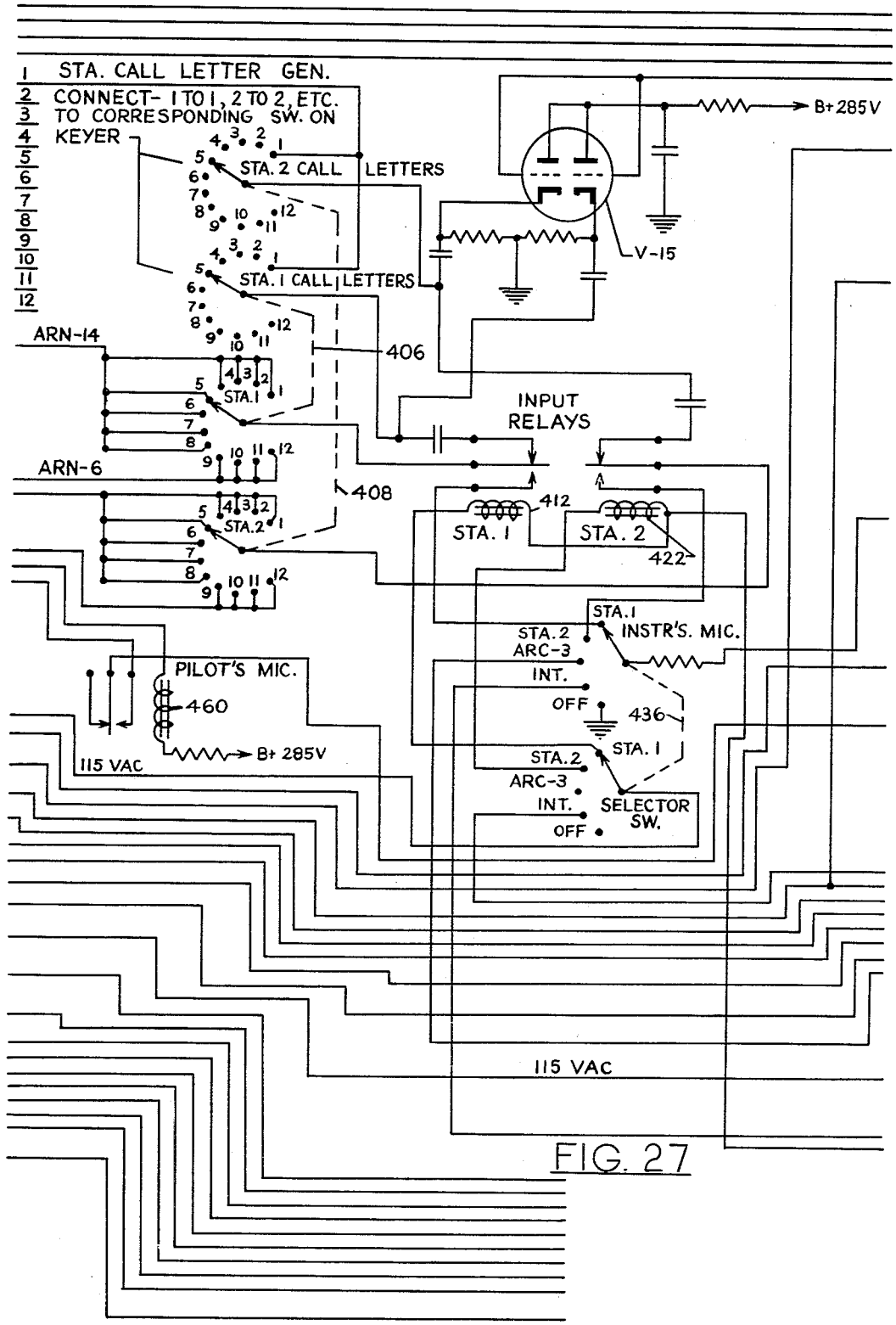
Figure 28:
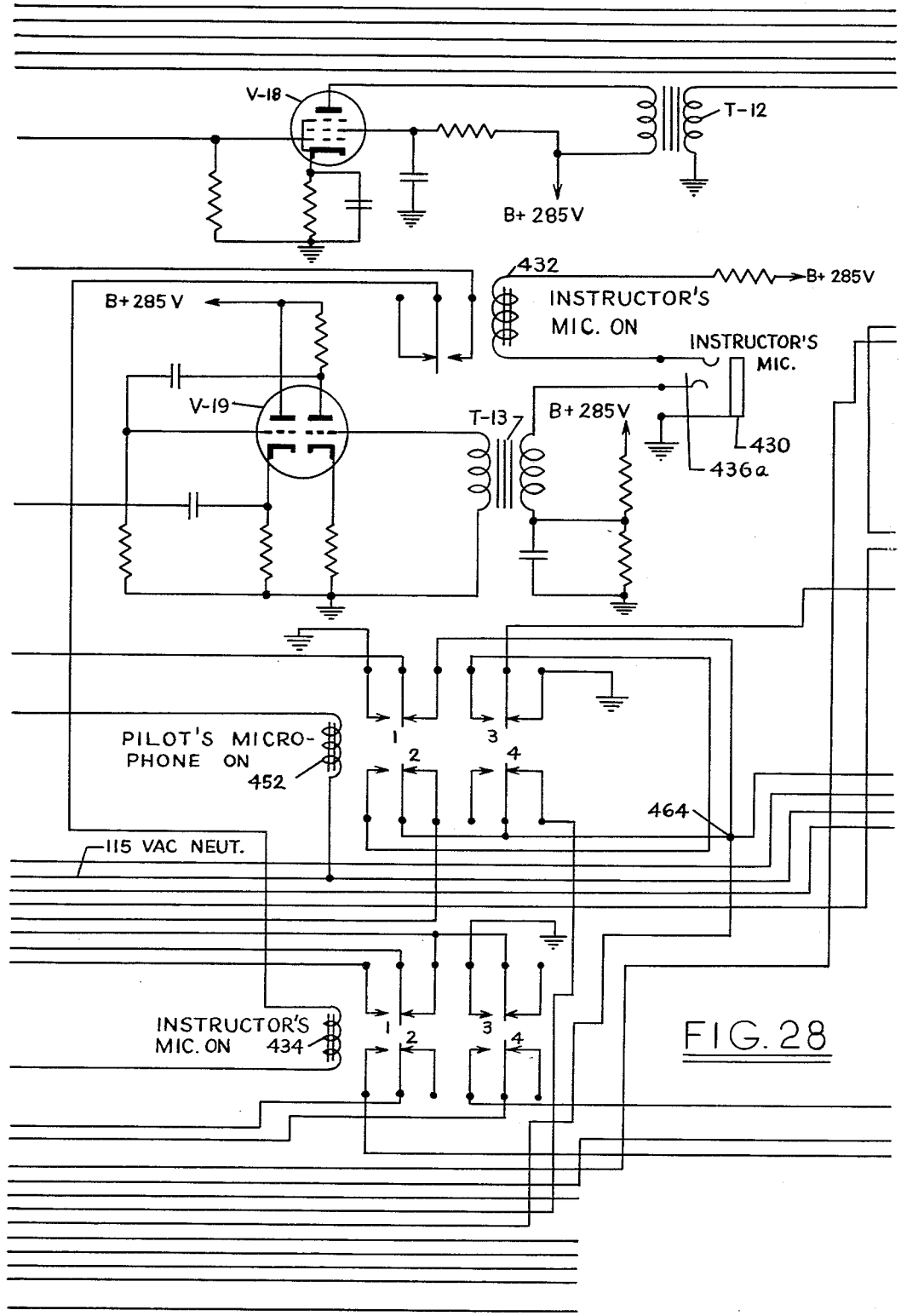

When both station one and station two are referenced to the 0—0 coordinate on the recorder chart, station coordinate selector switch 224 is located as shown in Fig. 12 and the dummy load resistor DR-1 is placed across the 11.5 v. A. C. winding C of transformer T-4 and dummy load resistor DR-2 is placed across the 11.5 v. A. C. winding C of transformer T-5. The positions of N-S switches 300 and 302 and of E-W switches 304 and 306 are immaterial, because of the position of switch 224. However, when the two radio stations being simulated are located relatively close to one another, e. g., within 75 miles, the following procedure may be employed:

The relative station locations are assumed as follows:

|  | Miles North of N-S Co-ordinate Zero | Miles East of E-W Co-ordinate Zero |
| --- | --- | --- |
| Station One | 110 | 200 |
| Station Two | 90 | 230 |

It is further assumed that station two is being located relative to station one.

Figure 10:
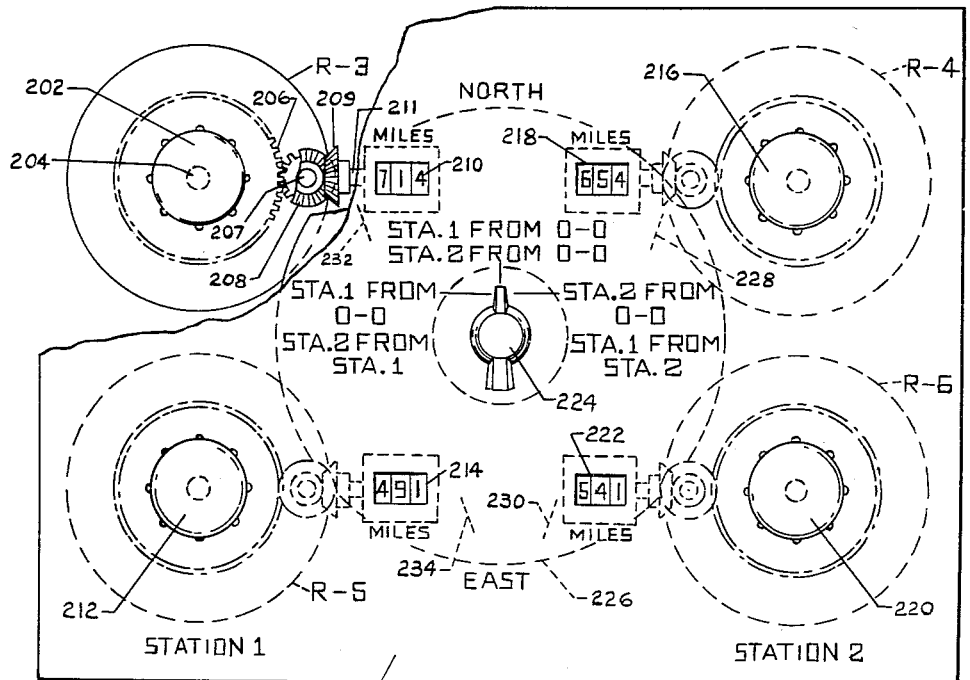
Fig. 10 is a drawing of the station locator.

The station one miles north counter 210, Fig. 10, is set by knob 202 to indicate "110," and the station one miles east counter 214 is se to indicate "200." The coordinate selector switch 224 is turned counter-clockwise (Fig. 9) to the "Sta. 1 from 0—0, Sta. 2 from Sta. 1" position, thereby rotating the transparent disc 226 and the decimal lines 228 and 230 carried thereby into positions between the middle and right discs of the counters 218 and 222, respectively, thereby indicating that the counters register tens, units and tenths of miles, rather than hundreds, tens and units of miles. The disc 226 is affixed to a shaft (not shown) rotated by knob 224. The station two miles north counter 218 is then set by knob 216 to read "20," and the station two miles east counter 222 is set to read "30."

Since station two is being referenced to station one, station two is south and east of station one, the station two North-South switch 302 is set in the "South" position and the station two East-West switch 306 is set in the "East" position, as shown in Fig. 12 of the drawings.

The foregoing operations control the computing apparatus as follows:

The repositioning of the coordinate selector switch 224 places the N-S trainer position potentiometer R-1, the station one N-S potentiometer R-3 and the dummy load resistor DR-1 in parallel with respect to the 115 v. A. C. winding F of transformer T-4. The station two N-S potentiometer R–4 is energized by the 11.5 v. A. C. winding C of transformer T–4 and the arm of R–3 is connected to the left end of R–4 through switch 224a. Consequently, the potential at the left end of R–4 is the same as that at the arm of R–3, and the voltage across R–4 is 11.5 v. A. C. Also, as a result of the repositioning of switch 224, the E–W trainer position potentiometer R–2, the station one E–W potentiometer R–5 and the dummy load resistor DR–2 are placed in parallel with respect to the 115 v. A. C. winding F of transformer T–5. The station two E–W potentiometer R–6 is energized by the 11.5 v. A. C. winding C of transformer T–5 and the arm of R–5 is connected to the left end of R–6 through switch 224b. The potential at the left end of R–6 is equal to that at the arm of R–5, and the total voltage across R–6 is 11.5 v. A. C.

In view of the fact that the voltage across each of R–4 and R–6 is one tenth the normal voltage thereacross, in order to set the arms of R–4 and R–6 at voltages differing from the voltage at the arms of R–3 and R–5, respectively, proportional to the assumed distances between the North and East coordinates of the two stations, the arms of R–4 and R–6, in setting up the apparatus, are driven along their rotors distances equal to ten times the actual differences between the stations' North and East coordinates. This is accomplished by dividing the normal counter reading by 10, as explained.

The station one switches 300 and 304 perform the same functions as station two switches 302 and 306 when station one is being referenced to the coordinates of the station two. In this case the coordinate selector switch 224 is placed clockwise of its center position bringing the decimal lines 232 and 234 into position between the middle and right discs of counters 210 and 214, respectively, and switches 300 and 304 are positioned according to the locations (N or S, E or W) of station one relative to station two. Potentiometers R–1, R–4 and DR–1 are in parallel with respect to the 115 v. A. C. winding F of T–4, and R–3 is placed across the 11.5 v. A. C. winding of T–4. The left end of R–3 is connected to the arm of R–4 through switch 224a. Also, potentiometers R2, R–6 and DR–2 are in parallel with respect to the 115 v. A. C. winding F of T–5, and R–5 is placed across the 11.5 v. A. C. winding of T–5. The left end of R–5 is connected to the arm of R–6 through switch 224b.

The setting of the arms of R–3 and R–5 is accomplished according to the distance of station one north or south and east or west of station two, as in the previous example.

The resistors DR–1 and DR–2 are provided to maintain constant loads on the transformers T–4 and T–5 and the generator when the above described switching takes place. Switches 300, 302, 304 and 306 maintain the correct phase across the potentiometers R–3, R–4, R–5 and R–6 depending on the relative position of the one station to the reference station.

The above arrangement is employed in order that the arms of one station's potentiometers may be set at a very accurate voltage difference from the arms of the reference station's potentiometers, for cases where the two stations are relatively close together and it is desired to navigate by means of signals received from both stations, e. g., where an ILS approach is to be made from a nearby VOR station. By placing one-tenth the normal voltage across the one station's potentiometers and driving the arms of that station's potentiometers ten times the normal distance, this exact relationship may be obtained.

The trainer-station one range-true bearing voltage output of transformer T–1 is conducted to the station one type of station (low-high frequency) switch 308 which is set by the instructor according to whether the station being simulated and arbitrarily designated "station one" is a high or low frequency station. The trainer-station two range-true bearing voltage output of transformer T–2 is conducted to the station two type of station (low-high frequency) switch 310 which is also set in a corresponding fashion. The said voltages are conducted to the dual station ARN–6 (low frequency) tuning simulator or the dual station ARN–14 (high frequency) tuning simulator, depending upon the settings of switches 308 and 310.

MAGNETIC VARIATION AND APPROACH BEARING

The transformers T–4 and T–5 apply 115 v. A. C. from their respective windings E across the stators of the station one approach bearing and magnetic variation resolver 312 and station two approach bearing and magnetic variation resolver 314. The rotor of each of these resolvers is set by the instructor according to the magnetic variation at the location of a VOR station being simulated, or to the true approach bearing of the runway of an ILS station being simulated. The output voltage from the rotor of each resolver, reduced in amplitude by the resolver to a desired level, e. g., 43 volts, will have a phase relationship to the phase of the reference voltage from T–4 according to the magnetic variation at the location of the station or approach bearing of the runway of the station. The output of the resolvers 312 and 314 is fed to the dual station low frequency (ARN–6) tuning simulator or to the dual station high frequency (ARN–14) tuning simulator according to the position of the instructor's station one and station two type of station switches 308 and 310.

DUAL STATION HIGH FREQUENCY (ARN–14) TUNING SIMULATOR

General operation

When station one is a high frequency station and the pilot in the trainer has tuned to station one, as will be later explained, station one tuned relays 316 and 318 of the dual station high frequency (ARN–14) tuning simulator are energized, and when station two is a high frequency station and the pilot has tuned to station two, station two tuned relays 320 and 322 of the unit are energized. Upon the tuning to the high frequency station, whether it be station one or station two, the trainer-station range-true bearing voltage of station one or station two from the transformer T–1 or T–2 and switch 308 or 310 passes through the NO contact 2 of relay 316 or 320, the NC contact 2 of the arbitrary course computer on relay 324 of the distance measuring equipment (DME) simulator, when the relay is denergized, to the high frequency (ARN–14) bearing servo.

At the same time, the station one tuned relay 318 or station two tuned relay 322 will be energized, and the magnetic variation or approach bearing voltage from resolver 312 or 314 is routed through switch 308 or 310 and the NO contacts 1 and 2 of relay 318 or 322 to the rotor of resolver 326 of the high frequency bearing servo.

HIGH FREQUENCY (ARN–14) BEARING SERVO

The high frequency station one or station two trainer-station range-true bearing voltage from the ARN–14 tuning simulator, varying in amplitude directly proportional to the assumed range and varying in phase with the assumed trainer-station true bearing is, when station one or station two is tuned in, applied to the grid of clipper tube V–5 of the high frequency bearing servo, to which grid is also applied —75 v. D. C. bias. The output of V–5 is applied to the grid of amplifier V–6 and the output voltage of V–6, a square wave having a fixed amplitude and a phase identical to the phase of the trainer-station range-true bearing voltage, is applied to the grids of phase detector V–7. V–5 and V–6 act as a limiter-amplifier.

As previously explained, in the simulation of VOR stations a two phase voltage whose phases are dependent upon the factor of magnetic variation at the location of the station is fed to the rotor of resolver 326 of the high quency bearing servo, and a voltage of corresponding phase and of constant amplitude is induced in the stator windings of resolver 326. This voltage is applied to the anodes of V-7 through isolation stage V-8 and transformer T-6. The conduction in each half of V-7 depends on the phase relation between the square wave on both grids and the sine wave on each anode. The voltages on each grid are in phase with one another, while the voltages on each anode are 180 degrees out of phase with each other. The cathodes of each section of V-7 pass a current which is the rectified resultant of the voltages on its associated grid and anode. When the square wave voltage on the grids is 90 degrees out of phase with the sine voltages on both anodes, i. e., the upper anode voltage leads the grid voltages by 90 degrees and the lower anode voltage lags the grid voltages by 90 degrees, both halves of V-7 conduct equally throughout one cycle, and by virtue of filtering condensers 328 and 330 and cathode resistors 332 and 334, under the said circumstances the voltages developed across the cathode resistors 332 and 334 will be equal, and the error voltage output from tube V-7 will be zero. However, with any other phase relation between the voltages on the grids and anodes of V-7, an error voltage will be developed across the resistors 332 and 334, and this voltage will be applied through conductors 336 and 338 to the grids of tube V-9 of the high frequency (ARN-14) bearing servo amplifier. The relative potentials across the resistors 332 and 334 will be dependent upon the relative phases of the voltages on the grids and anodes of phase detector V-7. The servo amplifier functions in response to the said error voltage to position the rotor of resolver 326 to shift the phase of the voltages on the anodes of V-7 so that the error voltage output is zero.

The construction and operation of the high frequency bearing servo amplifier and motor-generator set 340 are conventional. The amplifier contains a D. C. power supply comprising transformer T-7, Fig. 15, connected to the 115 v. A. C. source through the "on-off" switch 342. The output of rectifier V-10 is filtered by the pi-type filter comprising choke T-8 and condensers 344 to provide voltages for the anodes and screen grids of the push-pull amplifier tubes V-11 and V12. Potentiometer 346 and condenser 348 shift the phase of the generator G excitation voltage to place the generator output voltage in phase with the line voltage. Generator G has its rotor connected to the rotor of motor M, and generates a feedback voltage proportional to its speed which is applied to the lower grid of V-9 through conductors 350, 352 and 338.

Anode voltages for modulator V-9 and amplifier V-13 are supplied from transformer T-7, and are all of the same polarity at any instant, and all operate on the same positive cycle. The bias voltage for V-13 is supplied to its cathodes from transformer T-7. Alternating or direct current inputs may be employed as the input to the servo amplifier.

Potentiometer 354 is provided to adjust the output of the amplifier to a minimum when the input signal voltage is zero. Tubes V-11 and V-12 are the output stage and form a class A push-pull amplifier. Resistors 356 are grid limiting resistors, and the condensers 358 and resistors 360 are oscillation dampeners.

The above described error voltage from phase detector V-7 in the form of a difference in potential across the conductors 336 and 338 is applied to the grids of modulator V-9. When voltages across 332 and 334 are equal the bias on both grids of V-9 is equal to the voltage drop across 362. When the voltage across 334 exceeds that across 332, the bias on the upper grid of V-9 is less negative and the bias on the lower grid of V-9 is more negative by reason of the voltage developed across 362. When the voltage across 334 is less than that across 332, the bias on the upper grid of V-9 is more negative and the bias on the lower grid of V-9 is less negative by reason of the voltage developed across 362.

When the error voltage output of V-7 is zero, both halves of V-9 conduct equally, and no differential voltage is developed across resistors 364 and potentiometer 354, and the servomotor is not operated. However, in the presence of an error voltage input, one half of V-9 conducts more than the other half and a differential voltage is developed across resistors 364 and potentiometer 354 and is applied to the grids of V-13 which applies a pulsating half cycle to the primary of transformer T-9. The said primary and condenser 366 form a tuned circuit that is resonant at 60 C. P. S. and translates the pulsating voltage from V-13 into a 60 C. P. S. full sine wave which is transferred to the secondary of T-9 and then applied to the grids of the push-pull amplifier tubes V-11 and V-12. The output of these tubes is applied through transformer T-10 to the coil of servomotor M of the motor-generator set 340. The energization of the motor rotates the rotor of resolver 326 until the error voltage output of phase detector V-7 is zero, at which time the servomotor stops. The servo amplifier is responsive to the relative potentials across the resistors 332 and 334 to directionally control the motor to drive the rotor of resolver 326 in the direction required to produce a zero error voltage output.

The feedback voltage of generator G of set 340 is also applied to the modulator V-9 and is of a phase in opposition to the error voltage to stop the servomotor by damping action when the error voltage input from V-7 is zero.

Consequently the output shaft of the motor-generator set 340 is always driven to the position where the phase of the voltage on the upper anode of V-7 leads the grid voltages by 90 degrees and the phase of the voltage on the lower anode of V-7 lags the grid voltages by 90 degrees, to produce a zero error voltage output from V-7.

When a VOR station is being simulated, the phase of the voltages on the grids of V-7 corresponds to the factor of assumed trainer-station true bearing, and as the trainer-station true bearing changes, the phase of the voltages on the grids of V-7 is shifted, energizing the servomotor through the servo amplifier to rotate the output shaft of set 340 and the rotor of resolver 326 until the phases of the anode voltages relative to the phases on the grids of V-7 are such that the error voltage output of V-7 is zero. Consequently, when a VOR station is being simulated the first factor controlling the position of the output shaft of the motor-generator set 340 is trainer-station true bearing.

However, as previously explained, the phase of the voltage in the rotor of the resolver 326 is according to the factor of magnetic variation at the VOR station and consequently the phase of the voltages on the anodes of V-7 are, in the first instance, dependent upon the factor of magnetic variation at the location of the station. In view of the fact that the phase of the voltages on the anodes are initially shifted according to the magnetic variation at the location of the station, and the phase of the voltages on the grids is according to the factor of assumed trainer-station true bearing, the motor-generator set output shaft is driven to a position according to the combined values of the two controlling input factors, the said combined value being the instant assumed trainer-station magnetic bearing. Expressed otherwise, trainer-station magnetic bearing equals trainer-station true bearing plus magnetic variation. The position of the output shaft of the motor-generator set 340 is used as a measure of the factor of trainer-station magnetic bearing in operating some of the instruments later disclosed herein which simulate the operation of instruments in a real plane which are operated by signals received from a VOR station.

The obtaining of a measure of the instant assumed trainer-station magnetic bearing is accomplished since the VOR stations of the Civil Aeronautics Administration transmit a voltage the phase of which is referenced to magnetic north, and the instruments in the plane are set and/or give a bearing indication with respect to magnetic north. By providing an input which may be varied by the instructor according to the magnetic variation at the location of any VOR station, any VOR station may be simulated by the apparatus of this invention.

When an ILS station is being simulated, the instructor sets the rotor of the resolver 312 or 314 according to the true approach bearing of the runway, and therefore the output shaft of the motor-generator set 340 is driven to a position which is a measure of the combined factors of trainer-station true bearing and runway approach true bearing. In simulating an ILS station, the instructor sets in the approach bearing of the runway since the localizer beam is transmitted along the center line of the runway regardless of the orientation thereof with respect to true north. By providing such a variable input, any ILS station may be simulated.

HIGH FREQUENCY (ARN-14) TUNING (See Figs. 20-24)

Simulated tuning to the frequencies of VOR and ILS stations which are referred to herein as high frequency stations is accomplished by the following means which simulates the operation of the ARN-14 receiver. The instructor's station one frequency selector switches 368 (calibrated in megacycles) and 370 (calibrated in tenths of a megacycle) and station two freqeuncy selector switches 372 and 374 (correspondingly calibrated) may be set by the instructor according to the frequency of the respective stations being simulated. Any desired frequency in increments of .1 megacycles from 108 megacycles to 135.9 megacycles, or 280 different frequency channels, may be selected. The pilot in the trainer has on his ARN-14 radio control panel the unit megacycle switches 376 and 378, operated by a single rotor, the various terminals of which are connected to the terminals of switches 368 and 372, as shown on Fig. 20 of the drawings. The pilot also has a tenths megacycle selector switch 380 the terminals of which are connected to the corresponding terminals of the instructor's tenths megacycles selector switches 370 and 374. The pilot also has the ARN-14 off-on switch 382 which places the unit in or out of operation.

As previously explained, at the discretion of the instructor either high frequency station one or station two operation may be selected by positioning the selector switch 308 or 310 on the station locator and relative position computer (see also Fig. 11) in the "high frequency" position.

When the pilot has the off-on switch 382 in the "on" position and his frequency selector switches 376, 378 and 380 are matched to the instructor's unit and tenths megacycle settings of switches 368 and 370 for station one operation, or matched to the settings of switches 372 and 374 for station two operation, switch 308 or 310 being in the "high frequency" position for station one and station two simulation, respectively—e. g., in the illustrated case where the instructor's station one switches 368 and 370 and the pilot's switches 376, 378 and 380 are set for a frequency of 116.4 megacycles for station one, and switch 308 is in the "high frequency" position—a closed circuit allows 115 v. A. C. to pass through the off-on switch 382, the pilot's tenths megacycles switch 380, the instructor's tenth megacycles station one switch 370, the station one high-low frequency switch 308, station one tuned relays 316 and 318, the instructor's station one megacycles switch 368, and the pilot's megacycle switch 376 to the other side of the 115 v. A. C. line. Consequently, as previously explained in the discussion concerning the general operation of the high frequency tuning simulator (Fig. 14). the relays 316 and 318 are energized, and the trainer-station range-true bearing voltage of station one from the station locator and relative position computer passes through PL-123, NO contact 2 of relay 316 and PL-121 to the DME simulator and the tube V-5 of the high frequency (ARN-14) bearing servo (Fig. 16). The energization of 318 passes the station one magnetic variation or approach bearing voltage through terminals D and E of PL-118, NO contacts 1 and 2 of relay 318 and terminals W and V of PL-118 to the resolver 326 of the high frequency (ARN-14) bearing servo (Fig. 16). At the same time, the energization of 318 passes 6.3 v. A. C. through its NO contact 4 to illuminate the instructor's station one indicator lamp 384, informing the instructor that the pilot in the trainer is tuned to the selected station one frequency set in by the instructor.

Station two frequencies are set by the instructor in the same fashion, using switches 372 and 374 (it being noted that the contacts of these switches are connected to the terminals of PL-119 and PL-120, respectively) in which case switch 310 is placed in the "high frequency" position, and the pilot tunes to station two by properly positioning switches 376, 378 and 380. When the pilot has tuned to the frequency set up by the instructor, station two tuned relays 320 and 322 are energized by 115 v. A. C. passing through off-on switch 382, the pilot's tenths megacycles switch 380, the instructor's station two tenths megacycles switch 374, station two switch 310, relays 320 and 322, instructor's station two megacycles switch 372, and the pilot's megacycles switch 376, 378 back to the other side of the 115 v. A. C. source. The energization of relay 320 passes the station two trainer-station range-true bearing voltage through PL-122, the NO contact 2 of relay 320 and PL-121 to the DME simulator (Fig. 14) and then to V-5 of Fig. 16. The energization of relay 322 closes its NO contacts 1 and 2 and passes the magnetic variation or approach bearing voltage from the station locator and relative position computer through the terminals N, P, V and W of PL-118 and PL-121 to the same units. Also, NO contact 4 of relay 322 is closed, resulting in the illumination of the instructor's station two indicator lamp 386 informing the instructor that the pilot is tuned to station two.

When the pilot turns switch 382 to the "on" position, lamp 388 on his ARN-14 control panel is illuminated, informing him that the ARN-14 receiver is on.

Whenever the pilot is tuned to station one, the energization of relay 316 closes its NO contact 4 and places 115 v. A. C. across station one or station two tuned relay 390, energizing the same, and when the pilot is tuned to station two, the energization of relay 320 closes its NO contact 4 placing 115 v. A. C. across relay 390, energizing the same. Relay 390 is denergized only when the pilot is not tuned to station one or two. Therefore, when the pilot is not tuned to one of the stations voltages of constant phase and amplitude from transformers T-4 and T-5 (see Figs. 11 to 16) pass through the NC contacts 1, 2 and 3 of relay 390 to the DME simulator and tube V-5 and resolver 326. The purpose of this arrangement will be later understood.

Each of the particular types of navigational facilities being simulated operates in a selected frequency band. ILS operation is in the 108-112 megacycle band. The DME frequency associated with each ILS channel is automatically selected when the pilot is tuned to the ILS channel. VOR stations operate in the 112 to 118 megacycle band, and each VOR channel has a DME frequency associated with it which also is automatically selected when the pilot is tuned to the VOR station channel. To simulate the foregoing, coupled to the pilot's unit megacycle selector switches 376 and 378 is a band selector switch 392. Contacts 1, 3 and 5 which are the ILS frequency positions of this switch are connected to a single conductor 394 and the outer end of the arm of switch 392 is enlarged so that when switches 376 and 378 are on any one of the ILS frequency contacts 1-5, the arm of switch 392 is connected to the conductor 394. Also, contacts 7, 9 and 11 which are the VOR frequency positions of switch 392 are connected to a single conductor 396, and when switches 376 and 378 are on the VOR frequency contacts 6–11, the arm of switch 392 is connected to the conductor 396.

When the switches 376 and 378 are on the ILS contacts 1–5, 115 v. A. C. is applied through the arm of switch 392 to PL–393, and 6.3 v. A. C. is supplied to illuminate lamp 398 Fig. 23a, as will be explained, to indicate to the instructor that the pilot is tuned to an ILS frequency. When the switches 376 and 378 are on the VOR contacts 6–11, 115 v. A. C. is applied through the arm of switch 392 to PL–394 and 6.3 v. A. C. is developed across resistor 400 illuminating lamp 402 which indicates to the instructor that the pilot is tuned to a VOR frequency.

HIGH FREQUENCY (ARN–14) VOICE FACILITIES AND CALL LETTERS
*(See Figs. 25–30)*

The simulated ARN–14 transmitter of the voice facilities and call letter unit is utilized for the transmission of coded signals and intermittent voice communication by the instructor. The resistance coupled phase-shift type oscillator V–14, Fig. 29, supplies a 1020 C. P. S. signal via NC contact 4 of the interphone relay 404 to the grids of cathode follower V–15. The two outputs of V–15 are respectively interrupted by the station call letter generator in the following manner:

Station one call letter switch 406, set by the instructor to select the call letters of the station being simulated by the station one apparatus hereof, has its upper rotor connected to one output of V–15, and station two call letter switch 408, set by the instructor to give the call letters for the station being simulated by the station two apparatus hereof, has its upper rotor connected to the other output of V–15. Keyer motor 410, connected to the 115 v. A. C. source through the on-off switch, has upon its output shaft twelve cams (not shown) each of which operates one of the micro-switches 1—12 in a pattern simulating the call letters of a radio transmitting station. One side of each of the micro-switches is connected to the correspondingly numbered terminals of the upper branches switches 406 and 408. For ARN–14 operation contacts 1—8 of switches 406 and 408 are utilized.

The shaft of keyer motor 410 may be rotated at any suitable rate, e. g., 10 R. P. M., and the opening and closing of the two selected micro-switches 1—12, selected by the position of the switches 406 and 408, intermittently grounds each of the two outputs V–15 in a code pattern dependent upon the peripheral configuration of the cams in question.

The station one code signal passes through the NC contact of station one relay 412 (Fig. 27) to the rotor of the lower branch of switch 406. Providing the pilot has tuned to the frequency of station one, relay 316 (see Figs. 21 to 23) is energized, and 115 v. A. C. is applied through the off-on switch 382, NC contact 1 of the beyond maximum range or not tuned relay 414 (which relay, as will be later shown, is de-energized when the student is tuned to a station and the trainer is within receiving distance of the station), NO contact 3 of relay 316, terminal C of PL–117, station one tuned and in range relay 416, and the NC contact 3 of interphone relay 404 back to the other side of the 115 v. A. C. source. Relay 416 is therefore energized, permitting the 1020 C. P. S. code signal to pass from the rotor of the lower branch of switch 406 through the NO contact 1 of relay 416 to the grid of the pilot's phones power amplifier V–16. Simultaneously, precipitation noise entering terminal H of PL–117, produced as hereinafter explained, with its intensity controlled by potentiometer 418 is impressed on the grid of precipitation noise tube V–17, the output of which is also applied to the grid of a power amplifier V–16. The code signal and precipitation noise inputs applied to the grids of V–16 produce an output which simulates high frequency station aural reception, and is routed through the power output transformer T–11, through terminal E of PL–117 (see also Figs. 20 to 23) to the pilot's receiving station headphones jack J–1 located on the pilot's ARN–14 radio control panel.

When station two is being simulated and the pilot has tuned to the frequency of station two as set up by the instructor, 115 v. A. C. is routed through switch 382, NC contact 1 of relay 414, NO contact 3 of the energized station two tuned relay 320, terminal a of PL–117, station two relay 420 and the NC contact of interphone relay 404, energizing relay 420. Consequently, the station two keyed signal from the station call letter generator passes through the NC contact of the station two relay 422, which is normally deenergized, the arm of the lower branch of switch 408, and the NO contact of relay 420 to V–16, where it is mixed with the precipitation noise, and thence to the pilot's earphones jack J–1.

The coded signal from the NO contact 1 of relay 416 or relay 420, depending upon which station is tuned in by the pilot in the trainer, also passes through the upper branch of the instructor's phone selector switch 426, when it is in the ARN–14 position, to the grid of the instructor's phones power amplifier tube V–18, and then through output transformer T–12, the NC contact 2 of the interphone relay 424, the lower branch of the instructor's phone selector switch 426 and volume control potentiometers 428 to the instructor's receiving station phone jacks J–2.

Depressing the instructor's "press to talk" button 430 the instructor's microphone energizes the instructor's microphone relay 432 closing the NO contact thereof and energizing the instructor's microphone relay 434 by routing 115 v. A. C. therethrough. Energization of the latter relay completes a 115 v. A. C. circuit through the lower branch of the instructor's microphone selector switch 436, Fig. 47, station one relay 412 or station two relay 422, depending upon whether the switch 436 is in the "station one" or "station two" position, and the NO contact 3 of relay 434. Switch 436 will be positioned by the instructor according to whether the pilot in the trainer is tuned to station one or station two, as indicated by the lamp 384 (Fig. 20) or lamp 386 (Fig. 22). The resulting energization of relay 412 or 422 breaks the call letter circuit to the pilot's earphones jack, substituting voice communication from the instructor originating at the instructor's microphone jack 436a and passing through transformer T–13 to the grids of preamplifier V–19. The output of V–19 is applied to the arm of the upper branch of switch 436 and, depending on whether the switch is in the "station one" or "station two" position, to the station one or station two circuit through the NO contact of relay 412 or 422, switch 406 or 408, etc., to the pilot's headphone jack J–1.

ARC–3 OPERATION
*(See Figs. 25–31)*

Figure 31:
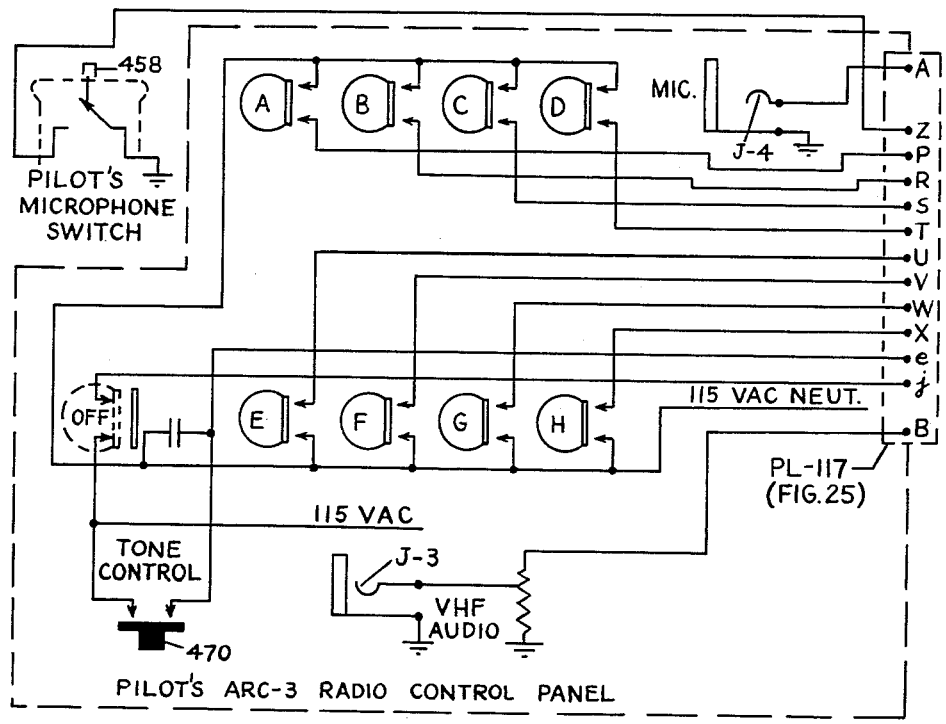
Fig. 31 is a wiring diagram of the pilot's ARC-3 radio control panel.

Radio set ARC–3 is an airborne receiving and transmitting unit designed to provide voice and MCW (modulated continuous wave or code) communication from plane to ground. It operates on V. H. F., and is tuned by push buttons which automatically tune both the transmitter and receiver. Keyed or voice signals may be transmitted from the plane, and voice signals received from the ground transmitting station which may, for example, be a control tower transmitter. The operation of such a communication system is simulated as follows:

Depression of any one of the eight channel selector push buttons A–H, Fig. 31 on the pilot's ARC–3 radio control panel in the trainer releases the "off" push button, as in the ARC–3 airborne unit, and applies 115 v. A. C. through the push button and terminal j of PL–117 to the ARC–3 ON relay 440, energizing the same. NO contact 1 of relay 400 applies 6.3 v. A. C. to one side of the 45 second ARC–3 time delay relay 442, the other side of which is connected to ground through NC contact 1 of the ARC warmed-up relay 444, and NO contact 1 of relay 440 also applies 6.3 v. A. C. to the filament of the left half of V–20 which acts as a 1020 cycle isolation stage. The resistance coupled phase-shift type oscillator V–14 applies its 1020 cycle tone output to the left grid of V–20. As the filament of V–20 warms up, the 1020 cycle output of the tube increases, and the output is routed through the NC contact 2 of the ARC–3 warmed-up relay 446 and NC contact 1 of the interphone relay 404 to the grid of the pilot's phones power amplifier V–21. The output of V–21 is applied through transformer T–14 and terminal B of PL–117 to the pilot's phone jack J–3 (Fig. 31), and the pilot hears the 1020 cycle tone.

When 45 seconds have elapsed after the energization of ARC–3 ON relay 440, time delay relay 442 is energized and its contacts close routing 115 v. A. C. from terminal *j* of PL–117 through the closed contacts of relay 442, the ARC–3 warmed-up relays 444 and 446 to the other side of the 115 v. A. C. line, energizing the relays 444 and 446. The closing of NO contact 2 of relay 444 keeps relays 444 and 446 energized by applying 115 v. A. C. thereacross. NO contact 1 of relay 444 is opened and ungrounded and relay 442 is deenergized The energization of relay 446 grounds the 1020 cycle tone through NO contact 2 of relay 446 and the NC contact 2 of the ARC–3 keying relay 448. Consequently, the warm-up 1020 cycle tone is no longer heard by the pilot. The precipitation noise entering terminal H of PL–117 is applied to the grid of the right half of isolation tube V–20 and the output is routed through resistor 450 and the NO contact 3 of relay 444, the NC contact 2 of the pilot's microphone relay 452 and the NC 1 of the interphone relay 404 to the pilot's phone jack J–3 through the previously described circuit. Consequently, the pilot hears the precipitation noise which accompanies V. H. F. reception.

The closing of the NO contact 2 of relay 444 also routes 115 v. A. C. to the right end of the ARC–3 tuned in relay 454, and if the pilot has selected the channel frequency button A to H for which the instructor's ARC–3 channel selector switch 456 is set, which setting will be made according to the channel upon which the station being simulated is operating, the left side of relay 454 is connected to the neutral side of the 115 line through switch 456, PL–117 and the channel selector button A to H on the pilot's ARC–3 radio control panel. The receiver is then assumed to be tuned to the station.

Upon the energization of the ARC–3 tuned in relay 454, precipitation noise goes to the pilot through the circuit previously traced, and it goes to the instructor from the NC contact 2 of the pilot's microphone relay 452 through the NC contact 4 of the same relay, the NO contact 4 of relay 444, the NO contact 2 of relay 454, the upper branch of the instructor's phone selector switch 426 (when in the ARC–3 position), and to the instructor's phone jacks J–2 through the previously traced circuit. Consequently, when the ARC–3 receiver is assumed to be tuned to the station, the instructor will also hear the precipitation noise. Until the ARC–3 receiver is assumed to be tuned in, the instructor gets neither the 1020 cycle tone nor the precipitation noise because the ARC–3 terminal of the instructor's phone selector switch 426 is grounded through NC contact 2 of the ARC–3 tuned in relay 454.

With the ARC–3 tuned in as explained, the pilot can talk to the instructor (who represents the operator of the ARC–3 transmitting station) by virtue of the following:

Depression of the pilot's microphone switch 458 completes a circuit from ground through the switch, terminal Z of PL–117 and the pilot's microphone relay 460 to the D. C. source, energizing the relay. The closing of the NO contact of this relay places 115 v. A. C. across the pilot's microphone relay 452, energizing the same. The pilot's voice signals are routed from the pilot's microphone jack J–4 through terminal A of PL–117 to transformer T–15 and to the left grid of the isolation amplifier V–22. The output of V–22 is routed through NC contact 2 of the interphone relay 462, NC contact 1 of the ARC–3 keying relay 448, NO contact 3 of the ARC–3 warmed-up relay 446, NC contact 2 of the interphone relay 404, NO contacts 3 and 2 of the pilot's microphone relay 452 and the NC contact 1 of interphone relay 404 to the pilot's phone jack through the previously described circuit, to give the required side tone at the pilot's phone jack.

The instructor will receive the pilot's voice signals which are routed through the NO contact 2 of relay 452, to the tap point 464, and through resistor 466, the NO contact 4 of the ARC–3 tuned in relay 454, NC contact 1 of the instructor's microphone relay 434, and the upper branch of the instructor's phone selector switch 426 which is connected to the instructor's phone jacks J–2 through the previously described circuit. Consequently, the instructor will receive the voice communication from the pilot, provided the ARC–3 is tuned in, energizing 454.

Voice signals originating from the instructor are routed to the instructor's and pilot's receiving jacks by the following circuits:

Depression of the instructor's press to talk button 430 energizes the instructor's microphone relays 432 and 434, as previously described. The instructor's microphone input is isolated by transformer T–13, amplified and isolated by tube V–19, and routed to the rotor of the upper branch of the instructor's microphone selector switch 436 which, in the ARC–3 position, routes the signal through the NO contact 1 of the instructor's microphone relay 434 to the ARC–3 terminal of the instructor's phone selector switch 426, from which point the signal goes to the instructor's phones jacks J–2 through the previously described circuit.

Upon reaching the tap point 468, the instructor's voice signals also take a path through the NO contact 2 of the ARC–3 tuned in relay 454, NO contact 4 of the ARC–3 warmed-up relay 444, NC contact 4 of the pilot's microphone relay 452 and NC contact 1 of the interphone relay 404 to the pilot's phone jack J–3 through the previously described circuit. Consequently, the instructor's voice signals are heard at the pilot's and instructor's phone jacks. The pilot will hear the instructor's voice only in the event the pilot has properly tuned the set, energizing relay 454.

It will be noted that if, while the instructor is talking, the pilot has his microphone switch 458 depressed, the pilot's microphone relay 452 will be energized, and the pilot will not hear the instructor's voice communications and, when the pilot is talking if the instructor has his press to talk button 430 depressed he will not hear the pilot, since relay 434 is energized. This simulates the actual operation of the ARC–3 equipment.

For the transmission of MCW (code) signals to the instructor, who represents the operator at the transmitting station, the tone control 470 on the pilot's ARC–3 radio control panel is provided, which button is depressed by the pilot in the code pattern of the words being transmitted, intermittently applying 115 v. A. C. through the control 470 and terminal *e* of PL–117 to the ARC–3 keying relay 448, energizing the same in the said code pattern. The 1020 cycle tone from V–20 passes through the NO contact 2 of ARC–3 warmed-up relay 446 and is keyed by the intermittent opening and closing of contact 2 of ARC–3 keying relay 448. The code signal passes from the said contact through NO contact 1 of ARC–3 warmed-up relay 446, NC contact 1 of the pilot's microphone relay 452 and NC contact 1 of the interphone relay 404 to the pilot's phone jacks through the previously described circuit. The instructor will receive the code signals from the NC contact 1 of relay 452 through the NC contact 4 of relay 452, NO contact 4 of relay 444, NO contact 2 of relay 454, switch 426 and the previously described circuit to the instructor's phone jacks J–2. If the pilot's microphone switch 458 is depressed for voice communication, he cannot send code to the instructor because relay 452 will be energized and its NO contact 1 will ground the code signals. However, the instructor will receive the code signals even though the instructor's press to talk button 430 is depressed.

NC contact 1 of the ARC–3 keying relay 448 intermittently breaks the circuits from the pilot's microphone to the pilot's and instructor's phones jacks in the pattern of the words transmitted by code, thereby making voice communication by the pilot impossible while he is sending code.

The ARC–3 simulator may be used to instruct the student in ground controlled approach (GCA) landings. The instructor's DME indicator, hereinafter disclosed, will give the instructor the instant assumed distance of the trainer from the end of the runway; the localizer indicator hereinafter discussed will give the instructor the instant assumed position of the trainer in relation to the approach bearing of the runway; and the altimeter at the instructor's station will give the instant assumed elevation of the trainer above the runway. Consequently, the instructor has the required information necessary to enable him to give proper GCA instructions to the pilot, when it is desired to simulate GCA landings.

INTERCOMMUNICATION

(See Figs. 21–31)

The intercommunication system enables the instructor to communicate with the pilot at any time regardless of what radio system is in use by the pilot. It may be necessary, for example, for the instructor to advise the student regarding some phase of the instruction he is receiving by use of the trainer. Such communication is possible by virtue of the following:

Placing of the instructor's microphone selector switch 436 in the "INT." (interphone) position applies 115 v. A. C. through the lower branch thereof across the three interphone relays 404, 462 and 424, energizing the same. Energization of relay 404 opens its NC contact 1 which breaks the ARC–3 circuit between the instructor's microphone input 436 and the pilot's phone jack J–3 and opens its NC contact 2 which breaks the ARC–3 circuits between the pilot's microphone input J–4 and the pilot's and instructor's phone jacks J–3 and J–4. Consequently, normal ARC–3 communication is interrupted. The closing of NO contact 4 of relay 404 grounds the output of the 1020 cycle oscillator V–20, and the opening of NC contact 3 of relay 404 deenergizes the station one and station two relays 416 and 420 (which are energized when the pilot is tuned to high frequency ARN–14 station one or station two), thereby opening the normal station one and station two ARN–14 circuits to the pilot and instructor.

By depressing the instructor's press to talk button 430, the instructor's microphone relays 432 and 434 are energized, as previously explained, and voice signals from the instructor, preamplified and isolated by V–19 pass through the upper branch of the instructor's microphone selector switch 436, NO contact 2 of relay 434, and NO contacts 4 and 2 of relay 462 to the grid of power amplifier V–21. From V–21 the instructor's voice signals are routed through NO contact 1 of relay 462 to the monitor line and through terminal G of PL–117 (see Fig. 21) to the common phone jack J–5 on the pilot's ARN–14 radio control panel. The output of V–21 is also routed through terminal B of PL–117 to the pilot's phone jack J–3 on the ARC–3 radio control panel. The pilot's earphones are always plugged into the common phone jack J–5, and the plug 472 is inserted in the jack J–1 or J–3, depending on what receiver the pilot is using.

Consequently, the pilot will hear the instructor's oral instructions regardless of what jack the pilot's earphones are connected to.

The instructor's voice signals also are routed from V–21 through NO contacts 1 and 3 of relay 462, NO contact 2 of interphone relay 424, the lower branch of the instructor's phone selector switch 468, when in the monitor, ARN–14, ARN–6 or ARC–3 positions, and the volume control 428 to the instructor's phone jacks J–2.

Thus the instructor's voice signals are routed to the pilot's and instructor's phone jacks.

The pilot's microphone input is pre-amplified and isolated by V–22 as previously explained, and routed through NO contact 2 of interphone relay 462 to the grid of V–21, and then to the pilot's and instructor's phone jacks through the same circuits as traced above. It should be noted that use of the pilot's microphone switch 458 is unnecessary.

Consequently, the use of the intercommunication system by the instructor opens all circuits previously outlined for the transmission of aural signals and permits voice communication between the pilot and instructor.

INSTRUCTOR MONITOR

(See Figs. 21–31)

The instructor may monitor all reception to the pilot's earphones. Insertion of the pilot's earphones into the common phone jack J–5 (Fig. 21) automatically places the pilot's phones on the monitor line. By placing the instructor's phone selector switch 468 in the "MON." (Monitor) position, connection is established from the common phone jack J–5 through terminal G of PL–117 to the rotor of the upper branch of the instructor's phone selector switch 468, which rotor feeds the signal voltage to the power amplifier V–18, transformer T–12, NC contact 2 of the interphone relay 424, the lower branch of switch 468 and the volume control 428 to the instructor's phone jacks J–2.

RANGE CUT OUT AND TUNING

Figure 32:
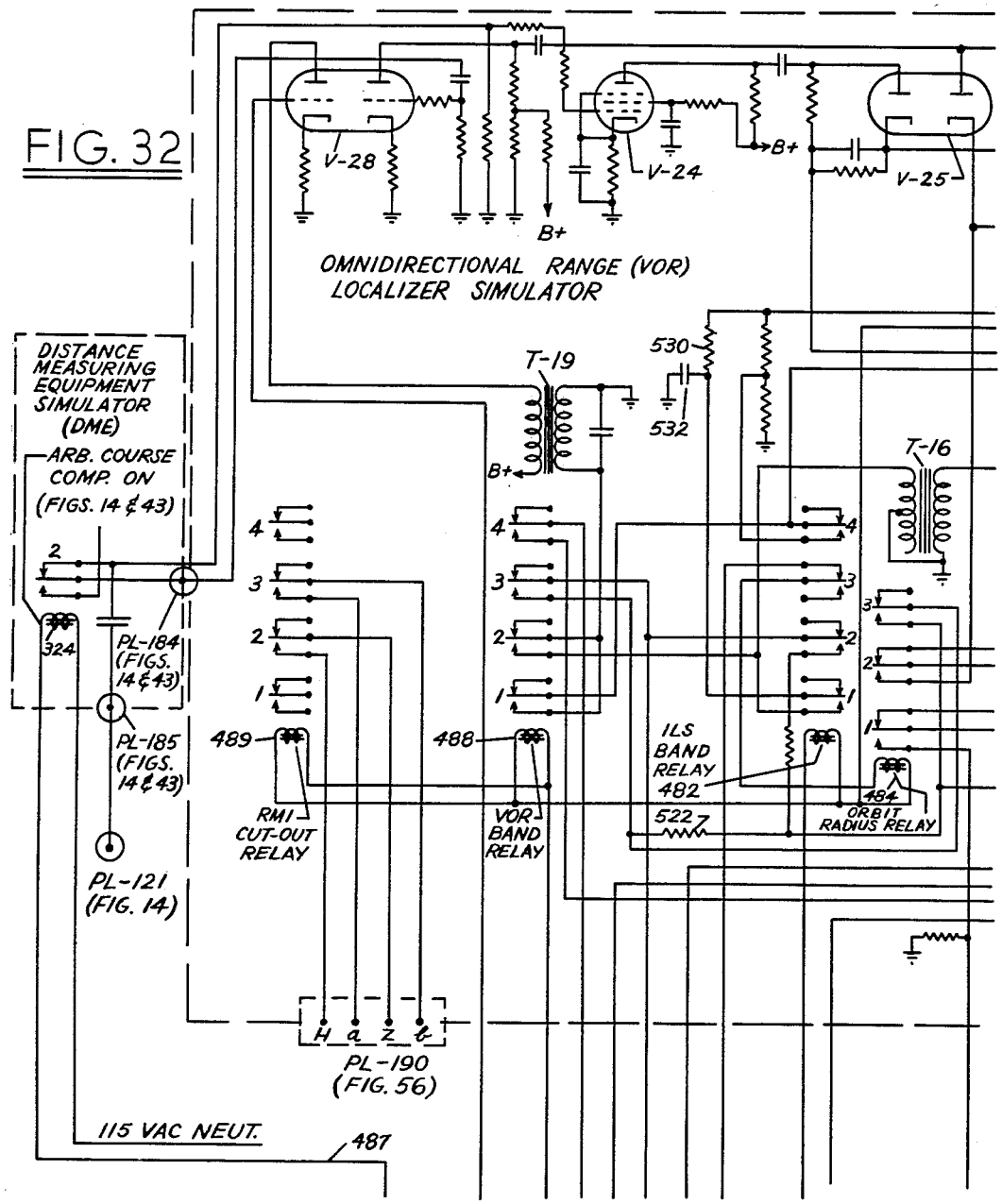
Figure 33:
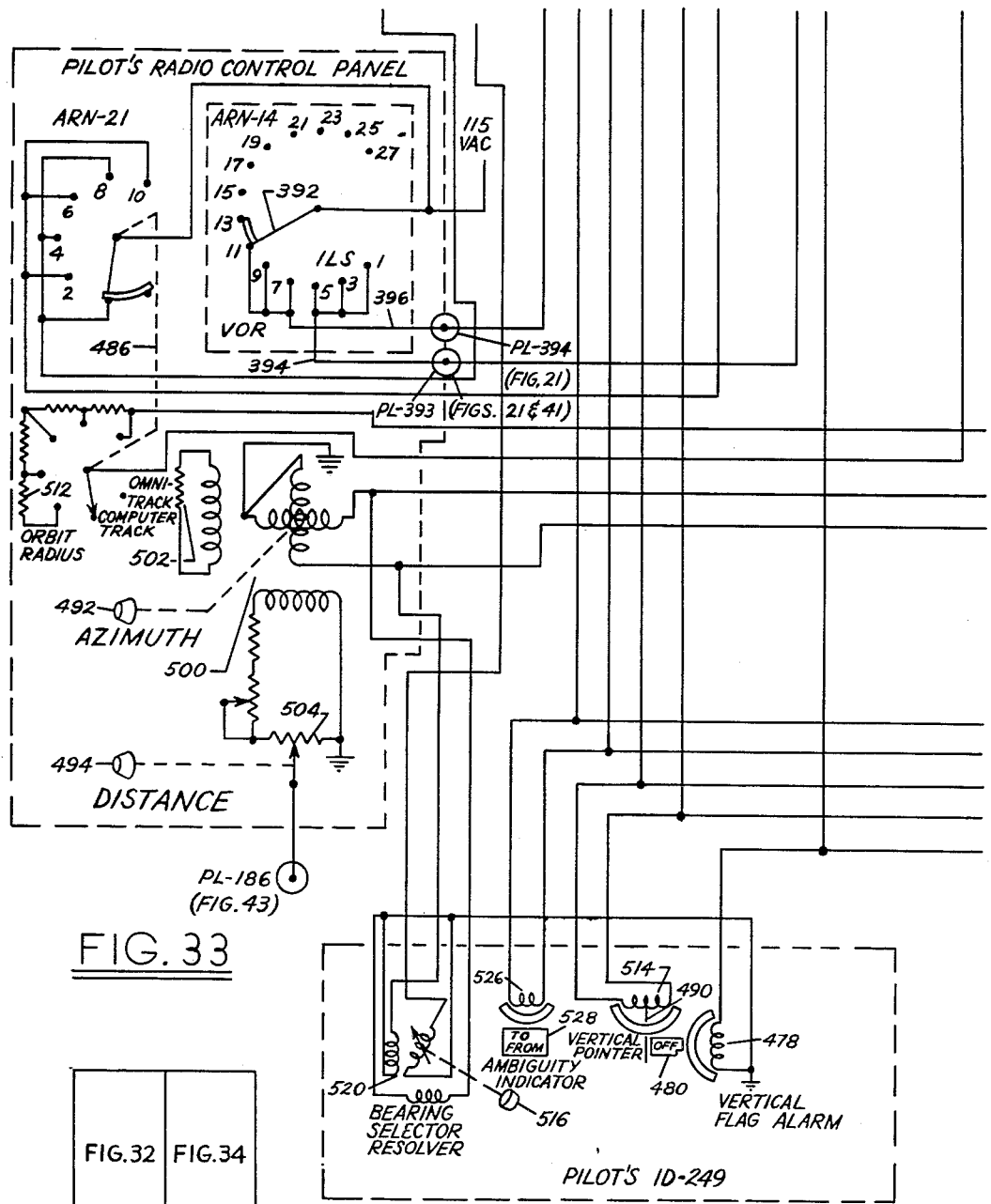
Figure 38:
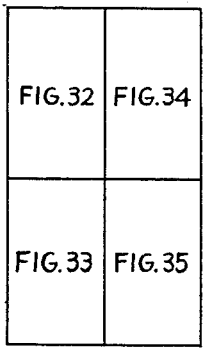
Fig. 38 is a view showing the manner in which Figs. 32 to 35 may be assembled to form a single composite wiring diagram.
Figure 34:
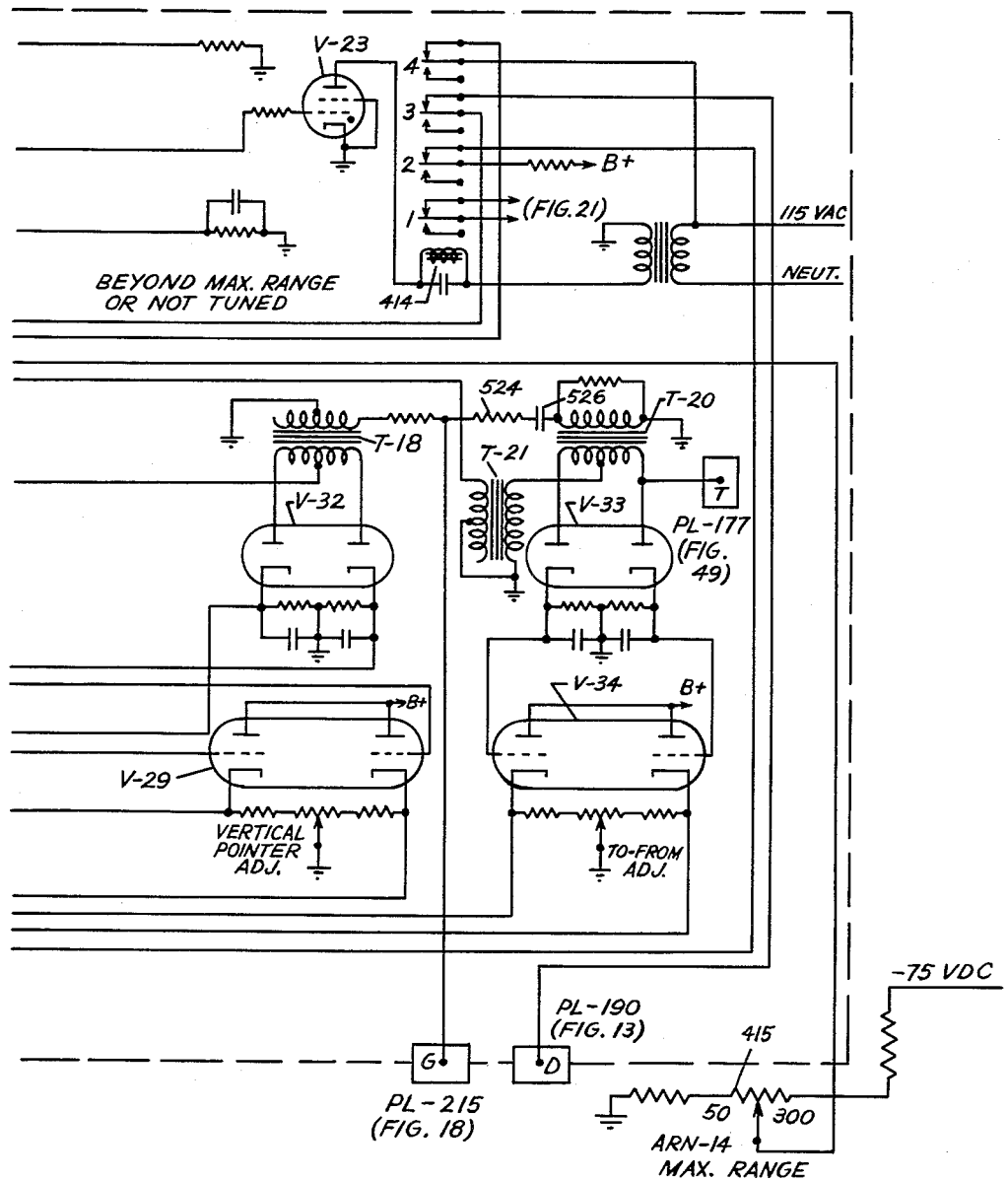

(See Figs. 32 and 34)

The maximum assumed range at which the signals of the VOR or ILS station being simulated may be received is adjustable by the instructor within predetermined limits, e. g., 50–300 miles, by adjustment of the ARN–14 maximum range potentiometer 415, Fig. 34. The potentiometer has one end connected to a —75 v. D. C. source and the other end is grounded. The arm of the potentiometer is connected to the grid of thyratron V–23 and places a negative bias on the grid according to the setting of the arm—the greater the assumed maximum range the more negative is the voltage applied. The trainer-station range-true bearing voltage from PL–121 of the ARN–14 tuning simulator (Fig. 14), the amplitude of which is directly proportional to the assumed range of the trainer from the radio station, is applied to the grid of amplifier V–24, the output of which is rectified by the left half of V–25 and is applied as a positive voltage in opposition to the negative maximum range voltage to the grid of thyratron V–23. When the assumed range of the trainer from the station is greater than the assumed maximum range of the station as set in by the instructor, the positive trainer-station range-true bearing voltage is greater than the negative station maximum range voltage applied to the grid of V–23, and V–23 conducts, energizing the beyond maximum range or not tuned relay 414 in the anode circuit of V–23.

When the ARN–14 tuning simulator is not tuned to station one or station two, the voltage of constant amplitude and phase from the windings E of transformers T–4 and T–5 (see Figs. 11 to 14) passes through the NC contact 1 of deenergized station one or station two tuned relay 390, PL–121 and PL–185 and is applied to the grid of amplifier V–24, the output of which is rectified by the left half of V–25 and is applied as a positive voltage to the grid of V–23. Regardless of the setting of the ARN–14 maximum range potentiometer, the positive voltage so applied to the grid of V–23 is of a larger amplitude than the negative voltage from the potentiometer, and V–23 conducts energizing the relay 414. Consequently, the relay is deenergized whenever the trainer is assumed to be within the range of the station and the student is tuned to the frequency of the station, i. e. when the requirements for receiving the signals of the station are satisfied. The instructor sets the ARN–14 maximum range potentiometer according to the station tuned in by the pilot as indicated by the tuning lights.

When the beyond maximum range or not tuned relay 414 is deenergized:

a. The audio signals from the tuned station are received, since contact 1 is closed. As shown in Figs. 21 and 23 and 25 to 29 contact 1 of relay 414 must be closed to permit energization of relays 416 and 420, which relays must be energized to close the audio signal circuits to the pilot's phone jack J–1, as described above in the section entitled "High frequency (ARN–14) voice facilities and call letters."

b. Contact 2 supplies a D. C. voltage to the coils 478 which control the positions of the vertical alarm flags 480 of the pilot's and instructor's ID–249 indicators (Fig. 36), removing the flags from view, thereby indicating that the trainer is assumed to be within range of the station and the pilot is tuned to the station.

c. Contact 3 applies the magnetic variation or runway approach bearing phase voltage from terminal D of PL–190 (see Fig. 13) through the NO contact 1 of the ILS band relay 482 to the transformer T–16 when relay 482 is energized.

d. Voltage passing through contact 4 energizes:

1. ILS band relay 482 by closing therethrough a 115 v. A. C. circuit providing the ARN–14 selector switch on the pilot's ARN–14 radio control panel (see Figs. 20 and 21) is placed on any one of the contacts 1–5 for ILS band tuning.

2. Orbit radius relay 484 by closing therethrough a 115 v. A. C. circuit including NC contact 3 of the ILS band relay 482, provided the latter relay is deenergized and provided the ARN–21 selector switch 486 on the pilot's radio control panel is on an "orbit radius" position (Fig. 37).

3. The VOR band relay 488 and RMI cut-out relay 489 by closing therethrough 115 v. A. C. circuits, providing the ARN–14 selector switch 392 on the pilot's radio control panel is placed on any one of the contacts 6 to 11 for VOR band tuning.

ORBIT RADIUS (Rθ) SYSTEM
(See Figs. 32–37)

This system enables the pilot of a plane to maintain the aircraft at a selected radius or distance from a destination (which may be a VOR station or a point located at a distance from the VOR station) by maintaining the track or vertical needle 490 on the ID–249 indicator centered. The pilot of the plane may, for example, be advised by a landing field control tower to orbit at a given radius of from 2–10 miles about a certain point located at a distance from a VOR station.

If the instructor has set in a VOR frequency of from 108–112 megacycles, the pilot has tuned to the said frequency and the trainer is within range of the station as set by the instructor, the beyond maximum range or not tuned relay 414 and the ILS band relay 482 will be deenergized. The VOR band relay 488 and the RMI cut-out relay 489 will be energized. A given orbit radius of 2, 4, 6, 8, or 10 miles may be selected by the pilot by properly positioning the ARN–21 orbit radius selector switch 486, and the orbit radius relay 484 will be energized as will the arbitrary course computer on relay 324 of the DME simulator by routing 115 v. A. C. through the arm of the upper branch of switch 486 and relay 324.

The azimuth (magnetic bearing) and distance of the destination (center of the orbit) relative to the VOR radio station are set into the apparatus by the pilot's respectively positioning the azimuth and distance controls 492 and 494 so that the counters 496 and 498 indicate the azimuth and distance, respectively.

The quadrature voltages from terminals W and V of PL–118 (Fig. 14) which have a phase according to the magnetic variation at the location of the VOR station being simulated are routed through terminals T and b of PL–169 and applied to the rotor of resolver 500. The left stator coil of resolver 500 is shunted with a dummy load 502, and the other stator coil excites potentiometer 504, the arm of which is set by the pilot's distance control 494 to tap off a voltage proportional to the distance of the destination from the station. The phase of the voltage tapped off by the distance control corresponds to the true bearing of the destination from the station, and this voltage is referred to as the "station-destination range-true bearing voltage." This voltage is routed through PL–186 to the DME simulator (see Figs. 39 to 48), through NO contact 3 of the arbitrary course computer on relay 324a (energized when relay 324 is energized) to the grid of cathode follower V–26B (Fig. 40). At the same time the trainer-station range-true bearing voltage from PL–185 (Fig. 14) is routed through NO contact 4 of the DME in range and tuned relay 506, Fig. 43, controlled as later explained, and the NC contact 3 of the ILS band relay 482a, energized when the pilot is tuned to an ILS frequency, to the grid of cathode follower V–26A. The vector inputs to V–26A and V–26B produce an output voltage from the parallel addition circuit 508 having an amplitude according to the trainer to destination range and a phase according to the trainer to destination true bearing. This voltage, referred to as the "trainer-destination range-true bearing voltage," is routed through amplifiers V–27A and V–27B, NO contact 2 of the arbitrary course computer on relay 324 and PL–184 (Fig. 32) to the right grid of amplifier V–28. The output of the right half of V–28 is rectified by the right half of V–25, the output of which is applied in the form of a positive voltage through the NO contact 2 of the orbit radius relay to the grid of the right half of amplifier V–29. The output of the right half of V–29 therefore corresponds in amplitude to the trainer-destination assumed range.

The lower arm of the orbit radius selector switch 486 also selects a D. C. voltage from the voltage dividing network 512 excited from the orbit radius adjust potentiometer 510 of an amplitude depending upon the position thereof and consequently directly proportional to the selected radius at which the trainer is to orbit about the destination. The selected voltage is routed from the said arm through the NO contact 1 of the orbit radius relay 484 to the grid of the left half of V–29. The right cathode of V–29 is connected directly to one side of the vertical pointer coil 514 of each of the ID–249 indicators and the cathode of the left half of V–29 is connected through the NO contact 3 of the orbit radius relay 484 and NO contact 3 of the VOR band relay 488 to the other side of each of the said coils.

When the assumed location of the trainer is at the selected orbit radius, the two voltages on the grids and consequently on the cathodes of V–29 are equal, and no voltage is applied to the coils 514. The vertical or track needles 490 are centered, indicating that the trainer is assumed to be on an orbit radius about the destination corresponding to that selected by the orbit radius selector switch 486. If the trainer-destination range voltage is greater or less than the reference voltage selected by switch 486, the voltage at the cathode of the right half of V–29 will be greater or less than at the cathode of the left half of V–29, resulting in an energization of the said coils and a movement of the vertical pointer 490 of each of the ID-249 indicators to the right or left, indicating that the trainer is assumed to be inside or outside the selected orbit radius.

OMNI-DIRECTIONAL RANGE (VOR) SIMULATION

*(See Figs. 32–38)*

In the operation of the apparatus of this invention simulating the operation of an instrument having a course deviation indicator and a "to-from" indicator operated by signals received from a VOR station as related to the setting of a radial selector, the pilot turns on and tunes the ARN-14 receiver to the proper frequency of the VOR station being simulated (112 to 118 megacycles) as set in by the instructor, producing an energization of the VOR band relay 488 if the trainer is assumed to be within range, in which case the beyond maximum range or not tuned relay 414 will be deenergized. The ARN-21 selector switch 486 on the pilot's radio control panel is then set to the "omni-track" position, the contacts of which are dummies. The pilot then sets the radial selector knob 516 on his ID-249 indicator so that the radial selection indicator 518 indicates the magnetic radial which he desires to follow to or from the station.

As previously explained, the phase of the voltage in the lower stator or resolver 326 (Fig. 16) of the high frequency bearing servo is 90 degrees removed from the phase of the trainer-station range-true bearing voltage. The phase of the voltage in the left stator of the resolver is always 90 degrees from the phase of the voltage in the lower stator and therefore is in phase with the trainer-station range-true bearing voltage. Consequently, a constant amplitude voltage having a phase according to the trainer-station true bearing is routed from the said stator to the grid of amplifier V-30 (Fig. 18), the output of which is in turn amplified by V-31 and routed through the transformer T-17 and terminal G of PL-215 (see Fig. 34) to the primary of transformer T-18. The input to T-18 is of constant amplitude, e. g., 60 volts, and is phased according to the factor of trainer-station true bearing.

A two phase voltage having a phase according to the magnetic variation at the location of the station is applied through terminals T and b of PL-169 (see Fig. 13) to the two stator coils of the radial selector resolver 520 of the pilot's ID-249 indicator. The rotor of the resolver is positioned by the pilot by use of the radial selector knob 516 by reference to the course indicator 518 so that indicator 518 indicates the selected radial to be flown to the station. The voltage induced in the rotor of the resolver 520 is applied to the left grid of amplifier V-28, the amplified voltage output of which is applied to isolation transformer T-19 the output of which is applied through NO contact 2 of the VOR band relay 488 to the primary of transformer T-16. In view of the fact that the rotor of the resolver 520 is excited by a voltage having a phase according to the magnetic variation at the location of the station, and the pilot sets in a desired magnetic radial to the station, the phase of the voltage induced in transformer T-16 corresponds to the desired true radial to the station. However, this voltage is shifted through 90 degrees by proper calibration of the ID-249, for a purpose to be described.

The transformers T-16 and T-18 in conjunction with rectifier V-32 and associated elements form a discriminator circuit which compares the phase of the assumed trainer-station true bearing voltage with the phase of the desired trainer-station true course voltage. The relation between the two phases controls the deflection of the course deviation indicator vertical or track needle 490 of the ID-249 indicators to indicate the direction and magnitude of the deviation of the trainer, if any, from the selected radial.

The phase detector circuit operates to have zero output when the trainer-station true bearing voltage, which is used as a reference voltage, is 90 degrees out of phase with the variable selected radial voltage. The reference voltage, phased according to trainer-station true bearing is applied to transformer T-18, and the selected radial variable voltage, phased according to the selected true course and shifted through 90 degrees is applied to transformer T-16. The voltages induced in the two sections of the secondary of T-18 are equal and 180 degrees out of phase. The variable voltage is introduced into the circuit through the secondary of T-16. The anodes of rectifier V-32 are connected to opposite ends of the secondary of T-18, and the cathodes of V-32 are respectively connected through NC contacts 1 and 2 of the orbit radius relay 484 to the grids of amplifier V-29. The left cathode of V-29 is connected through resistor 522 and NO contact 3 of the VOR band relay 488 to one side of the vertical pointer coils 514 of each of the ID-249 indicators, and the right cathode of V-29 is directly connected to the other side of each of the coils.

When the phase of the reference voltage is 90 degrees removed from the phase of the variable voltage (trainer-station true bearing equals selected trainer-station true bearing), the voltages on each of cathodes of V-32 and each of the grids of amplifier V-29 are equal, and the voltage across the coils of the ID-249 indicator is zero. Consequently, the vertical needles 490 remain centered, indicating to the pilot that the trainer is assumed to be on the selected trainer-station magnetic radial, or "on course." However, if the said phase relation is more or less than 90 degrees, rectifier V-32 places different potentials on the grids of V-29 resulting in current flow through the coils in one direction or the other, and corresponding deflection of the vertical pointers to the left or right, indicating to the pilot that the trainer must be turned to the left or right to bring it upon the selected radial. The magnitude of the deflection depends on the angular distance between the selected radial and assumed actual radial of the trainer to the station.

It is evident that the phase discriminator circuit will also have a zero output and the vertical needles of the ID-249 will be centered when the phases of the reference and variable voltages are also 270 degrees apart. Consequently, the pilot would be uncertain when the needle of his indicator is centered, without further information, whether he is on the desired radial or one 180 degrees removed therefrom. The ambiguity is resolved by applying the reference voltage (trainer-station true bearing) to the transformer T-20 through resistor 524 and condenser 526 which shift the phase of the reference voltage through 90 degrees. The selected trainer-station true bearing voltage shifted through 90 degrees induced in transformer T-19 is applied through NO contact 1 of the VOR band relay 488 to transformer T-21. Transformers T-20 and T-21, rectifier V-33 and amplifier V-34 form a discrimination circuit like the one described above, and the left cathode of V-34 is connected directly to one side of each of the coils 526 operating the "to-from" indication elements 528 of the ID-249 indicators. The right cathode of V-34 is connected through NO contact 4 of the VOR band relay 488 to the other side of each of the coils. The shifting of the phase of the voltage exciting transformer T-20 is in such direction that when the trainer is assumed to be on the selected radial the output of V-34 places a voltage across the said coils to cause the ID-249 to give a "to" indication. The "to" indication prevails as long as the trainer is assumed to be within 90 degrees on either side of the selected radial as measured from the station. When the trainer simulates a move to any other position, as in crossing the assumed location of the station, the shifting phase of the trainer-station true bearing voltage applied to the transformer T-20 operates V-34 to reverse the potential of the voltage across the coils 526 to cause the indicators to give a "from" indication. If the needle 490 is centered and the indication is "to," the pilot knows he is on the selected radial. If the needle is centered and the indication is "from" the pilot knows he is on the reciprocal of the selected radial. Needle position is not affected by assumed heading.

When the assumed location of the trainer is exactly 90 degrees from the selected radial, the phase of the reference voltage is 90 degrees removed from the variable voltage, the output of the discriminator circuit is zero, no voltage is placed across the coils, and the "to-from" indicator gives no indication.

A deflection of the needle indicates the direction to be followed to the selected radial providing the trainer's assumed heading is within 90 degrees of the bearing of the radial and the trainer is assumed to be located within 90 degrees of the radial as measured from the station. Otherwise, if the trainer is located within 90 degrees of the radial as measured from the station, the needle deflection indicates the direction away from the radial. This follows from the fact that direction of needle deflection is not a function of assumed heading, but solely of assumed trainer location. Consequently, with the same needle deflection, a reversal of assumed heading changes the direction of the heading correction (left or right) necessary to bring the trainer back to the selected radial. When the trainer is within 90 degrees from the selected radial as measured at the station, the "to-from" indicator always reads "to."

A deflection of the needle indicates the direction to be followed to the reciprocal of the selected radial when the trainer is assumed to be located within 90 degrees from the reciprocal of the radial as measured at the station, and the heading of the trainer is assumed to be within 90 degrees of the bearing of the reciprocal. Otherwise, the needle deflection indicates the direction away from the radial. When the trainer is within 90 degrees from the reciprocal of the selected radial, the "to-from" indicator always reads "from."

As previously stated, if the trainer is on the radial selected by the radial selector, the course deviation indicator 490 will be centered. It therefore follows that the pilot in the trainer may ascertain what radial he is assumed to be on by turning the radial selector knob 516 until needle 490 is centered and the ambiguity indicator 528 reads "to." The indicator 518 then indicates the radial upon which the trainer is assumed to be located. Under the same circumstances except the indicator 528 reading "from," indicator 518 indicates the reciprocal of the radial upon which the trainer is assumed to be located.

LOCALIZER (See Figs. 32–38)

The vertical or track needle 490 of the ID-249 may be used in actual flight by the pilot to guide the aircraft to approach an ILS station at a bearing through the longitudinal center line of the runway. The apparatus of this invention simulates this operation in the following manner:

The pilot tunes the ARN-14 tuning simulator to the proper frequency of the ILS station as set in by the instructor (108 to 112 megacycles), energizing the ILS band relay 482, providing the trainer is assumed to be within the range of the station in which case the beyond maximum range or not tuned relay 414 is deenergized. The instructor sets the ARN-14 maximum range potentiometer as in the VOR station simulation, with corresponding resultant operation taking place.

A voltage having a phase according to the factor of trainer-station true bearing is induced in the left stator coil of resolver 326 (Fig. 16), which voltage is routed through V-30 (Fig. 18), V-31, T-17, terminal G of PL-215 (Fig. 34), and is applied to the transformer T-18 of the discrimination circuit. Also, a voltage having a phase according to the factor of runway true approach bearing is routed through terminal D of PL-190, NC contact 3 of the beyond maximum range or not tuned relay 414, resistor 530, and the NO contact 1 of the ILS band relay 482 to the transformer T-16 of the discrimination circuit. Resistor 530 and condenser 532 shift the phase of the voltage 90 degrees.

The discriminator circuit functions as previously described, and when the factor of trainer-station true bearing equals true approach bearing of the runway, the output of the discriminator circuit is zero and the track needles 490 of the ID-249 indicators are centered, thus indicating proper assumed location of the trainer. Deflection of the needles from center indicates the direction of turn required to bring the trainer to the correct position along the localizer beam as previously described.

GLIDE PATH (See Figs. 49–52)

The ID-249 indicator (Fig. 36) also has a horizontal indicating needle which is operated by the glide path beam of an ILS station to enable the pilot to land on the runway of an ILS station at a glide path angle of between 2 and 4 degrees. When the horizontal and vertical pointers of the indicator are both centered, the pilot is "on course."

Figure 50:
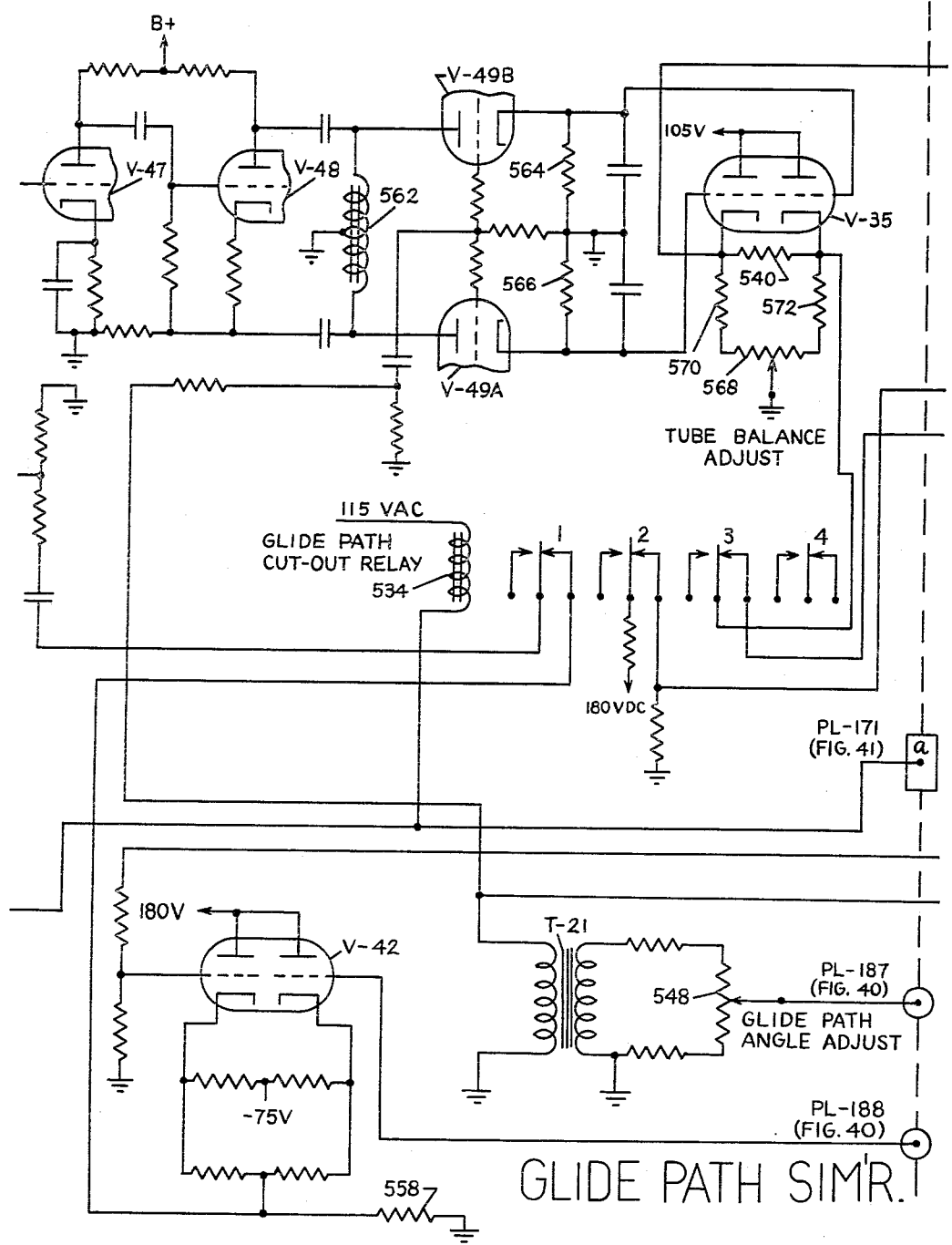
Figure 62:
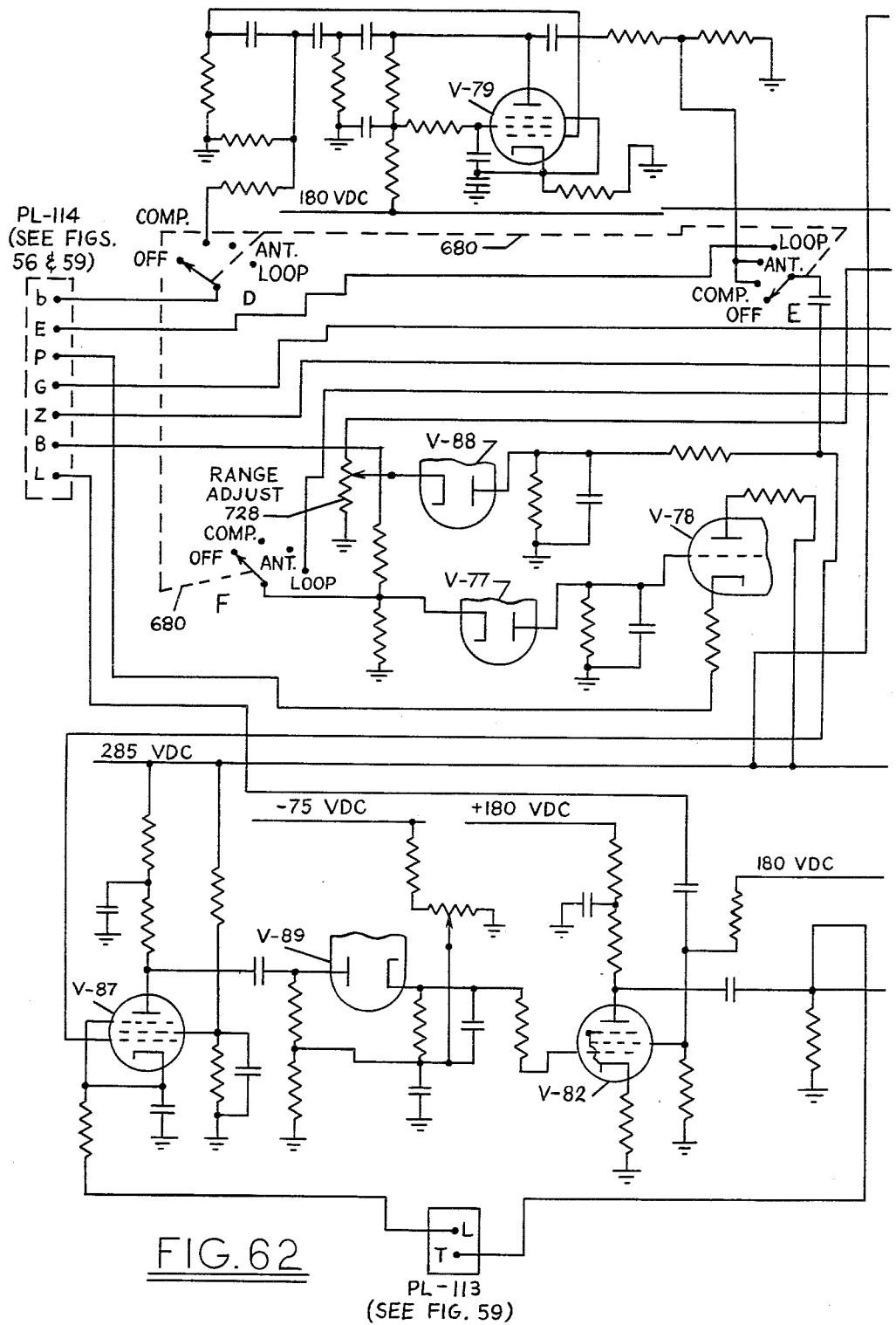
Figs. 62 to 64 are wiring diagrams of the low frequency station simulating system.
Figure 63:
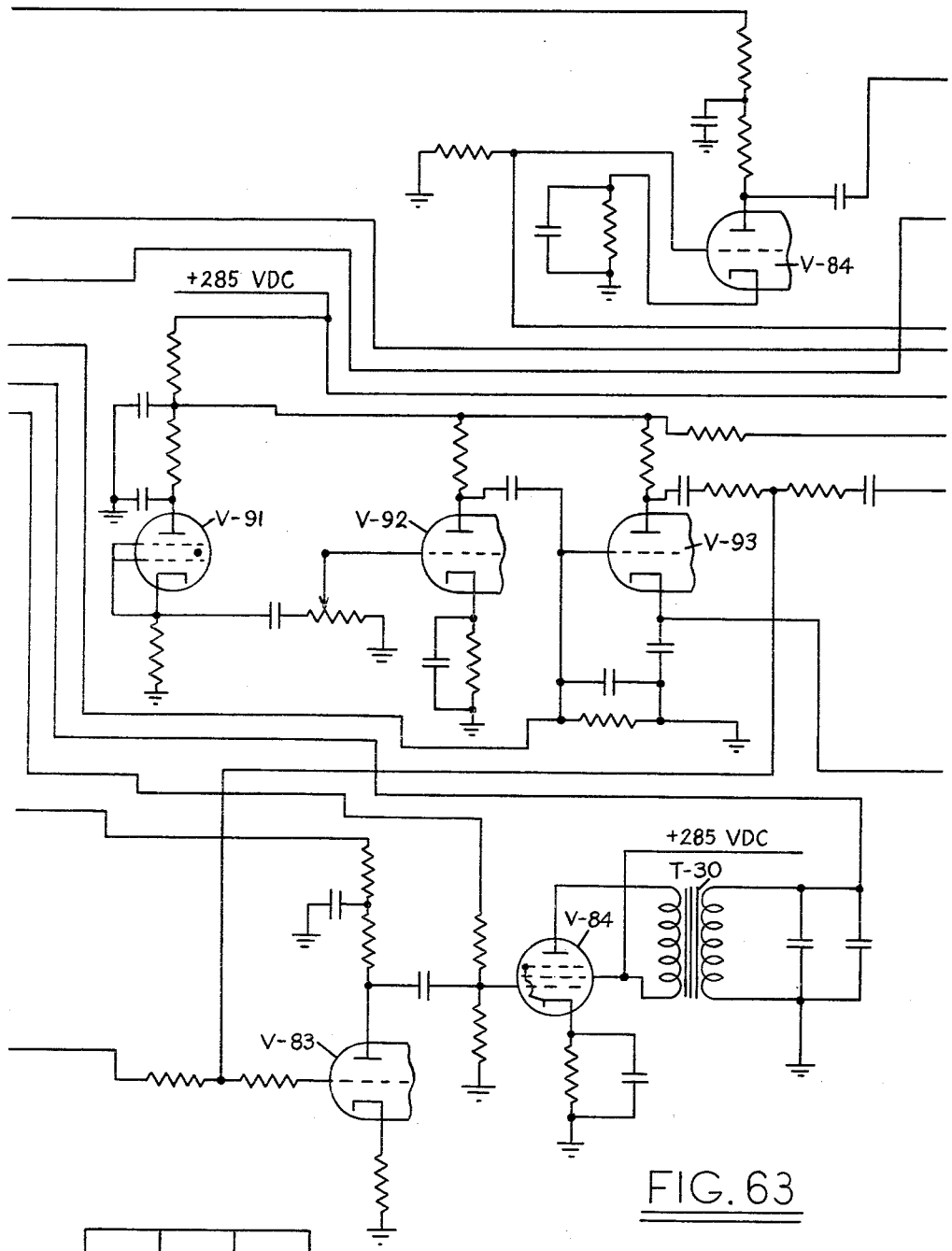
Figure 65:
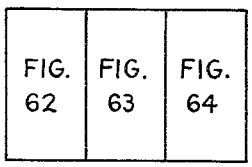
Fig. 65 is a view showing the manner in which Figs. 62 to 64 may be assembled to form a single composite wiring diagram.

In the operation of the apparatus of this invention simulating the foregoing, the glide path circuit is in operation when the glide path cut out relay 534, Fig. 50 is deenergized, in which case:

1. NC contact 2 provides a D. C. voltage to coils 536 to retract the horizontal flag alarms 538 on the pilot's and instructor's ID-249 indicators.

2. NC contact 3 completes a circuit through the resistor 540 across the outputs of amplifier V-35 and the coils 542 which control the position of the horizontal indicating needles 532.

The glide path circuit is inoperable when relay 534 is energized by grounding the bottom end thereof through terminal a of PL-171 (see also Fig. 41) and NC contact 2 of relay 482b on the distance measuring equipment simulator. This is produced by any one of the three following situations:

1. When the ARN-14 tuning simulator is not tuned to the ILS band of 108–112 megacycles. (If the tuning simulator is tuned to the ILS band (see also Fig. 21), 115 v. A. C. is applied through the arm of switch 392, conductor 394, PL-393 and relays 482a and 482b to the other side of the 115 v. A. C. source, energizing the relays and opening NC contact 2 of relay 482b. The energization of relay 482b applies 6.3 v. A. C. to the instructor's ILS indicator lamp 398, lighting the same to inform him that the pilot is tuned to the ILS band.)

2. When the trainer is assumed to be flying the reciprocal of the bearing of the glide path beam transmitted by the ILS station being simulated. (When the trainer is assumed to be flying the reciprocal course, or "from" the station, the voltage phase in transformer T-20 (Fig. 34) provides a large amplitude A. C. voltage which is conducted from the right side of transformer T-20 through terminal T of PL-177 to the grid of amplifier 36A, the output of which controls cathode follower V-36B. The output of V-36B is rectified by V-37B and applied as a positive bias to thyratron V-38 which has a fixed negative bias applied thereto. The positive voltage is sufficiently great to fire V-38, energizing the glide path cut out relay 534. The horizontal flag alarms 538 of the ID-249 indicators come into view, and the circuits to the horizontal pointer coils 542 are broken.)

3. When the trainer is beyond the assumed maximum range at which signals may be received. (The trainer-station range-true bearing voltage having an amplitude directly proportional to the assumed range of the trainer from the station is routed, when the student has properly tuned to the frequency of the station as set in by the instructor, through PL-178 (see Fig. 14) to the grid of amplifier V-39A. Tubes V-39A, V-39B, V-37A and V-40 function as do the corresponding tubes V-36A, V-36B, V-37B and V-38 to energize relay 534 when the trainer is out of range of the station, e. g., when the trainer-station range-true bearing voltage is greater than 1.6 v. A. C. which corresponds to a range of 20 miles. The maximum range cut out adjust potentiometer 546 is provided to secure this operation.)

The required elevation above the landing field to keep the horizontal indicator 532 of the ID-249 centered for a plane at a given range (measured horizontally) from the station on a glide path having an angle $\theta$ may be determined by the formula:

$$\text{Elevation} = \tan \theta \times \text{range}$$

Tan $\theta$ for small angles may be considered as equivalent to $\theta$.

The required elevation of the trainer for various assumed ranges according to the glide path angle of the transmitting station to keep the horizontal pointer centered is determined as follows:

A fixed amplitude, variable phase voltage is applied from terminal G of PL-215 (see Figs. 18 and 51) to excite transformer T-21 which shifts the phase thereof 180 degrees and excites the glide path angle adjustment potentiometer 548, the arm of which is set by the instructor according to the glide path angle $\theta$ of the station being simulated and taps off a voltage proportional to the glide path angle $\theta$. This voltage is routed through PL-187 (see Fig. 40) and excites the DME follow-up potentiometer 550, the arm of which is positioned by the range servomotor-generator set 552 of the DME simulator according to the factor of instant assumed trainer-station range, as will be explained. Consequently, the formula "Elevation=tan $\theta$ × range" is solved, the voltage from the arm of potentiometer 550 being proportional to the required instant assumed elevation to keep the horizontal indicator centered for the glide path angle and instant assumed range.

By comparing the required instant assumed elevation of the trainer with the actual instant assumed elevation of the trainer, an output may be obtained to properly position the horizontal indicator 532 of the ID-249. This is accomplished as follows:

The required instant assumed elevation voltage, determined as above, is applied from the arm of potentiometer 550 through PL-188 to the right grid of cathode follower V-42. The instant assumed elevation of the trainer above the landing strip of the ILS station being simulated is introduced in the form of a voltage corresponding thereto from the arm of the altitude potentiometer 554 to the left grid of tube V-54. The altitude potentiometer is excited by a constant amplitude A. C. voltage from the transformers T-17 and T-17A (Fig. 18) through terminals G and J of PL-215, which voltage is 180 degrees out of phase with the voltage applied to the right grid of V-42, as previously described. Tubes V-30A, V-31A and transformer T-17A function like elements V-30, V-31 and T-17. The arm of the altitude potentiometer 554 is positioned by the trainer according to the instant assumed elevation of the trainer above sea level, in a known manner, while the stator of the potentiometer is rotated by the instructor's field elevation control 556 by reference to suitable scale means, not illustrated, to a position corresponding to the landing field elevation above sea level. Consequently, the amplitude of the fixed phase voltage applied to the left grid of V-42 corresponds to the factor of instant assumed elevation of the trainer above the landing field.

If the two voltages applied to V-42 are equal in amplitude (required elevation=assumed elevation), the currents in the two cathodes will be equal but 180 degrees out of phase and the voltage developed across the resistor will be effectively zero. If the two voltages are not equal, the difference between the two will be impressed in amplitude and phase through NC contact 1 of the glide path cut-out relay 534 to the grid of amplifier V-43, the output of which is applied to the grid of tube V-44.

As the distance from the station increases, the greater must be the difference between required elevation and assumed trainer elevation to produce a given glide path angle error indication. $\phi$ may be used to designate the glide path angle error (approximately 0.4 degree necessary for full scale deflection of the horizontal indicating element 532 of the ID-249); E may be used to designate the difference between the required and assumed trainer elevations; and R may be used to designate the distance of the plane from the station. For small angles, R may be measured horizontally. Consequently, $$\tan \phi = \frac{E}{R}$$

and for small angles of $\phi$, $\phi$ may be considered as equal to $$\frac{E}{R}$$

As previously set forth, the factor E voltage is applied to the grid of tube V-44 which is of the remote cut-off type, i. e., its gain varies with its bias. The factor R D. C. voltage is obtained by applying the trainer-station range-true bearing voltage from PL-178 to the amplifier V-45, the output of which is rectified by V-46 and applied in the form of a negative voltage proportional to range to the grid of V-44. The characteristic curves and selected operating area of V-44 are such that the D. C. range voltage applied thereto as grid bias varies the gain of the tube by $$\frac{1}{R}$$

A satisfactory tube is designated 6BA6. Therefore the output of this tube, whose inputs are $$E \text{ and } \frac{1}{R}, \text{ will be } \frac{E}{R}$$

which is equal to $\phi$.

The output $\phi$ of V-44 is impressed on the grid of amplifier V-47 through the course width adjust potentiometer 560, and the output of V-47 is fed to phase inverter V-48 which produces two outputs 180 degrees out of phase with one another and which are respectively applied to the plates of phase detectors V-49A and V-49B. Reactor 562 is used to provide a low impedance to ground for the D. C. circuit to develop voltages across resistors 564 and 566 proportional to the current flow through tubes V-49B and V-49A, respectively. The same reference voltage used to excite transformer T-21 is applied to the grids of V-49A and V-49B. It is of such a phase that, depending upon which side of V-42 is conducting (V-42 impressing a voltage on the grid of V-44 varying in phase according to the relative magnitudes of required elevation and assumed trainer elevation and in magnitude according to the difference between the two), one of the tubes V-49A or V-49B (whichever is in phase with the reference voltage) will conduct and the other will not. Consequently, a voltage is impressed across the resistor 564 or 566, the magnitude of the voltage being proportional to the factor $\phi$, and this voltage is impressed on one of the grids of cathode follower V-35.

As previously explained, the coils 542 of the horizontal pointers 532 of the instructor's and pilot's ID-249 indicators are connected across the resistor 540 and cathodes of V-35 through NC contact 3 of the glide path cut out relay 534. Potentiometer 568 is a calibrating potentiometer to compensate for tube and resistor unbalance. As V-35 follows the signal impressed on one of its grids, the voltage differential across the resistors 570 and 572 will place a potential across the coils 542 to cause the indicating element 532 to move up or down from its center position, depending upon which side of the tube V-35 is conducting, thus indicating to the pilot that the trainer is below or above the required elevation. If the tariner is assumed to be on the glide path (required elevation=instant assumed elevation), V-42 puts out no signal, both sides of V-35 conduct equally, and the horizontal points 532 will be centered.

As the trainer approaches the station, the difference between instant assumed elevation and required elevation necessary to produce full scale deflection becomes so small that a slight air bump may cause full scale deflection. Consequently, the course softening adjust potentiometer 574 is provided to apply an initial low fixed negative bias on tube V-44. For relatively high range voltages, the said bias has little relative effect, but as assumed range approaches zero the said bias substantially decreases the gain of the tube thereby decreasing needle response to the output of V-42. The course width adjust potentiometer 560 is provided to regulate the angular deflection of the horizontal needle in response to the output of V-44.

DISTANCE MEASURING EQUIPMENT (See Figs. 39-48)

Distance measuring equipment measures the distance from the aircraft to a VOR station or to the touchdown point on the runway of an ILS radio station to which the receiver is tuned. It also measures the distance from the aircraft to a selected destination other than a VOR station when used in conjunction with the arbitrary course (Rθ) computer. The DME indicator in the plane as in the apparatus disclosed herein operates without action on the part of the pilot other than tuning to the frequency of the VOR or ILS station, and in the case of the apparatus of this invention no settings need be introduced by the instructor—all DME information is computed and transmitted automatically by the apparatus herein disclosed. The DME indicator has a counter 576 in a window of the dial 578 of the instrument which indicates distance in tens of miles, and the dial is graduated in half-mile increments from zero to ten. Needle 580 moves over the dial. The DME indications are in addition to the other signals, visual and aural, received from the VOR and ILS stations. The operation of the DME indicator in conjunction with a simulated VOR station is as follows:

A. TUNED TO VOR STATION AND BEYOND 100 MILES FROM VOR STATION

The trainer-station range-true bearing voltage, having a phase according to the trainer-station true bearing and an amplitude directly proportional to the trainer-station range, is conducted when the pilot has tuned to the VOR station to PL-185 (Fig. 14). The trainer-station range-true bearing voltage passes from PL-185 through NC contact 2 of the ILS band relay 482a, which as previously described is energized only when the pilot has tuned to the ILS band, and through a limiter-amplifier circuit comprising the three stages of amplification V-50, V-51 and V-52 with final clipping performed by V-52, the output of which is a square wave of fixed amplitude. The output of V-52 is applied through the phase adjustment potentiometer 582 and filter 584, the output of which is a 60 C. P. S. sine wave in phase with the trainer-station range-true bearing voltage. This output is applied to the power amplifier V-53, the output of which is applied to the transformer T-23.

The placing of the switch 382 (Fig. 21) in the "on" position applies 115 v. A. C. to PL-353 energizing the search motor 588.

When the aircraft is beyond a 100 mile distance from the tuned in station, the DME indicator searches, i. e., the needle moves at a constant rate over the face of the dial from zero to 100 miles, back to zero miles, etc. To simulate this, excitation for the range search potentiometer 586 is supplied from the output transformer T-23 through the search calibration potentiometer 590 which is adjusted to place a voltage across the search potentiometer eqoal to 100 miles of range (8 volts), which excitation is in phase with the trainer-station range-true bearing voltage. The arm of the search potentiometer 586 is driven continuously by the search motor 588 around the potentiometer 586 to take off a voltage continuously varying in amplitude from one representative of zero miles range to 100 miles range, back to zero miles range, etc. This voltage is routed via isolation tube V-54A, the parallel addition circuit 592, and NC contact 1 of DME in-range and tuned relay 506 to the range servo control voltage terminal to which is also applied the output of the range servo follow-up potentiometer tube V-55. The input to V-55 is the voltage taken off the arm of the range follow-up potentiometer 550a which is excited by the transformer T-23 through the ILS and VOR calibration potentiometer 594 and NC contact 2 of the arbitrary course computer on relay 324a, energized under circumstances later explained. The voltage across the follow-up potentiometer 550a is 180 degrees out of phase with the voltage across the search potentiometer 586 and is adjusted by the ILS and VOR calibration potentiometer 594 to an amplitude equal to 200 miles of range (16 v.). The amplitude of the input to V-55 is dependent upon the instant position of the output shaft of the range servo motor-generator set 552 which positions the arm of the potentiometer 550a.

The resulting search voltage and the range follow-up potentiometer voltage applied to the said range servo control voltage terminal are 180 degrees out of phase with one another, since both voltages originate from transformer T-23, and produce a difference or error voltage which is amplified by tubes V-56A and V-56B and impressed upon the grids of phase detector tubes V-57A and V-57B. Transformer T-23 provides the plate voltage for tube V-57B via NC contact 1 of the arbitrary course computer on relay 324a and supplies the plate voltage for tube V-57A via NC contact 4 of the arbitrary course computer on relay 324. These voltages are 180 degrees out of phase, and one is in phase with the error voltage and the other 180 degrees out of phase with the error voltage, dependent upon the relative amplitudes of the two inputs to the said terminal. The output of the phase detectors passes through a filter network 596 the output of which applies an error voltage to the range servo amplifier which controls the range servo motor of the set 552. The range servo amplifier and range servo motor-generator circuits and operation are exactly like those described in Figs. 15 and 16. The relative potentials between the error voltage input conductors to the range servo amplifier depend upon the relative amplitudes of the two voltages fed into the range servo control voltage terminal, and the range servo motor-generator is directionally responsive thereto. Consequently, the range servo motor-generator set 552 merely follows the varying search voltage taken from potentiometer 586 and applied to the control terminal. The servo motor-generator set is geared to the DME self-synchronous transmitter 598, Fig. 42, which is connected through the "on-off" switch 600 and PL-81 to the self-synchronous receivers 602, Fig. 45, and 604 Fig. 46 of the instructor's DME indicator and the pilot's DME indicator, and follow the motor-generator set 552 to give the proper search indications of from zero to 100 miles, back to zero, etc. The apparatus is arranged so that the time required to search from zero to 100 miles and from 100 miles to zero is approximately 15 seconds each way, as in the case of an airborne instrument. The pilot will recognize the same as a search indication.

B. TUNED TO VOR STATION AND WITHIN 100 MILES FROM VOR STATION

The varying search voltage taken from the search potentiometer 586 is also fed through input transformer T-24, which shifts the phase of the voltage 180 degrees, to cathode follower V-57A. Simultaneously, the trainer-station range-true bearing voltage having an amplitude directly proportional to the assumed range of the trainer from the station is routed from PL-185 to the grid of cathode follower V-57B, placing a voltage thereon 180 degrees out of phase with the voltage on the grid of V-57A. The outputs of the two tubes feed into the parallel addition circuit 606, the output of which is applied to the amplifier V-58, the output of which is in turn rectified by V-59 which places a negative bias on the grid of V-60. If at any instant the search voltage, varying in amplitude from a voltage of zero to 100 miles, is as large as the trainer-station range-true bearing voltage, which occurs when the trainer is within 100 miles of the station, or is "in range," the negative bias placed on the grid of V-60 becomes a minimum, permitting tube conduction and the within 100 miles relay 608 is energized. Energization of this relay permits 115 v. A. C. to be applied through NO contact 4 of either station one tuned relay 316 (Fig. 23) or station two tuned relay 320, depending upon which station is tuned, PL-50, the NC contact of the beyond 100 miles range relay 610, the NO contact of the within 100 miles range relay 608 to energize the DME in range and tuned relay 506. NO contact 3 of relay 506 acts as a holding contact to keep relay 506 energized until such time as relay 610 is subsequently energized, as will be explained. The energization of relay 506 routes 6.3 v. A. C. through its NO contact 2 to the instructor's DME indication lamp 612 and the pilot's DME indication lamp 614. These indications mean that the trainer is in range of and tuned to the station.

When the trainer comes in range, the search voltage previously applied through NC contact 1 of the DME in range and tuned relay 506 to the range servo control voltage terminal is interrupted, the DME indicators stop searching, and they begin to "track" as a result of the following:

The tuned trainer-station range-true bearing voltage is routed from PL-185 to the grid of the isolation tube V-61A, the output of which is routed through NO contact 1 of the DME in range and tuned relay 506 to the range servo control voltage terminal, to which is also applied the voltage from the follow-up potentiometer 550a, the two voltages being 180 degrees apart in phase. The result is a difference or error voltage which passes through tubes V-56A, V-56B, V-57A and V-57B, and the filter network 596 to the range servo amplifier which controls the servo motor-generator set 552 as previously described, in this instance the servo motor-generator set 552 following the trainer-station range-true bearing voltage. The instructor's and pilot's DME indicators consequently indicate the assumed range of the trainer from the station. As the trainer-station range-true bearing voltage changes in amplitude, the indicators correspondingly change to indicate the instant assumed trainer-station range.

C. TUNED TO VOR STATION AND TRAINER EXIT FROM 100 MILE RANGE OF VOR STATION

Exit of the trainer from the 100 mile operating limit of the DME is simulated as follows:

The trainer-station range-true bearing voltage from PL-185 is applied to the grid of the isolation tube V-62A. The maximum range calibration potentiometers 616 is excited by transformer T-23 with a voltage having a phase 180 degrees removed from the phase of the trainer-station range-true bearing voltage, and the arm of this potentiometer is set to apply a constant amplitude voltage representative of 100 miles range to the grid of cathode follower V-62B. The outputs of V-62B and V-62A are routed through the parallel addition circuit 618 to the grid of amplifier V-63, the output of which is rectified by V-64 and applied as a negative grid bias voltage controlling the conduction of V-65. When the voltage difference becomes zero, i. e., the trainer-station range-true bearing voltage is also equal to 100 miles of range, a minimum negative bias voltage is applied to the grid of V-65, resulting in an increase in the plate current thereof and an energization of the beyond 100 miles range relay 610. Consequently, the 115 v. A. C. circuit through the DME in range and tuned relay 506 is broken, and this relay becomes deenergized, reconnecting the search voltage output of V-54A through NC contact 1 of relay 506 to the range servo control voltage terminal, and breaking the connection between the trainer-station range-true bearing output tube V-61A through NO contact 1 of relay 506 and the said terminal. Consequently, the DME indicators begin to give the search indications as described above.

D. DISTANCE MEASURING EQUIPMENT WITH ARBITRARY COURSE COMPUTER

1. *Within 100 miles from VOR station.*—The apparatus of this invention provides means whereby the operation of the arbitrary course (R$\theta$) computer carried by a plane in actual flight may be simulated. The apparatus of this invention also provides means whereby when the operation of the arbitrary course computer is being simulated, the DME indicators will indicate the instant assumed distance of the trainer from the destination. The simulation is accomplished as follows:

When a simulated arbitrary course is being followed by the pilot, the ARN-14 pilot's selector switch 392 (Fig. 33) is placed on one of the VOR contacts 7-11 for VOR station tuning. The pilot's selector switch 486 is placed in the computer track position (see Fig. 37), and 115 v. A. C. passes through the upper branch of switch 486, conductor 487 and the arbitrary course computer on relays 324 (Fig. 32) and 324a (Fig. 43) to energize the same.

A constant amplitude voltage having a phase according to the magnetic variation at the location of the VOR station is applied from terminals b and T of PL-169 (Fig. 35) to the rotor of resolver 500, which rotor is set by the pilot by knob 492 according to the magnetic bearing of the destination from the station, resulting in the induction of a constant amplitude voltage having a phase according to the true bearing of the destination from the station in the lower stator coil of the resolver. This voltage is placed across the potentiometer 504, the arm of which is set by the pilot by knob 494 according to the distance of the destination from the station being simulated. The voltage from the said arm, having an amplitude according to the station to destination distance and a phase according to the station to destination true bearing, which voltage is referred to as the "station-destination range-true bearing voltage," is routed through PL-186 and NO contact 3 of the arbitrary course computer on relay 324a to the grid of cathode follower V-26B. Simultaneously, the trainer-station range-true bearing voltage, having an amplitude directly proportional to the assumed distance of the trainer from the station and a phase according to the true bearing of the station from the trainer is routed from PL-185 (Fig. 14) through NO contact 4 of the DME in range and tuned relay 506 and NC contact 3 of the ILS band relay 482a to the grid of cathode follower V-26A. Tubes V-26A and V-26B and the parallel addition circuit 508 vectorially add the station-destination range-true bearing voltage and the trainer-station range-true bearing voltage, both variable in phase and amplitude as stated, and produce a resultant output voltage having an amplitude directly proportional to the assumed distance of the destination from the trainer and a phase according to the true bearing of the destination from the trainer. This trainer-destination range true bearing voltage is amplified by V–27A and V–27B and is routed through the NO contact 2 of the arbitrary course computer on relay 324 and PL–184 (Fig. 14) to the grid of V–5 of the high frequency bearing servo. (It will be noted that when relay 324 is energized the trainer-station range-true bearing voltage from PL–185 is not routed to V–5 of the high frequency bearing servo.) The rotor of resolver 326 (Fig. 16) is excited by a voltage having a phase according to the magnetic variation at the location of the VOR station, and the high frequency bearing servo is operated to position the output shaft of the motor-generator set 340 according to the factor of trainer-destination magnetic bearing.

The left stator coil of the resolver 326 of the high frequency bearing servo has induced therein a constant amplitude voltage having a phase according to the trainer-destination true bearing, which voltage is routed through V–30, V–31, T–17 and terminal G of Pl–215 (see Fig. 43) to the grid of isolation tube V–66, the output of which excites the primary of transformer T–25 which shifts the phase of the voltage 180 degrees. The left side of the secondary of T–25 is connected through NO contact 4 of the arbitrary course computer on relay 324 to the anode of phase detector V–57A and the other side of T–25 is connected through NO contact 1 of the arbitrary course computer on relay 324a to the anode of phase detector V–57B. Also, transformer T–25 is connected through the arbitrary course computer calibration potentiometer 620 and the NO contact 4 of the arbitrary course computer on relay 324a to the range servo follow-up potentiometer 550a. The said potentiometer 620 is set to place a voltage representative of 200 miles (16 v.) across potentiometer 550a. The said voltage is set representative of 200 miles range since in the case of the airborne apparatus being simulated the DME equipment functions when within 100 miles of the station and the maximum distance from the station at which an arbitrary destination may be selected is also 100 miles. Consequently, when the plane, station and destination are in a straight line and the plane and destination are on opposite sides of the station, the DME indication is 200 miles.

Station-destination range-true bearing voltage, having an amplitude and phase as explained, also is routed from PL–186 through the NO contact 1 of the arbitrary course computer on relay 324 to the grid of isolation tube V–61B, and the trainer-station range-true bearing voltage is routed from PL–185 to the grid of isolation tube V–61A. The vector outputs of each of these two tubes are added to give a resultant trainer-destination range-true bearing voltage having a phase according to the bearing of the destination from the trainer and an amplitude according to the distance of the destination from the trainer. This voltage output is routed through NO contact 1 of the DME in range and tuned relay 506 to the range servo control voltage terminal.

Figure 42:
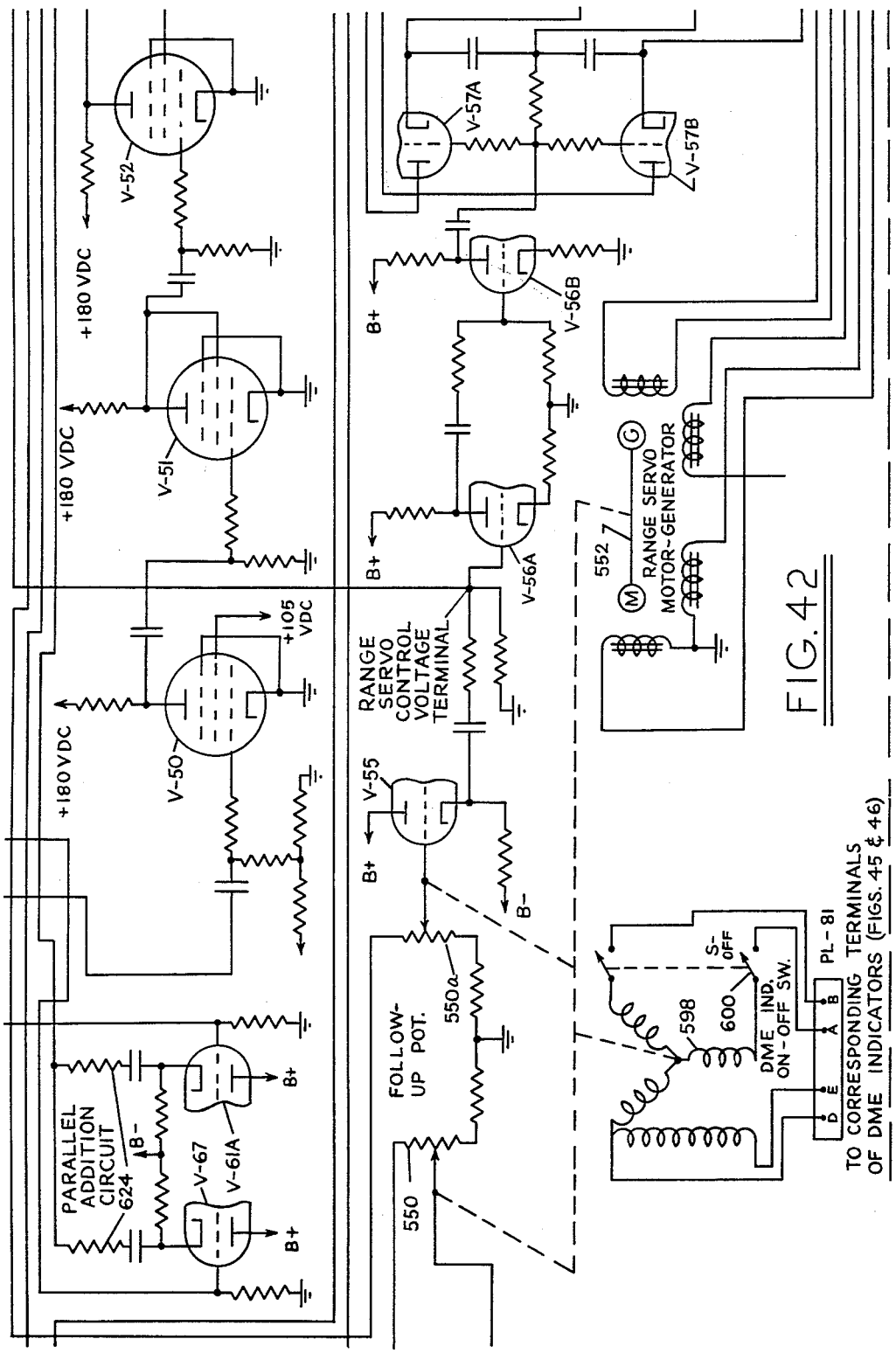

The output of the range servo follow-up potentiometer tube V–55, having a phase shifted 180 degrees from the phase of the trainer-destination range-true bearing voltage and an amplitude according to the position of the arm of potentiometer 550a driven by the range servo motor-generator set 552, is also applied to the range servo control voltage terminal (Fig. 42). Therefore the two voltages applied to this terminal are 180 degrees out of phase, the difference or error voltage is amplified by V–56A and V–56B, the output of which is applied to the grids of phase detectors V–57A and V–57B. The output of tubes V–57A and V–57B provide the signal input to the range servo amplifier which operates servo motor-generator set 552 as previously described. Consequently, as the trainer-destination range-true bearing voltage input to the range servo control voltage terminal changes in amplitude, the servo follow-up system is operated to drive the self-synchronous transmitter 598 which controls the DME indicators (Fig. 47) to give the proper indication of instant assumed trainer to destination range or distance.

2. *Beyond 100 miles from VOR station.*—When the the trainer is assumed to be more than 100 miles from the tuned in station, tracking stops and searching begins as explained above. However, when the arbitrary course (Rθ) computer of a plane is in operation, the DME indicator gives a search indication equal to the vector addition of the station to destination distance and of a vector constantly varied from zero to 100 miles of the station to plane vector. This searching is simulated by the apparatus of this invention as follows:

The trainer-station range-true bearing voltage from PL–185, Fig. 43, passes through NC contact 2 of the ILS band relay 482a to the grid of V–50, which with V–51, V–52, the phase adjust potentiometer 582, filter 584 and power amplifier V–53 places a voltage across the output transformer T–23 having a constant amplitude and a phase corresponding to the trainer-station true bearing. This voltage is routed from the right side of the transformer through the search calibration potentiometer 590 and applied as excitation to the search potentiometer 586. As previously explained, the search calibration potentiometer is adjusted to place a voltage representative of 100 miles of range (8 v.) across the potentiometer 586.

A voltage varying in amplitude of from zero to 100 miles of range, etc., is taken off by the arm of potentiometer 586 and applied to the grid of isolation tube V–54A. At the same time, the station-destination range-true bearing voltage from PL–186 is fed through NO contact 3 of the arbitrary course computer on relay 324 to the grid of isolation tube V–54B.

The outputs of tubes V–54A and V–54B are vectorially added through the parallel addition circuit 592 producing an output voltage constantly varying in amplitude and phase according to the vector sum of the two input voltages. When the search voltage input is zero, the vector sum (phase and amplitude) is the station to destination voltage, and when the search voltage is equal to one hundred miles, the vector sum has a phase representative of the bearing from a point to the destination, the said point being 100 miles from the station on a line from the trainer to the station, and the vector sum has an amplitude according to the distance of the point to the destination. This varying voltage, referred to as the arbitrary course computer search voltage, is routed through NC contact 1 of the DME in range and tuned relay 506 (deenergized as previously explained when the assumed range to the station from the trainer is more than 100 miles) to the range servo control voltage terminal.

At the same time, the zero-100 mile search voltage from the arm of search potentiometer 586 is routed via NC contact 4 of the DME in range and tuned relay 506 and NC contact 3 of the ILS band relay 482a to the grid of isolation tube V–26A. The station to destination voltage is also applied from PL–186 and routed through NO contact 3 of relay 324a to the grid of tube V–26B. The outputs of V–26A and V–26B are vectorially added by the parallel addition circuit 508 to produce a voltage varying in amplitude and phase exactly like the arbitrary course computer search voltage output of tubes V–54A and V–54B. This second arbitrary course computer search voltage is amplified by tubes V–27A and V–27B and is routed through NO contact 2 of the arbitrary course computer relay 324 and PL–184 (see Fig. 14) to the grid of tube V–5 of the high frequency bearing servo. The varying phase of the voltage applied to V–5 operates the high frequency bearing servo to cause the shaft of the motor-generator set 340 to follow the shifting phase of the input voltage, as previously explained. For reasons previously explained, a constant amplitude voltage having a phase varying with the phase of the arbitrary course computer search voltage is induced in the left stator coil of resolver 326 and is routed through V–30, V–31, T–17 and terminal G of PL–215 (see Fig. 43) to the DME simulator where it is applied to the grid of V-66. The output of V-66 is applied to the phase shifting transformer T-25, the secondary of which applies voltages to the anodes of V-57A and V-57B through NO contact 4 of the arbitrary course computer on relay 324 and NO contact 1 of the arbitrary course computer on relay 324a. At the same time, the arbitrary course calibration potentiometer 620 is excited by T-25, and excitation from the arm thereof is applied through NO contact 4 of the arbitrary course computer on relay 324a to the range servo follow-up potentiometer 550a.

Consequently, the range servo follow-up potentiometer 550a is energized by the arbitrary course computer search voltage shifted through 180 degrees. The arm of potentiometer 550a is connected to the grid of V-55, the output of which goes to the range servo control voltage terminal. Into this same terminal is fed the arbitrary course computer search voltage. Consequently, the range servo motor-generator set 552 follows the arbitrary course computer search voltage to operate the DME indicators to give a continuously varying indication between the station to destination distance to the vector sum of the station to destination distance plus the distance from a point to the station, the said point being 100 miles from the station and on a line from the trainer to the station, back to the station to destination distance, etc.

E. TUNED TO ILS STATION AND BEYOND 100 MILES FROM ILS STATION

When the pilot places his band selector switch 392 (Fig. 33) in an ILS frequency position of 108 to 112 megacycles, 115 v. A. C. is applied through PL-393 (Fig. 41) to the ILS tuned relays 482a and 482b, energizing the same.

A voltage of constant amplitude and having a phase according to the true approach bearing of the runway is routed through terminal d of PL-171 (Fig. 13), the runway length calibration potentiometer 622 and NO contact 4 of the ILS band relay 482a to the grid of cathode follower V-26B. Runway length calibration potentiometer 622 is set by the instructor according to the distance of the touchdown point on the runway of the ILS station being simulated from the transmitter of the ILS station. Consequently, the voltage applied to the grid of V-26B is of a phase according to the true approach bearing of the runway and has an amplitude directly proportional to the assumed distance of the touchdown point from the station. This voltage is referred to as the station-touchdown point range-true bearing voltage. At the same time the trainer-station range-true bearing voltage is routed from PL-185 through NO contact 3 of the ILS band relay 482a to the grid of cathode follower V-26A. The vector inputs of V-26A and V-26B are vectorially added by the parallel addition circuit 508, the output of which is the resultant of the vector inputs in the form of a voltage having a phase according to the trainer-touchdown point true bearing and an amplitude according to the trainer-touchdown point distance or range. This voltage is called the trainer-touchdown point range-true bearing voltage and is amplified by tubes V-27A and V-27B and is routed through the NO contact 2 of the ILS band relay 482a, through the limiter-amplifier circuit comprising tubes V-50, V-51 and V-52 and through the phase adjust potentiometer 582, filter 584 and amplifier V-53 to the primary of transformer T-23. The circuit from V-50 to the secondary of transformer T-23 functions as previously described to place across the secondary of the transformer a fixed amplitude 60 cycle sine wave voltage having a phase corresponding to the trainer-touchdown point true bearing. This voltage is applied through the ILS and VOR calibration potentiometer 594 and NC contact 2 of the arbitrary course computer on relay 324a to the follow-up potentiometer 550a. Consequently, potentiometer 550a is excited with a voltage having an amplitude equivalent to 200 miles of range and a phase shifted 180 degrees from the trainer-touchdown point true bearing.

At the same time the search potentiometer 586 is excited by transformer T-23 with a voltage having an amplitude representative of 100 miles of range (8 v.) and having a phase 180 degrees displaced from the phase of the excitation applied to the follow-up potentiometer 550a. Also, transformer T-23 applies voltages to the anodes of V-57A and V-57B through NC contact 4 of arbitrary course computer on relay 324 and NC contact 1 of arbitrary course computer on relay 324a.

When the trainer is assumed to be more than 100 miles from the ILS station, the search voltage from the arm of the search potentiometer 586 is applied to the grid of V-54A, the output of which is applied through the parallel addition circuit 592 and NC contact 1 of the DME in range and tuned relay 506 to the range servo control voltage terminal. The apparatus operates as previously described to cause the range servo motor-generator to follow the search voltage, and consequently the DME indicators give an indication of from zero to 100 miles, back to zero, etc.

F. TUNED TO ILS STATION AND WITHIN 100 MILES FROM ILS STATION

In the case of an airborne DME indicator, the instrument indicates the distance of the plane from the touchdown point on the runway when the plane is within 100 miles from the ILS station. The touchdown point is located at a distance, e. g., 2 miles, from the ILS station. The apparatus of this invention functions to give the pilot in the trainer a corresponding indication in the following manner:

The trainer-station range-true bearing voltage is routed from PL-185 to the grid of cathode follower V-57B, and the search voltage is routed from the arm of the search potentiometer 586 through the transformer T-24 which shifts the phase of the search voltage which corresponds to the trainer-touchdown point range-true bearing voltage through 180 degrees and applies it to the grid of cathode follower V-57A. When at any instant the search voltage is as great as the trainer-station range-true bearing voltage, the within 100 miles relay 608 is energized, as is the DME in range and tuned relay 506. (The phases of the voltages applied to V-57A and V-57B may be somewhat more or less than 180 degrees apart, but since the touchdown point is relatively close to the ILS DME transmitter, e. g., a mile or two, the within 100 miles relay 608 is energized at substantially the instant when the trainer is assumed to be at a 100 mile distance from the station.) The DME indicator lights 612 and 614 are illuminated and the circuit from the search potentiometer 586 to the range servo control voltage terminal is opened, terminating the searching of the DME indicators. The DME indicators then begin to track as a result of the following:

The station-touchdown point voltage from the runway length calibration potentiometer 622, having a phase according to the bearing of the touchdown point from the ILS station and an amplitude according to the distance between them is routed through NO contact 1 of the ILS band relay 482a and applied to the grid of cathode follower V-67. The trainer-station range-true bearing voltage is applied from PL-185 to the grid of cathode follower V-61A. The output of the parallel addition circuit 624 is the vector resultant of the two vector inputs, and is a voltage having an amplitude according to the trainer-touchdown point distance and a phase according to the trainer-touchdown point true bearing. This trainer-touchdown point range-true bearing voltage is routed through NO contact 1 of the DME in range and tuned relay 506 to the range servo control voltage terminal. The range servo follow-up potentiometer 550a is excited as explained in the previous section with a voltage displaced 180 degrees from the trainer-touchdown point range-true bearing voltage, which voltage is applied to the said terminal from the arm of the potentiometer through tube V–55. Consequently, the range servo motor-generator set 552 follows changes in the amplitude of the trainer-touchdown point range-true bearing voltage, and the DME indicators register the instant assumed distance of the trainer from the touchdown point of the runway of the ILS station.

G. TUNED TO ILS STATION AND TRAINER EXIT FROM 100 MILE RANGE OF ILS STATION

The trainer-station range-true bearing voltage is applied to the grid of cathode follower V–62A and a voltage having an amplitude equivalent to 100 miles of range and a phase according to the trainer-touchdown point bearing shifted through 180 degrees is applied from transformer T–23 through the maximum range calibration potentiometer 616 to the grid of cathode follower V–62B. When the trainer-station range-true bearing voltage equals in amplitude the voltage applied to V–62B, the beyond 100 miles range relay 610 is energized, deenergizing the DME in range and tuned relay 506, and causing the DME indicators to search instead of track. (Again, the phases of the voltages applied to V–62A and V–62B may be somewhat more than 180 degrees apart, but the beyond 100 miles relay 610 is energized at substantially the time the trainer is assumed to be 100 miles from the station.)

H. NOT TUNED TO A VOR OR ILS STATION

The foregoing discussion of the DME simulator relates only to the case where the ARN–14 is tuned to the frequency of a VOR or ILS station as set by the instructor. In the case of the DME indicator in a plane in actual flight, when the radio receiver with which the DME indicator is associated is turned on, if the receiver is not tuned to the frequency of a VOR or ILS station, the DME indicator constantly searches from zero to 100 miles, back to zero, etc. The following operation of the apparatus simulates this performance:

As previously stated, when the student has not tuned to the frequency of the VOR or ILS station, a constant phase large amplitude voltage from transformer T–5 winding E (see Figs. 11 to 14) is conducted through NC contact 1 of station one or station two tuned relay 390 to PL–185 (Fig. 43) and through NC contact 2 of the ILS band relay 482a to tube V–50 which, with tubes V–51, V–52, the phase adjust potentiometer 582, filter 584 and amplifier V–53 places a constant phase, constant amplitude voltage across the transformer T–23. The operation of the apparatus is then identical with the case discussed above when the trainer is assumed to be beyond the 100 mile distance to a tuned in station, since the DME in range and tuned relay 506 is deenergized, and the apparatus operates to give the above described search indication of the DME indicators. The lights 612 and 614 will not be illuminated, thus indicating to the instructor and pilot that the ARN–14 is not tuned to the frequency of the transmitting station.

ARBITRARY COURSE COMPUTER WITH ID–249

(See Figs. 32–48)

The airborne arbitrary course computer provides means whereby the pilot may fly the plane to a destination located at a distance from a VOR station by maintaining the course deviation indicator, an instrument such as the ID–249, centered. One such airborne computer is the ARN–21, the operation of which is simulated in the following manner:

If the pilot has tuned to the frequency of the VOR station and the trainer is within 100 miles range of the station as previously explained, the DME in range and tuned relay 506 is energized and placing of the ARN–21 selector in the "computer track" position energizes the arbitrary course computer on relays 324 and 324a. The pilot's azimuth control 492 (Fig. 33) is set according to the magnetic bearing of the destination from the VOR station and the pilot's distance control 494 is set according to the distance of the destination from the VOR station. For reasons previously explained, a voltage having an amplitude according to the station to destination range and a phase according to the station to destination true bearing, which voltage is designated the station-destination range-true bearing voltage, is routed through PL–186 (Fig. 43) and NO contact 3 of the arbitrary course computer on relay 324a to the grid of cathode follower V–26B. At the same time the trainer-station range-true bearing voltage is routed from PL–185 through NO contact 4 of the DME in range and tuned relay 506, NC contact 3 of the ILS band relay 482a to the grid of cathode follower V–26A. The two vector outputs of the tubes V–26A and V–26B are routed through the parallel addition circuit 508, the output of which is a voltage having an amplitude corresponding to the trainer to destination distance and a phase according to the trainer to destination true bearing, which voltage is referred to as the "trainer-destination range-true bearing voltage." This voltage is amplified by tubes V–27A and V–27B and is routed through NO contact 2 of the arbitrary course computer on relay 324 and PL–184 (see Fig. 14) to the grid of V–5 of the high frequency bearing servo. The servo is operated to position the output shaft of the motor-generator set 340 according to the combined factors of magnetic variation at the location of the station and trainer-destination true bearing, which combined factors produce the factor of trainer-destination magnetic bearing.

The left stator coil of the resolver 322 of the high frequency bearing servo has induced therein a constant amplitude voltage having a phase corresponding to the trainer-destination true bearing, which voltage is routed through V–30, V–31, T–17 and terminal G of PL–215 (see Fig. 34) to transformer T–18 of the previously described discriminator circuit.

The pilot's ID–249 course set knob 516 (Fig. 33), when flying an arbitrary course, is set according to the magnetic bearing of the course which he selects to follow to the destination, as indicated by indicator and for reasons previously explained, there is induced in the rotor of the selector resolver 520 a constant amplitude voltage having a phase according to the selected true bearing of the trainer to the destination, shifted through 90 degrees. This voltage is applied to the left grid of amplifier V–28, the output of which is applied to transformer T–19, the output of which in turn is routed through NO contact 2 of the VOR band relay 488 to the transformer T–16 of the discriminator circuit. Consequently, there is induced in transformer T–18 of the discriminator circuit a constant amplitude voltage having a phase corresponding to the computed trainer-destination true bearing, and there is induced in transformer T–16 a constant amplitude voltage having a phase corresponding to the selected trainer-destination true bearing, shifted 90 degrees. When the two phases are 90 degrees apart, as previously explained, the vertical or track needles 490 of the ID–249 indicators are centered, indicating that the trainer is on the desired course to the destination. Deviation of the said needles from the centered position is responsive directionally and in amplitude to the departure of the trainer from the desired course, as previously described.

To remove the ambiguity from the indication of the ID–249 indicators when flying a simulated arbitrary course, the computed trainer-destination true bearing voltage is also applied from terminal G of PL–215 through resistor 524 and condenser 526, which shift the phase thereof 90 degrees, to transformer T–20 of the second discriminator circuit, and the selected trainer-destination true bearing voltage, shifted through 90 degrees, is applied from transformer T–19 through NO contact 1 of the VOR band relay 488 to transformer T–21 of the second discriminator circuit. This discriminator circuit operates the to-from indicators 528 of the ID-249 indicators as previously described.

In view of the foregoing, it will be appreciated, without a detailed explanation, that when the apparatus of the invention is used in flying an assumed selected course to an arbitrary destination, the ID-249 indicator track needles 490 and the to-from indicators 528 operate as though the VOR station were located at the selected destination, and the indications of the ID-249 instruments are interpreted as though such were the case. The pilot in the trainer may, therefore, after setting the controls 492 and 494 rotate control 516 until the indicator 490 is centered, and by reading the indicator 518 read the assumed bearing from the instant assumed location of the trainer to or from the destination. The ambiguity may be resolved by referring to the indicator 528.

The arbitrary course computer simulator disclosed herein is operable only when the pilot has tuned to the frequency of a VOR station, thereby simulating the operation of an airborne arbitrary course computer. The ID-249 and DME indicator (Fig. 47) operate simultaneously when flying an arbitrary course.

RADIO MAGNETIC INDICATOR AND ID-249 WITH VOR STATION

*(See Figs. 53 to 58)*

The simulation of the radio magnetic indicator (RMI) in a plane in conjunction with a VOR station and the joint operation of the RMI and ID-249 indicators is accomplished as follows:

The rotor of the self-synchronous transmitter 630, Fig. 54, located in the heading servo of the trainer is excited by a 400 C. P. S. 26 v. signal and is positioned, as indicated on the drawing, according to the combined factors of trainer magnetic heading plus the precession of a gyro flux-gate compass. The factor of magnetic heading comprises the factors of assumed trainer true heading plus variation at the assumed location of the trainer. A corresponding voltage is induced in the stator of transmitter 630 and is routed to the stators of the dial drive self-synchronous receivers 632 of the pilot's and instructor's RM indicators (Fig. 57). The same voltage is induced in the rotor of each of the self-synchronous receivers 632, which voltages are respectively routed through the adjustment potentiometers 634, Fig. 53 and Fig. 55, of the conventional RMI amplifiers and to the transformers T-28 having a center-tap to ground, and then to the grids of the phase detectors V-70 which feed the transformers T-29. The outputs of these transformers are routed to the field winding of each of the RMI dial drive motors 636 energizing the same and directionally driving the rotors of the stators of the self-synchronous receivers until the error signal inputs to the transformers T-28 from the rotors is zero, at which instant the rotors of the self-synchronous receivers are in the same position relative to their stators as is the rotor of the transmitter 630 relative to its stator. The dial 638 of each of the RM indicators is connected to its associated dial drive motor 636 and consequently is rotatably positioned relative to the case 640 of the instrument so that the assumed magnetic heading of the trainer plus simulated compass precession is indicated by the position of the dial relative to the fixed index mark 642.

The assumed trainer magnetic heading plus precession voltage induced in the stator of the self-synchronous transmitter 630 is also applied through terminals U and Y of PL-174 (see Fig. 16) to the rotor of the self-synchronous unit 644 of the high frequency bearing servo, which rotor is positioned by the motor-generator set 340 according to the factor of trainer-station magnetic bearing when the pilot is flying the trainer on a selected radial to a VOR station. The stator of unit 644 consequently has induced therein a voltage corresponding to the assumed bearing of the VOR station relative to the longitudinal axis of the trainer plus compass precession, which voltage is referred to as the trainer-station relative bearing plus compass precession voltage, the term "relative" being employed to introduce the factor of assumed trainer heading. This voltage is routed through terminals V and W of PL-174 through the NO contacts 2 and 3 of the RMI cut out relay 489 (see Figs. 32 to 35), energized when the beyond maximum range or not tuned relay 414 is de-energized which occurs when the trainer is "in range" and the pilot is tuned to a VOR station, to the stators of the self-synchronous receivers 646 to the rotor of each of which is connected one of the pointers 648 of the RM indicators. The rotor associated with each stator 646 is consequently positioned relative to the case of its associated RM indicator according to the assumed trainer-station relative bearing plus compass precession. In view of the fact that the dials 638 of the RM indicators are positioned according to the magnetic heading of the trainer plus trainer precession, the factors of magnetic heading of the trainer and precession are cancelled out, and the pointers 648 are positioned relative to the dials 638 to indicate the assumed trainer-station magnetic bearing. Therefore, to follow an assumed course to the location of the VOR station, the student merely changes the assumed heading of the trainer until the pointer 648 of his indicator points to the index 642 on the instrument case. Maintaining the said positions, the assumed heading of the trainer is toward the station, but in the presence of assumed wind conditions the assumed course of travel of the trainer may not be in a straight line to the station. The position of the dials 638 of the RM indicators relative to the index 642 then indicate the assumed magnetic heading of the trainer plus precession.

Alternatively, having so adjusted the assumed heading of the trainer, the pilot can operate the azimuth knob or radial selector 516 (Fig. 36) of his ID-249 indicator until the vertical or track needle 490 thereof is centered, and by maintaining the position thereof follow an assumed course to the VOR station. The bearing reading of the ID-249 will vary from the magnetic heading reading of the RM indicators by an amount depending upon the precession introduced into the system in the heading servo and the difference between magnetic variation at the VOR station and location of the trainer.

The magnetic heading plus compass precession voltage is also routed from the stator of unit 630 to the stator of the self-synchronous receiver 650 of the pilot's and instructor's ID-249 indicators (Figs. 53 and 55), which stators are also positioned by the azimuth knobs 516 of the indicators according to the magnetic radial that the pilot desires to fly to the station. When the assumed magnetic heading of the trainer plus the compass precession is the same as the reading of counters 518, the rotors of units 650 centrally position the needles 652 (Fig. 36) of the ID-249 indicators in the upright positions relative to the fixed dials 654, thereby indicating that the magnetic heading of the trainer plus compass precession is in agreement with the reading of counters 518. Counters 518 then give the same reading as the position of dials 638 relative to index marks 642. Deviation of the trainer from such a course results in displacement of the needles 652 from the central positions in direction and amplitude depending upon the direction and amplitude of the deviation of the trainer heading from the course. It will be noted that the counters 518 do not indicate, when needles 652 are centered, the magnetic course of the trainer to the extent that precession is introduced in the system. When precession is present in the system and needle 652 is centered, needle 490 is not centered, and vice versa. When needles 490 are centered, indicators 518 indicate the magnetic course to the station, regardless of precession, and the same is true of needles 648 relative to dials 638.

The apparatus of this invention functions at all times to position the dial 638 (Fig. 57) relative to the index mark 642 to indicate assumed magnetic heading of the trainer plus precession.

When the apparatus of this invention is operating to simulate an airborne arbitrary course computer, as described above, and the trainer is assumed to be beyond the range of the station or the pilot is not tuned to the frequency of the VOR station, the beyond maximum range or not tuned relay 414 (Fig. 34) is energized and the RMI cut-out relay 489 (Figs. 32 and 34) is de-energized. The voltage from stator 644 does not pass to stator 646, and the pointer 648 is dead.

However, when arbitrary course computer operation is being simulated and the trainer is in range and the pilot is tuned to the frequency of the VOR station, the RMI cut-out relay 489 is energized. The rotor of unit 644 is positioned according to the trainer-destination magnetic bearing. The rotor of unit 644 is excited by a voltage corresponding to trainer heading plus precession, and consequently the voltage induced in the stator of unit 644 corresponds to the trainer-destination relative magnetic bearing plus precession, the term "relative" being employed to include the factor of trainer heading. The pointers 648 are positioned accordingly, and indicate relative to the dials the trainer-destination magnetic bearing. By regulating assumed heading so that the pointers coincide with the index marks 642, the trainer may be brought on an assumed heading toward the destination. The ID-249 indicators may be set and function as previous described when flying toward a VOR station.

When an ILS station is being simulated, the pointers 648 do not operate since the RMI cut out relay 489 is deenergized.

LOW FREQUENCY (ARN-6) STATION TUNING SIMULATION

*(See Figs. 59–65)*

Potentiometers 660 and 662 are provided for setting by the instructor according to the frequency of low frequency station one and potentiometers 664 and 666 are provided for setting by the instructor according to the frequency of low frequency station two. The arms of potentiometers 660 and 662 are connected to a pointer which is set by the instructor relative to a frequency dial, as indicated on the drawings, according to the frequency of station one, and the arms of potentiometers 664 and 666 are connected to a knob and pointer which is set by the instructor relative to a frequency dial according to the frequency of station two. Frequency band selector switches 668 and 670 are available by means of which the instructor can respectively select band 2 or band 4 frequencies for station one or two. Potentiometers 660 and 664 are utilized for band 2 operation of station one and two, respectively, and potentiometers 662 and 666 are used for band 4 operation of station one and two, respectively. Frequency band 2 for both stations covers a frequency range of from 200–410 kc. and may be used for simulating CAA radio range stations and CAA H and MH homing stations, while band 4 for both stations covers a frequency range of from 850–1750 kc. and may be used for simulating stations that transmit on the standard broadcast band.

Figure 11:
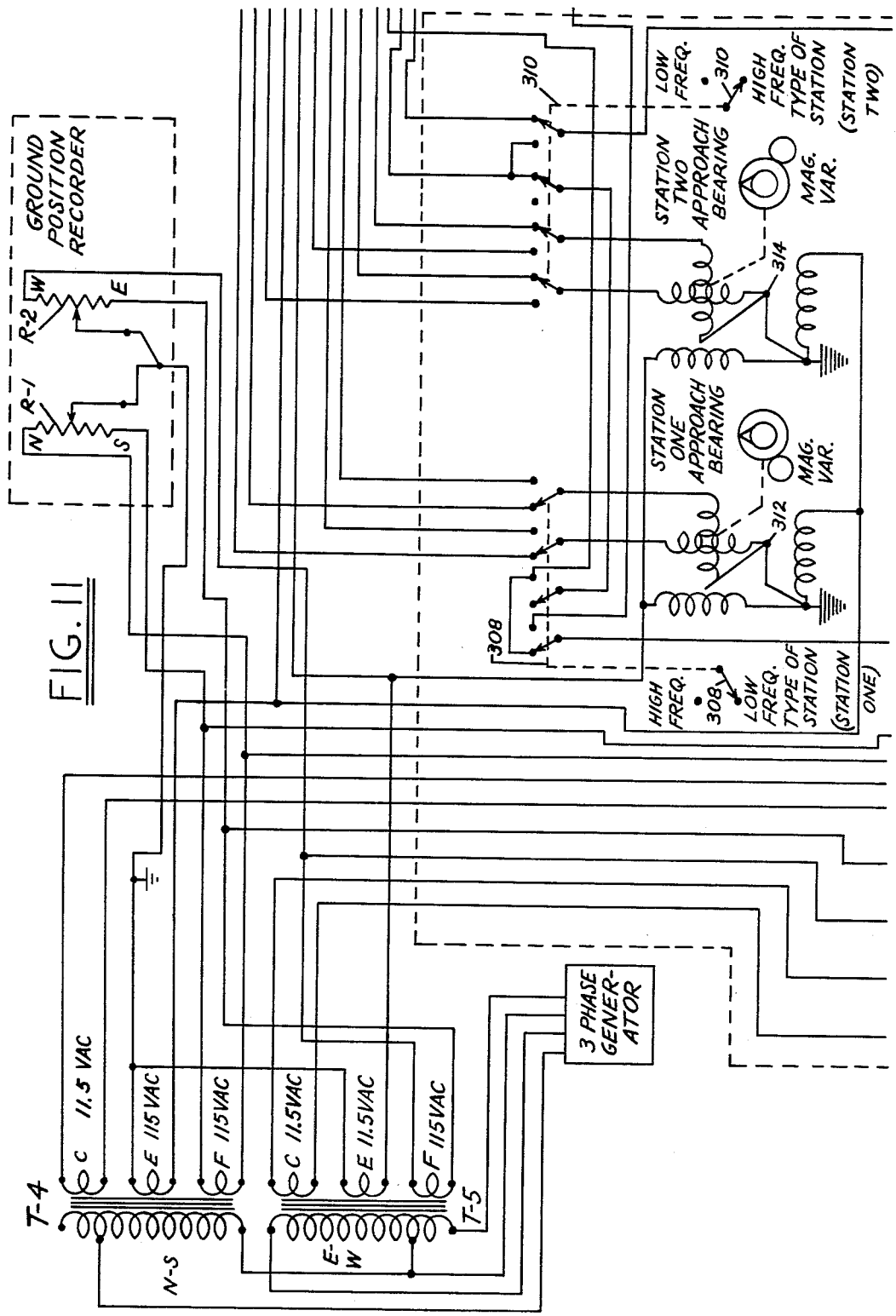
Figs. 11 and 12 are wiring diagrams of the trainer-station range true bearing computers.

Potentiometers 672 and 674 of the pilot's ARN-6 control box, which in exterior appearance is exactly like the airborne ARN-6 control box, are positioned by the pilot by the use of the ARN-6 pilot's frequency tuning control which operates means to indicate the frequency to which the receiver is assumed to be tuned. Potentiometers 674, 660 and 664 form a band 2 bridge circuit excited by the E–W transformer T–5 (Fig. 11) and potentiometers 672, 662 and 666 form a band 4 bridge circuit excited by the N–S transformer T–4 (Fig. 11).

The pilot's band selector switch 676 grounds the arm of potentiometer 674 whenever the switch is positioned in the band 2 position of 200–410 kc. and the switch grounds the arm of potentiometer 672 whenever the switch is positioned in the band 4 position of 850–1750 kc. When a non-available frequency position is selected for band 2 or band 4, 6.3 v. A. C. is supplied to the band 2 or band 4 bridge circuit to unbalance the same, thereby preventing the introduction of a false null, as will later appear. Thus, 6.3 v. A. C. is applied to the band 2 bridge circuit comprising potentiometers 674, 660 and 668 whenever the switch 676 is positioned for bands 100–200 kc., 410–850 kc., or 850–1750 kc., and 6.3 v. A. C. is applied to the band 4 bridge circuit comprising potentiometers 672, 662 and 666 whenever the switch 676 is positioned for bands 100–200 kc., 200–410 kc., or 410–850 kc. The pilot's indicator lamp 678 will be illuminated by the 6.3 v. A. C. source whenever the pilot's ARN–6 master switch 680 is displaced from the "off" position and placed in the "Comp." (compass), "Ant." (antenna) or "Loop" position.

Assuming that the instructor has selected a proper station frequency, e. g., a station one frequency in either band 2 or band 4, the arms of potentiometers 660 and 662 will be positioned in a predetermined position with respect to their stators. The instructor will position band selector switch 668 for band 2 or band 4 operation, as the case may be. If the pilot properly positions his band selector switch 676 according to the band selected by the instructor, the operation of the pilot's frequency tuning control varies the excitation applied to the grid of station one amplifier V–71, the output of which is rectified by V–72A and impressed as a negative D. C. bias voltage on the grid of tube V–73. When the pilot tunes to the frequency of station one as set in by the instructor, the positions of the arm of potentiometer 674 or 672 will match the position of the arm of potentiometer 660 or 662, respectively, depending upon which band is being employed, resulting in a zero voltage input to the grid of V–71. Consequently, a minimum negative bias is applied to the grid of V–73 which fires, energizing station one tuned relay 682 in its plate circuit. Simultaneously, 115 v. A. C. is applied through the NO contact of relay 682, energizing the station one tuned relay 684 and passing 6.3 v. A. C. through its NO contact 1 to illuminate the instructor's station one tuned lamp 686, thereby indicating to the instructor that the pilot is tuned to the frequency of station one.

The circuit for simulated tuning of station two on band 2 or band 4 operation is identical to that for station one. When the arm of potentiometer 674 or 672 is matched by the pilot to the position of the arm of potentiometer 664 or 666, respectively, as set by the instructor, depending upon whether band 2 or band 4 is in operation, a zero voltage is applied to the grid of V–74, and rectifier V–72B will apply a minimum negative bias to the grid of V–75, resulting in a firing of V–75 and energization of the station two tuned relay 688. Relay 690 is energized by 115 v. A. C. passing through the NO contact of relay 688, and the instructor's station two tuned lamp 692 is illuminated by 6.3 v. A. C.

To simulate accurate tuning on the part of the pilot by visual means, dipping of a tuning meter for maximum signal strength is accomplished in the following manner: When the pilot is tuning to station one, the rectified voltage output of the bridge circuit is applied from rectifier V–72A to the grid of amplifier V–76A the cathode of which is supplied by a 115 v. A. C. computing voltage. The output of V–76A is routed through terminal B of PL–114 to rectifier V–77 where it is again rectified. The output of V–77 is amplified by V–78 and routed back through terminal P of PL–114 to the pilot's tuning meter 694. The tuning meter is a shunted milliammeter of the suppressed zero type and gives maximum deflection when a minimum current is flowing therethrough. When the bridge circuit in question is balanced, the flow through meter 694 will be a minimum, and maximum deflection of the pointer will occur, thus indicating to the pilot exact tuning to the frequency of station one as set by the instructor.

The circuit to the meter 694 for station two tuning comprises the rectifier V-72B, the output of which is applied to amplifier V-78 and then to the tuning meter through terminal B of PL-114 and the just described circuit. The circuit operates in the same manner as the corresponding station one circuit.

With the "Voice-CW" (voice-continuous wave) switch 696 on the pilot's ARN-6 control box in the "CW" position, 115 v. A. C. is applied through terminal J of PL-117 (see Fig. 25) to the relay 698, energizing the same. A 900 cycle tone generated by the oscillator V-79 (Fig. 62) passes through the branch D of the pilot's "Comp.-Ant.-Loop" switch 680, providing the switch is in the "Comp." position, terminal b of PL-114, terminal L of PL-117 (see Figs. 25 and 59), the NO contact of relay 698, terminal M of PL-117 (see Fig. 59) to the grids of isolation tube V-80. The output of tube V-80 is applied to the station one jack J-6 and station two jack J-7.

Referring to Figs. 25 to 30, when the ARN-6 system is in operation, the instructor's call letters switch 406 or 408, depending on whether station one or station two is in operation, is positioned on one of the contacts 9–12. and the 1020 cycle signal originating in oscillator V-14, amplified by V-15 and keyed by the station call letter generator in the code pattern of the call letters of the station being simulated, passes through the output switch 406 or 408 through terminal d or b of PL-117 (see Fig. 59) to the jack plug J-6 and J-7, respectively. Consequently, the 1020 cycle tone, keyed according to the pattern of the call letters of the station, are also routed to the jack plugs. The jack plugs are connected to the pilot's and instructor's receiving jacks through circuits later described.

With the Voice-CW switch 696 in the "voice" position, relay 698 (Fig. 25) is deenergized, and the 900 cycle tone is not routed to the jack plugs.

Voice communication from the instructor simulating voice communication from the station being simulated is accomplished as in ARN-14 operation, viz. (see Figs. 25 to 30) by pressing the instructor's press to talk button 430 on the instructor's microphone resulting in an energization of the instructor's microphone relay 432, which energizes relay 434 which in turn energizes station one or station two relay 412 or 422, depending upon whether switch 436 is in the station one or station two position. The 1020 cycle coded tone from V-15 is then interrupted, and a circuit from the instructor's preamplifier tube V-19 is established through the upper branch of switch 436, the NO contact of relay 412 or 422, the lower branch of switch 406 or 408, and the previously traced circuits to the jack plugs J-6 or J-7.

Tube V-80 (Fig. 60) functions as an isolation stage to prevent interference at the jacks J-6 and J-7 between the signals of the two stations being simulated.

The signals transmitted to the jack plugs J-6 and J-7 are respectively routed to the grids V-81A and V-81B, which tubes function as class A amplifiers when the student is tuned to station one or two, respectively. When tuned, the undistorted audio signal is routed from V-81A and V-81B through terminal L of PL-114 (see Fig. 62) to the screen grid of amplifier V-82, the output of which is routed through terminal T of PL-113, terminal N of PL-117 (see Fig. 25) to the right grid of isolation tube V-17. With the instructor's ARN-6 noise selector switch 700 (see Fig. 26) in the "noise off" position, the ARN-6 signals are routed to the ARN-6 terminal of the upper branch of the instructor's phone selector switch 468 and thence to the instructor's phone jacks J-2 through the previously described circuit.

The pilot receives the audio signals from V-82 (Fig. 62), the output of which is also applied through the mixer tube V-83, power amplifier V-84, output transformer T-30, terminal Z of PL-114 (see Fig. 59), resistors 702, 704 and potentiometer 706, the branch B of the pilot's selector switch 680, when that switch is on the "Comp.," "Ant." or "Loop" position, and the jack plug J-8. Potentiometers 706 and 708 together with resistors 702 and 704 form an audio volume control for the pilot, the potentiometers being operated by control 709.

As previously stated, the tubes V-81A and V-81B function as normal class A amplifiers when the pilot is tuned to stations one or two, respectively, and pass the undistorted audio signals to the earphone jacks. In the absence of such precise tuning they distort the audio signal output, thereby simulating audio reception by an airborne receiver when the receiver is improperly tuned.

The 900 cycle tone is heard by the pilot when his "Voice-CW" switch is in the "CW" position and he is tuned to station one or station two. The provision of this tone simulates the corresponding operation of the airborne ARN-6 receiver where the tone is generated by the receiver when the pilot is tuned to the frequency of the transmitting station. This enables the pilot to tune to the station where an interrupted modulating signal or no modulating signal is being transmitted by the station.

By opening the jack plug J-6 or J-7, thus breaking the normal ARN-6 circuits, the signals received from a real transmitting station by another radio receiver may be applied to the circuits to the pilot's and instructor's receiving stations.

When the pilot places plug 472 (Fig. 21) into the jack J-8 (Fig. 59), and switch 426 is set to "MON.," the instructor's monitor line carries the signals heard by the pilot to terminal G of PL-117 (see Figs. 25 to 30) to the instructor's phone jacks.

LOW FREQUENCY (ARN-6)
STATION MAXIMUM RANGE (See Figs. 59–65)

Assuming that the pilot has tuned to the frequency of station one or station two, and switch 308 or switch 310 of Fig. 11 is set in the low frequency station position, the trainer-station range-true bearing voltage passes through the NO contact 4 of station one tuned relay 684 (Fig. 13) or station two tuned relay 690 through PL-115 (see Fig. 64), resistor 710 and the ARN-6 maximum range potentiometer 712 to the grid of amplifier V-84. The ARN-6 maximum range potentiometer 712 is set by the instructor according to the maximum range from the station at which the signals may be intercepted, and as indicated on the drawings, may be set for distances from 100 to 200 miles. The voltage output from the potentiometer varies in amplitude directly with the assumed range of the trainer from the station and varies inversely with the assumed maximum range of the station, and is hereinafter referred to as the "trainer-station modified range signal." This signal is amplified by V-84, rectified by V-85 and applied to the grid of tube V-86 as a positive voltage. As the trainer-station modified range signal increases in amplitude, the bias applied to the grid of V-86 becomes less negative, and the plate current of V-86 increases. When the bias becomes sufficiently positive, the plate current of V-86 energizes the beyond range relay 714. Therefore, the energization of the relay depends upon the assumed trainer-station range and assumed maximum range of the station. As the latter factor is decreased, a lesser former factor energizes the relay. However, when the trainer is within the assumed range of the station, the said relay is de-energized and the trainer-station range-true bearing voltage is routed from PL-115 through the NC contact of the relay 714 and PL-116 (see Fig. 17) to the low frequency bearing servo where it is applied to the grid of amplifier V-86.

MAGNETIC VARIATION AND LOW FREQUENCY (ARN-6) BEARING SERVO

*(See Figs. 11–17)*

At the same time, the instructor will have positioned the type of station switch 308 or 310 (Fig. 11) in the "low frequency" position, and a voltage having a phase according to the magnetic variation at the location of the trainer being simulated is applied from resolver 312 or 314 through the NO contacts 2 and 3 of station one tuned relay 684 or station two tuned relay 690 (Fig. 13) depending upon the station selected by the instructor and tuned by the pilot, and then to the rotor of resolver 716 of the low frequency bearing servo.

The low frequency bearing servo and amplifier is identical in all respects with the high frequency bearing servo and amplifier (Figs. 15 and 16) previously discussed, and hence a detailed disclosure and discussion of the same is unnecessary. The said low frequency bearing servo and amplifier compares the phases of the two input voltages which correspond to the trainer-station true bearing and magnetic variation at the location of the station and routes the error voltage to the low frequency bearing servo amplifier, the output of which is fed to the coil of the bearing servomotor of the motor-generator set 718. The servomotor is operated to drive the shaft of the motor-generator set 718 to a position corresponding to the magnetic bearing of the station from the assumed location of the trainer, or trainer-station magnetic bearing. The rotor of the self-synchronous unit 720 is positioned accordingly.

COMP-ANT-LOOP SIMULATION

*(See Figs. 53–65)*

The rotor of the self-synchronous transmitter 722 of the heading servo is positioned according to the assumed magnetic heading of the trainer, resulting in the transmission of a corresponding voltage from the stator of unit 722 through terminals U and Y of PL–149 (see also Fig. 17) to the rotor of the self-synchronous unit 720 of the low frequency bearing servo. The stator of unit 720 therefore has induced therein a voltage which is a measure of the combined factors of trainer-station magnetic bearing and magnetic heading of the trainer, the resultant of which factors is assumed bearing of the station from the trainer measured with respect to the longitudinal axis of the trainer, which factor is referred to as "trainer-station relative bearing". This voltage is routed through terminals W and V of PL–149 and the branches G and H of the pilots Comp.-Ant.-Loop selector switch 680, when in the "Comp." position, to the stators of self-synchronous receivers 724 which operate the front pointers 726 of the pilot's and instructor's RM indicators (Fig. 57) to position the same relative to the cases 640 of the instruments according to the factor of trainer-station relative bearing. As previously explained, the dials 638 of the RM indicators are positioned according to the magnetic heading of the trainer plus precession. Consequently, when the switch 680 is in the "Comp." position, the RM indicators pointers 726 relative to the dials give a continuous indication of the assumed trainer-station magnetic bearing plus precession, the factor of trainer heading being cancelled out.

The reception of aural signals by the pilot when the selector switch 680 is in the "Comp." position is accomplished as follows:

A 900 C. P. S. signal generated by the oscillator V–79 (Fig. 62) and utilized as a computing voltage is routed through branch E of the pilot's selector switch 680, when in the "Comp." position, and is applied to the grid of the range attenuator tube V–87. At the same time, the output of V–84, which is directly proportional to assumed range of the trainer from the station and inversely proportional to station maximum range, is applied through the range adjust potentiometer 728 to rectifier V–88, the output of which is also applied to the grid of V–87 in the form of a negative voltage to control the gain of the tube V–87 in inverse proportion to the amplitude of the trainer-station modified range voltage. When the trainer is within range of the station, V–87 is above cut-off and functions as an amplifier, amplifying the 900 C. P. S. signal, and routing its output to rectifier V–89, the output of which is in the form of a positive D. C. voltage inversely proportional to the trainer-station modified range voltage and is applied to the grid of V–82. As previously explained, ARN-6 audio signals are impressed on the screen grid of tube V–82, the plate current of which is controlled by the trainer-station modified range voltage to be inversely proportional to the voltage. Said plate current is modulated by the ARN–6 aural signals, and routed to the pilot's and instructor's receiving jacks through the previously described circuits. Consequently, when the pilot's "Comp.-Ant.-Loop" selector switch is in the "Comp." position, the intensity of the aural signals heard is inversely proportional to the assumed range of the trainer from the station and directly proportional to the maximum range or power of the transmitting station being simulated.

When the trainer-station modified range signal applied to V–87 by V–88 is of sufficient amplitude, the trainer is assumed to be outside the range of the station, V–87 is below cut-off, and the fixed negative bias applied to V–82 cuts it off, with the result that no signals are heard by the pilot and instructor.

The cathode of V–87 is connected through terminal L of PL–113 (Fig. 59), branch C of the pilot's selector switch 680 when in the "Comp." position, and resistor 730 to ground to provide a fixed gain for the tube V–87. The volume of the signals received is adjustable by the pilot's volume control 709.

When the pilot positions the selector switch 680 in the "Loop" position, the trainer-station relative bearing voltage from the stator of unit 720 (Fig. 56) is routed through terminals V and W of PL–149 and branches G and H of switch 680 to the stator of the self-synchronous unit 732, the rotor of which is connected through terminal E of PL–114 (see Fig. 62) and branch E of switch 680 to the grid of the range attenuator tube V–87. The rotor of self-synchronous unit 732 is mechanically coupled to the rotor of the self-synchronous transmitter 734, the stator of which is connected through branches I and J of switch 680, when in the "Loop" position, to the receivers 724 of the pilot's and instructor's RM indicators.

For "Loop" operation the loop drive directional control switch 736 is in the form of a potentiometer rotor and is connected to one side of the 115 v. A. C. line, the other side of which is connected to the rotor of the reversible loop drive motor 738. The field coils of the motor may be connected to the switch through one of the two potentiometers 740 or 742, depending upon the position of the switch 736 which is provided with a return-to-center spring. The rotor of the motor is coupled to the rotors of the self-synchronous units 732 and 734 through suitable reduction gears.

In operation, voltage induced in the stator of unit 732, when switch 680 is in the "Loop" position, corresponds to the factor of trainer-station relative bearing, as explained above. The voltage induced in the rotor of unit 732 depends upon the voltage in the stator and the position of the rotor relative to the stator. The indications given by the pilot's and instructor's RM indicators depends upon the position of the rotor of unit 734 which is coupled to the rotor of unit 732. The reversible motor 738 may be driven by the pilot by positioning switch 736 to position the rotor of unit 732 so that zero voltage is induced therein and consequently no input applied to the grid of the range attenuator tube V–87, such position being one of the two possible null positions which are 180 degrees apart. With no input signal applied to V–87, it has no A. C. output, the output of V–89 is zero, and V-82 is biased to cut-off. Consequently, no signal is heard by the pilot or instructor. The RM indicators pointers 726 will then give the trainer-station magnetic bearing or the reciprocal thereof.

As the position of the rotor of unit 732 is displaced from the said null positions, the voltage induced therein and applied to the grid to V-87 increases, resulting in the application of a more positive voltage to the grid of modulator V-82, and consequently the ARN-6 signals heard by the pilot and instructor are of an increasing intensity.

As previously explained, the grid of V-87 has a negative bias applied thereto dependent upon the combined factors of assumed range from the trainer to the station and assumed maximum range of the station. As this modified trainer-station range signal bias applied to V-87 becomes more negative, the signal applied to the grid of V-87 from the rotor of unit 732 must be greater to allow V-87 to conduct. The angle through which the rotor of unit 732 must be rotated from a theoretical null position without placing a voltage above cut-off on V-87 increases as the combined range signal applied to the grid of V-87 increases. Consequently, as the assumed range of the trainer from the station increases, or maximum range of the station decreases, the breadth of the null increases, thereby simulating the corresponding results of loop operation in a plane in actual flight. The breadth of the null may be made to vary, for example, from zero degrees when the trainer is assumed to be directly over the transmitting station to 30 degrees at an assumed range of 100 miles. This or any other desired adjustment may be accomplished by setting the potentiometer 728.

When "Loop" operation is being simulated, the audio signal output of mixer tube V-83 is fed to the branch F of the selector switch 680 and into the tuning meter circuit rectifier V-77. The deflection of the tuning meter 694 (Fig. 59) then becomes a function of frequency tuning as well as null tuning, maximum deflection of the tuning meter being obtained only when tuned to the null.

The rate of rotation of the loop drive simulating motor 738 is variable according to the displacement of the loop drive switch 736 from its neutral position.

The cathode of the range attenuation tube V-87 is connected through terminal L of PL-113 (see Fig. 59), branch C of switch 680 and the potentiometer 744 to ground when switch 680 is in the "Loop" position. Consequently, the pilot's volume control 709 regulates the gain of V-87 and thereby the breadth of the null, as is the case in the operation of an airborne receiving unit when on "Loop" operation.

When the pilot's selector switch 680 is in the "Ant." position, the circuits to the pilot's and instructor's RM indicator are broken by branches G, H, I and J of switch 680 (Fig. 56), and the pointers 726 of the RM indicators do not function. The 900 C. P. S. computing signal from oscillator V-79 (Fig. 62) is applied through branch E of switch 680 to the grid of the range attenuation tube V-87 and the trainer-station modified range signal is also applied to the grid. The circuit functions as in "Comp." operation to control the intensity of the signals heard by the pilot and instructor according to the combined factors of assumed range of the trainer from the station and maximum range of the station. The cathode of the range attenuation tube V-87 is connected through terminal L of PL-113 (see Fig. 59), branch C of switch 680, when in the "Ant." position, and potentiometer 744 to ground. The potentiometer controls the gain of the tube, while at the same time the potentiometers 706 and 708 regulate the intensity of the signals heard by the pilot.

When the pilot's "Comp.-Ant.-Loop" switch 680 is in the "off" position, the cathode circuit of V-87 is ungrounded, and consequently no signals are heard by the pilot or instructor.

CRASH STATIC AND PRECIPITATION NOISE
*(See Figs. 62–65)*

Figure 64:
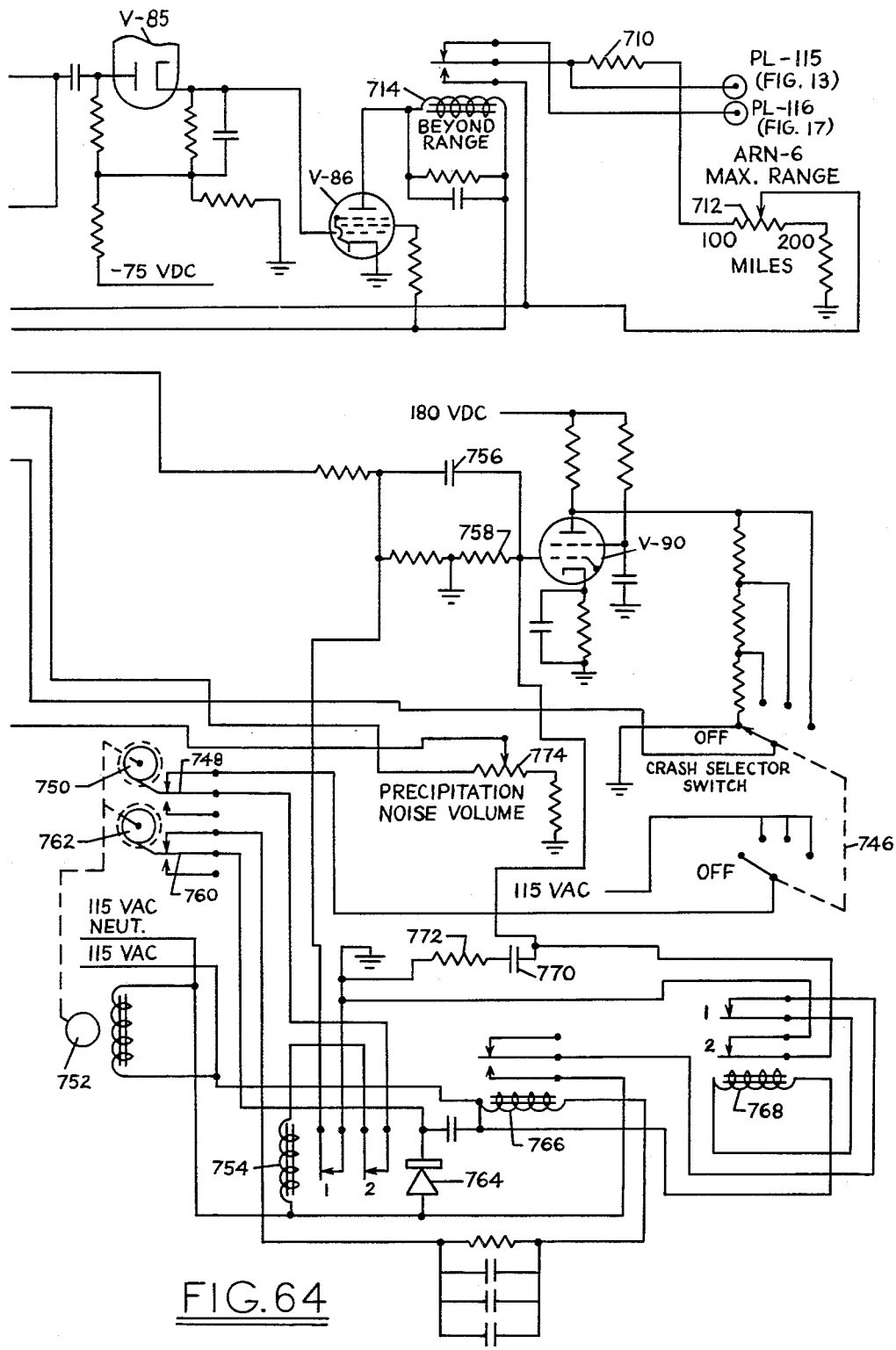

When the instructor's crash static selector switch 746 Fig. 64 is placed in any position other than the "off" position, 115 v. A. C. is supplied through the lower branch of the switch to the cam operated low level crash static switch 748 which upon being closed by the cam 750, rotated by motor 752, for varying lengths of time, completes a circuit through the NC contact 2 of relay 754 and relay 754 back to the other side of the 115 v. A. C. line. The energization of the relay 754 opens the NC contact 2, de-energizing the relay, whereupon the NC contact 2 is again closed, reenergizing the relay if switch 748 is still closed. Consequently, NC contacts 1 and 2 of the relay chatter as long as switch 748 is closed. When the chattering contact 1 is open, the circuit from ground through contact 1 to condenser 756 in the grid circuit of the crash static generator tube V-90 is open, resulting in the placing of a D. C. charge on the condenser from the 285 v. D. C. source, and the condenser is discharged through the grid resistor 758 of V-90. However, when the chattering contact 1 is closed, the circuit from ground to condenser 756 is closed, and the condenser is rapidly discharged, quickly changing the bias on the grid of V-90. Opening of the contact results in a quick charging of the condenser and corresponding change in the bias of the grid. Therefore, when switch 748 is closed, the bias applied to the grid of amplifier V-90 is in the form of an irregular signal voltage, and the corresponding output of V-90, simulating crash static, is routed through the upper branch of the crash static selector switch 746 to the grid of mixer tube V-83 in the audio signal circuit.

When the high level crash static switch 760 is closed by the cam 762, a D. C. voltage is supplied from the selenium rectifier 764 through the switch 760 to energize relay 766. Energization of relay 766 closes a 115 v. A. C. circuit through its NO contact, NC contact 1 of relay 768, and relay 768, energizing the same. The energization of the relay 768 opens its NC contact 1, de-energizing the relay, resulting in a closing of NC contact 1 and re-energization of the relay, etc., as long as switch 760 remains closed. Whenever relay 768 is energized its NC contact 2 is open, disconnecting the condenser 770 from the direct connection to ground and allowing it to accumulate a D. C. charge through the condenser 756. De-energization of relay 768 closes its NC contact 2 and connects condenser 770 directly to ground, discharging the condenser and at the same time placing a greater voltage across condenser 756. The operation of tube V-90 is affected as previously described. By making resistor 772 of a smaller value than resistor 758, the high level crash static signals are of a greater intensity than the low level crash static signals.

Low and high level crash static signals simulate distant and close lightning effects, respectively. The intensity of the signals from V-90 is regulated by positioning switch 746.

Precipitation noise is derived by applying the random inherent noise generated in the gas-filled tube V-91 to amplifier V-92, the output of which is impressed on the grid of V-93. Variation in the intensity of the precipitation noise is controlled by the instructor's setting the precipitation noise volume potentiometer 774 in the cathode circuit of V-93. The precipitation noise output of V-93 is impressed on the grid of mixer V-83, and thence to the pilot's earphone jacks through the previously traced circuit.

As previously explained, the instructor receives the ARN-6 audio signals from amplifier V-82, the output of which is routed through terminal T of PL-113 (see Fig. 59), terminal N of PL-117 (see Figs. 25 to 30) to the right grid of isolation tube V-17, and when the instructor's ARN-6 noise selector switch 700 is in the "noise off" position, through the ARN-6 terminal of the upper branch of the instructor's phone selector switch 468 to the instructor's phone jacks J-2. Thus, when the instructor's ARN-6 noise selector switch is in the "noise off" position, the instructor does not hear the precipitation noise and crash static signals which are routed to the pilot. However, if the instructor's ARN-6 noise selector switch 700 is in the "noise on" position, the ARN-6 signals output of V-82 is applied to the mixer tube V-83 to which is also applied the crash static and precipitation noise signals, and the mixed output signals of V-83 are applied to power amplifier V-84, transformer T-30, terminal Z of PL-114 (Fig. 59), terminal D of PL-117 (see Figs. 25 to 30) to the "noise on" terminal of the instructor's ARN-6 noise selector switch 700. With the switch in the "noise on" position, the combined signals are routed to the instructor's phone jacks J-2 through the described circuit.

Consequently, the instructor may, at his discretion, receive the ARN-6 signals with or without the crash static and precipitation noise signals.

Precipitation noise output of V-92 is also applied through terminal G of PL-114 (Fig. 59), terminal H of PL-117 (see Figs. 25 to 30) to the right grid of the precipitation noise tube V-20 of the ARN-14 system.

We claim:

1. In grounded navigation training apparatus, a system for simulating the operation of an airborne instrument which indicates the range of the plane from a radio transmitting station, said system comprising an indicator for indicating the assumed range of the plane from a radio station being simulated, apparatus for computing the instant assumed range of the plane from the radio station being simulated, a unit responsive to the computing apparatus and operable when the computed instant assumed range is below a predetermined amount for connecting the indicator and computing apparatus to cause said indicator to indicate the assumed computed range, means responsive to said computer for disconnecting said last mentioned unit from the indicator when the computed range exceeds said predetermined amount, and means for operating the indicator to give a continuously changing indication between fixed predetermined limits when the computed assumed range exceeds said predetermined amount.

2. In grounded navigation training apparatus, a system for simulating the operation of an airborne instrument which indicates the range of the plane from a radio transmitting station, said system comprising an indicator for indicating the assumed range of the plane from a radio station being simulated, apparatus for computing the instant assumed range of the plane from the radio station being simulated, a unit responsive to the computing apparatus and operated when the computed instant assumed range is below a predetermined amount for connecting the indicator and computing apparatus to cause said indicator to indicate the assumed computed range, means responsive to said computer for disconnecting said last mentioned unit from the indicator when the computed range exceeds said predetermined amount, means for operating the indicator to give a continuously changing indication between predetermined limits when the computed assumed range exceeds said predetermined amount, an indication lamp, and means for illuminating the lamp when the computed range is less than said predetermined amount.

3. In grounded navigation training apparatus, a system for simulating the operation of an airborne instrument which indicates the range of the plane from a destination displaced from a radio station, said system comprising an indicator for indicating the assumed range of the plane from a selected assumed destination, a first computer for computing the assumed range and bearing from the assumed location of the plane to the radio station being simulated, controls for introducing the range and bearing of the assumed selected destination from the said radio station, a second computer responsive to the output of the first computing apparatus and the controls for computing the assumed range of the assumed selected destination from the assumed location of the plane and means interconnecting said second computer and said indicator for operating said indicator to indicate a continuously changing indication between a value equal to the introduced station to destination range and a value equal to the vector resultant of the introduced station to destination range and a predetermined portion of the plane to station range.

4. In grounded navigation training apparatus, a system for simulating the operation of an airborne instrument which indicates the range of the plane from a radio station, said system comprising an instructor's simulated frequency control, a pilot's simulated radio receiver frequency control and a pilot's simulated radio receiver on-off switch, an indicator for indicating the assumed range of the plane from a radio station being simulated, a motor connected to the indicator, and switching means responsive to the setting of the switch and relative settings of the controls for causing the motor to drive the indicator to give a continuously changing indication between predetermined limits when the said simulated on-off switch is in the "on" position and the setting of the pilot's simulated frequency control does not match the setting of the instructor's simulated frequency control.

5. In grounded navigation training apparatus, a system for simulating the operation of an airborne instrument which indicates the range of the plane from a radio station, said system comprising an instructor's simulated frequency control, a pilot's simulated radio receiver frequency control and a pilot's simulated radio receiver on-off switch, an indicator for indicating the assumed range of the plane from a radio station being simulated, a computer for computing the instant assumed range from the assumed location of the plane to the radio station being simulated, means responsive to the setting of the switch and relative settings of the controls for operating the indicator to give a continuously changing indication between predetermined limits when said simulated on-off switch is in the "on" position and the setting of the pilot's simulated frequency control does not match the setting of the instructor's simulated frequency control, and means responsive to the setting of the switch, relative settings of the controls and output of the computer for operating the indicator to give a continuously changing indication between predetermined limits when the said simulated on-off switch is in the "on" position, the setting of the pilot's simulated frequency control matches the setting of the instructor's simulated frequency control, and the computed assumed range exceeds a predetermined amount.

6. In grounded navigation training apparatus, a system for simulating the operation of an airborne instrument which indicates the range of the plane from a radio station, said system comprising an instructor's simulated frequency control, a pilot's simulated radio receiver frequency control and a pilot's simulated radio receiver on-off switch, an indicator for indicating the assumed range of the plane from a radio station being simulated, a computer for computing the instant assumed range from the assumed location of the plane to the radio station being simulated, means responsive to the setting of the switch and relative positions of the controls for operating the indicator to give a continuously changing indication between predetermined limits when said simulated on-off switch is in the "on" position and the setting of the pilot's simulated frequency control does not match the setting of the instructor's simulated frequency control, means responsive to the setting of the switch, relative positions of the controls and output of the computer for operating the indicator to give a continuously changing indication between predetermined limits when the said simulated on-off switch is in the "on" position, the setting of the pilot's simulated frequency control matches the setting of the instructor's simulated frequency control and the computed assumed range exceeds a predetermined amount, and means responsive to the setting of the switch, relative positions of the controls and output of the computer interconnecting the computer and indicator for operating the indicator to indicate the said computed assumed range when the said simulated on-off switch is in the "on" position, the setting of the pilot's simulated frequency control matches the setting of the instructor's simulated frequency control, and the computed assumed range is less than a predetermined amount.

7. In grounded navigation training apparatus, of the type comprising a cockpit for a pilot, controls in the cockpit simulating certain of the controls in a real plane, a flight system in the trainer for calculating the assumed track of the trainer, and a device controlled by the flight system movable over a chart showing the assumed position of a radio station being simulated, a system for simulating the operation of an airborne instrument which indicates the range of the plane from a radio transmitting station, said system comprising an indicator in the cockpit for indicating the assumed range of the plane from the radio station being simulated, apparatus responsive to the operation of said flight system for computing the instant assumed range of the plane from the radio station being simulated, as shown by the position of said movable device relative to said chart, a unit responsive to the computing apparatus and operable when the computed instant assumed range is below a pre-determined amount for connecting the indicator and computing apparatus to cause said indicator to indicate the assumed computed range, means responsive to said computer for disconnecting said last mentioned unit from the indicator when the computed range exceeds said predetermined amount, and means for operating the indicator to give a continuously changing indication between predetermined limits when the computed assumed range exceeds said predetermined amount.

8. In grounded navigation training apparatus, of the type comprising a cockpit for a pilot, controls in the cockpit simulating certain of the controls in a real plane, a flight system in the trainer and responsive to the controls for calculating the assumed track of the trainer, and a device controlled by the flight system movable over a chart showing the assumed position of a radio station being simulated, a system for simulating the operation of an airborne instrument which indicates the range of the plane from a destination shown on the chart and displaced from the radio station, said system comprising an indicator in the cockpit for indicating the assumed range of the plane from the selected assumed destination, a first computer responsive to the flight system for computing the assumed range and bearing from the assumed location of the plane to the radio station being simulated, controls in the cockpit for introducing the range and bearing of the assumed selected destination from the said radio station, a second computer responsive to the output of the first computing apparatus and the controls for computing the assumed range of the assumed selected destination from the assumed location of the plane as shown by the position of said movable device relative to said chart, and means interconnecting said second computer and said indicator for operating said indicator to indicate a continuously changing indication between a value equal to the introduced station to destination range and a value equal to the vector resultant of the introduced station to destination range and a predetermined portion of the plane to station range.

9. In grounded navigation training apparatus, of the type comprising a cockpit for a pilot, controls in the cockpit simulating certain of the controls in a real plane, a flight system in the trainer responsive to said controls for calculating the assumed track of the trainer, and a device controlled by the flight system movable over a chart showing the assumed position of a radio station being simulated, a system for simulating the operation of an airborne instrument which indicates the range of the plane from a radio transmitting station, said system comprising an indicator in the cockpit for indicating the assumed range of the plane from the radio station being simulated, apparatus responsive to the operation of said flight system for computing the instant assumed range of the plane from the radio station being simulated, as shown by the position of said movable device relative to said chart, a motor connected to the indicator to drive the same, means responsive to the output of said computing apparatus for establishing a connection from the computer to the motor to regulate the output of the motor according to the output of the computer when the computed instant assumed range is less than a predetermined value, and further means to interrupt a connection between said computing apparatus and said indicator when the computer instant assumed range is greater than said predetermined value.

10. In grounded navigation training apparatus, of the type comprising a cockpit for a pilot, controls in the cockpit simulating certain of the controls in a real plane, a flight system in the trainer responsive to said controls for calculating the assumed track of the trainer, and a device controlled by the flight system movable over a chart showing the assumed position of a radio station being simulated, a system for simulating the operation of an airborne instrument which indicates the range of the plane from a radio transmitting station, said system comprising an indicator in the cockpit for indicating the assumed range of the plane from the radio station being simulated, a computer responsive to the operation of said flight system for computing the instant assumed range of the plane from the radio station being simulated, as shown by the position of said movable device relative to said chart, a motor connected to the indicator to drive the same, a source of a constantly varying voltage, and means controlled by the output of said computer for connecting said computer to said motor when the computed instant assumed range is less than a predetermined value and for disconnecting said voltage source from said motor when the computed instant assumed range is greater than said predetermined value.

11. A navigation trainer comprising in combination a computer having a plurality of inputs for computing the range of an assumed destination from the simulated location of the trainer and for deriving an output signal proportional to said computed range, means for deriving a first voltage corresponding to the relative bearing and range of said assumed destination from a selected point, means for deriving a second voltage corresponding to the relative bearing and range of said simulated location of the trainer from said selected point, means for applying said first and second voltages to the inputs of said computer, an indicator responsive to the output signal of said computer to indicate said computed range, connecting means responsive to said second derived voltage for connecting the output of said computer to said indicator only when said second voltage is within predetermined limits, and further means for indicating whether said indicator is so connected.

12. A navigation trainer according to claim 11 in which the selected point represents an assumed location of a simulated radio transmitting station.

13. A navigation trainer comprising in combination an electrical computer having a plurality of inputs and an output for deriving a signal proportional to the range of an assumed destination from the simulated location of the trainer, means for deriving a first voltage corresponding to the relative bearing and range of said assumed destination from the location of a simulated radio transmitting station, means for deriving a second voltage corresponding to the relative bearing and range of said simulated location of the trainer from said simulated radio transmitting station location, means for applying said first and second voltages to the inputs of said computer, an indicator responsive to the output signal of said computer to indicate the computed range of said assumed destination from said simulated location of the trainer, connecting means responsive to said second derived voltage as a first condition for connecting the output of said computer to said indicator only when said second voltage is within predetermined limits, frequency setting means under the control of an instructor adjustable in accordance with the transmission frequency of said simulated radio station, a simulated tuning control in said trainer adjustable by a trainee, further means cooperating with said connecting means and responsive to correlated adjustment of said frequency settings means and said simulated tuning control as a second condition for connecting the output of said computer to said indicator only when the adjustments of said tuning control and said frequency setting means correspond, and means for indicating whether said indicator is connected to said computer.

14. A navigation trainer according to claim 13 in which said last recited means produces a continuously changing indication whenever said indicator is not connected to said computer.

References Cited in the file of this patent

UNITED STATES PATENTS

| | | |
|---|---|---|
| 2,333,688 | Shepard | Nov. 9, 1943 |
| 2,405,239 | Seeley | Aug. 6, 1946 |
| 2,406,836 | Holden | Sept. 3, 1946 |
| 2,529,468 | Dehmel | Nov. 7, 1950 |
| 2,533,361 | Dehmel | Dec. 12, 1950 |
| 2,540,150 | Watts | Feb. 6, 1951 |
| 2,559,039 | Decker | July 3, 1951 |
| 2,560,527 | Dehmel | July 10, 1951 |
| 2,560,528 | Dehmel | July 10, 1951 |
| 2,602,243 | Link | July 8, 1952 |

OTHER REFERENCES

Aero Digest, pp. 17, and 92, January 1949.
Instruments, pp. 492, 493, 534, 536, June 1949.
System for D. M. E., Proceedings of the I. R. E., volume 37, November 1949, pages 1236–1242.